United States Patent
Yoshikawa et al.

(10) Patent No.: US 11,223,821 B2
(45) Date of Patent: Jan. 11, 2022

(54) VIDEO DISPLAY METHOD AND VIDEO DISPLAY DEVICE INCLUDING A SELECTION OF A VIEWPOINT FROM A PLURALITY OF VIEWPOINTS

(71) Applicant: Panasonic Intellectual Property Management Co., Ltd., Osaka (JP)

(72) Inventors: Satoshi Yoshikawa, Hyogo (JP); Toshiyasu Sugio, Osaka (JP); Toru Matsunobu, Osaka (JP); Tatsuya Koyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 16/053,102

(22) Filed: Aug. 2, 2018

(65) Prior Publication Data

US 2018/0343442 A1    Nov. 29, 2018

Related U.S. Application Data

(63) Continuation of application No. PCT/JP2016/004581, filed on Oct. 14, 2016.
(Continued)

(30) Foreign Application Priority Data

Jul. 19, 2016 (JP) .............................. JP2016-141921

(51) Int. Cl.
*H04N 13/354* (2018.01)
*H04N 21/218* (2011.01)
(Continued)

(52) U.S. Cl.
CPC ........... *H04N 13/354* (2018.05); *G06T 7/292* (2017.01); *G08B 13/19608* (2013.01);
(Continued)

(58) Field of Classification Search
CPC .............. G06T 7/292; G08B 13/19608; G08B 13/19641; H04N 13/117; H04N 13/354;
(Continued)

(56) References Cited

U.S. PATENT DOCUMENTS 5,745,126 A     4/1998  Jain et al.
6,359,647 B1 *  3/2002  Sengupta ......... G08B 13/19608
                                                        348/154
(Continued)

FOREIGN PATENT DOCUMENTS

JP        2002-165200       6/2002
JP        2012-94990        5/2012
(Continued)

OTHER PUBLICATIONS

Extended European Search Report dated Jan. 4, 2019 in corresponding European Patent Application No. 16889197.6.
(Continued)

*Primary Examiner* — James T Boylan
(74) *Attorney, Agent, or Firm* — Wenderoth, Lind & Ponack, L.L.P.

(57) ABSTRACT

A video display method includes: selecting, as a first selected viewpoint, one first viewpoint from among a plurality of first viewpoints corresponding to a plurality of second videos, and displaying a second video corresponding to the first selected viewpoint; determining whether the first selected viewpoint is included in a plurality of second viewpoints corresponding to a plurality of fourth videos captured after the plurality of second videos; and selecting one second viewpoint from among the plurality of second viewpoints as a second selected viewpoint and displaying a fourth video that is included in the plurality of fourth videos and corresponds to the second selected viewpoint, when the
(Continued)

first selected viewpoint is determined to not be included in the plurality of second viewpoints.

8 Claims, 51 Drawing Sheets

Related U.S. Application Data

(60) Provisional application No. 62/290,640, filed on Feb. 3, 2016.

(51) Int. Cl.
| | |
|---|---|
| *H04N 21/438* | (2011.01) |
| *H04N 21/2668* | (2011.01) |
| *H04N 21/214* | (2011.01) |
| *G08B 13/196* | (2006.01) |
| *H04N 21/2187* | (2011.01) |
| *H04N 21/6587* | (2011.01) |
| *H04N 7/18* | (2006.01) |
| *G06T 7/292* | (2017.01) |
| *H04N 13/117* | (2018.01) |
| *H04N 13/398* | (2018.01) |

(52) U.S. Cl.
CPC ....... *G08B 13/19641* (2013.01); *H04N 7/181* (2013.01); *H04N 13/117* (2018.05); *H04N 13/398* (2018.05); *H04N 21/2143* (2013.01); *H04N 21/2187* (2013.01); *H04N 21/21805* (2013.01); *H04N 21/2668* (2013.01); *H04N 21/438* (2013.01); *H04N 21/6587* (2013.01)

(58) Field of Classification Search
CPC ............. H04N 13/398; H04N 21/2143; H04N 21/21805; H04N 21/2187; H04N 21/2668; H04N 21/438; H04N 21/6587; H04N 7/181
See application file for complete search history.

(56) References Cited

U.S. PATENT DOCUMENTS

| | | | |
|---|---|---|---|
| 2014/0172961 A1* | 6/2014 | Clemmer | H04N 21/4307 709/203 |
| 2015/0081706 A1* | 3/2015 | Elmqvist Wulcan | G05B 19/0428 707/737 |
| 2017/0026680 A1* | 1/2017 | Sugio | H04N 21/2187 |

FOREIGN PATENT DOCUMENTS

| | | | | |
|---|---|---|---|---|
| WO | 2015/159487 | | 10/2015 | |
| WO | WO 2015159487 | * | 10/2015 | ....... H04N 21/21805 |

OTHER PUBLICATIONS

International Search Report (ISR) dated Dec. 13, 2016 in International (PCT) Application No. PCT/JP2016/004581.

* cited by examiner

VIDEO DISPLAY METHOD AND VIDEO DISPLAY DEVICE INCLUDING A SELECTION OF A VIEWPOINT FROM A PLURALITY OF VIEWPOINTS

CROSS REFERENCE TO RELATED APPLICATIONS

This application is a U.S. continuation application of PCT International Patent Application Number PCT/JP2016/004581 filed on Oct. 14, 2016, claiming the benefit of priority of Japanese Patent Application Number 2016-141921 filed on Jul. 19, 2016 and U.S. Patent Application No. 62/290,640 filed on Feb. 3, 2016, the entire contents of which are hereby incorporated by reference.

BACKGROUND

1. Technical Field

The present disclosure relates to a video display method or a video display device that displays videos using videos obtained by capturing the same scene from a plurality of mutually different viewpoints.

2. Description of the Related Art

As an image distribution method, a technique for controlling image capture conditions of cameras in a multi-view video distribution system is disclosed in Japanese Unexamined Patent Application Publication No. 2002-165200. In addition, a technique for distributing images captured from a plurality of viewpoints in accordance with movement of the viewpoints is disclosed in Japanese Unexamined Patent Application Publication No. 2012-094990.

SUMMARY

It is preferable that such a system can display videos more appropriately.

In view of this, the present disclosure has an object to provide a video display method or video display device capable of appropriately displaying videos.

In order to achieve the above object, a video display method according to one aspect of the present invention includes: (A) obtaining a plurality of second videos selected from among a plurality of first videos obtained by capturing a same scene from a plurality of mutually different viewpoints; (B) selecting, as a first selected viewpoint, one first viewpoint from among a plurality of first viewpoints corresponding to the plurality of second videos, and displaying a second video that is included in the plurality of second videos and corresponds to the first selected viewpoint; (C) obtaining a plurality of fourth videos selected from among a plurality of third videos obtained by capturing the scene, after the plurality of first videos, from a plurality of mutually different viewpoints; (D) determining whether the first selected viewpoint is included in a plurality of second viewpoints corresponding to the plurality of fourth videos; (E) displaying a fourth video that is included in the plurality of fourth videos and corresponds to the first selected viewpoint, when the first selected viewpoint is determined to be included in the plurality of second viewpoints; and (F) selecting one second viewpoint from among the plurality of second viewpoints as a second selected viewpoint, and displaying a fourth video that is included in the plurality of fourth videos and corresponds to the second selected viewpoint, when the first selected viewpoint is determined to not be included in the plurality of second viewpoints.

It should be noted that general or specific embodiments may be implemented as a system, a method, an integrated circuit, a computer program, a computer-readable storage medium such as a compact disc read-only memory (CD-ROM), or any selective combination thereof.

According to the present disclosure, a video display method and a video display device capable of appropriately displaying videos can be provided.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
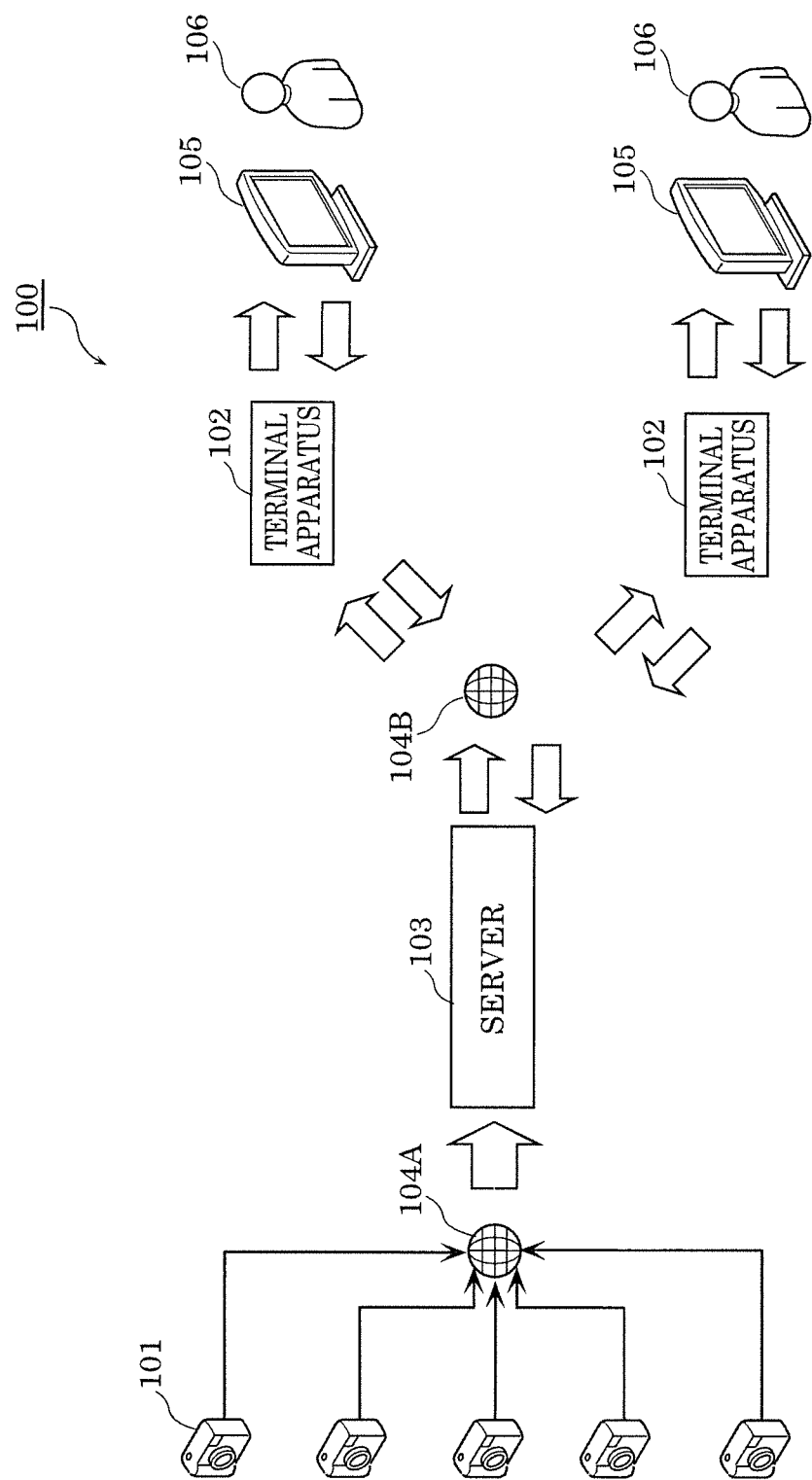
FIG. 1 is a diagram illustrating the configuration of a video distribution system according to Embodiment 1.

Underlying Knowledge Forming Basis of the Present Disclosure

As a video distribution system, for example, a system is assumed in which videos captured by a plurality of cameras (e.g., smartphones) owned by a plurality of users are saved to a server and distributed to a viewer. In such a system, an enormous number of videos are stored in the server, but the number of videos that can be displayed on a terminal apparatus owned by the viewer is limited.

In this case, it is difficult for the viewer to check all the videos and select desired videos. In addition, types (functions) of the plurality of cameras owned by the plurality of users are different from one another.

As described above, in the server, when some videos among the plurality of videos captured by cameras are extracted and transmitted to the terminal apparatus, there are instances in which the currently viewed viewpoint video is longer included in the plurality of videos transmitted to the server. It is necessary to appropriately display videos in such cases as well.

A video display method according to one aspect of the present disclosure includes: (A) obtaining a plurality of second videos selected from among a plurality of first videos obtained by capturing a same scene from a plurality of mutually different viewpoints; (B) selecting, as a first selected viewpoint, one first viewpoint from among a plurality of first viewpoints corresponding to the plurality of second videos, and displaying a second video that is included in the plurality of second videos and corresponds to the first selected viewpoint; (C) obtaining a plurality of fourth videos selected from among a plurality of third videos obtained by capturing the scene, after the plurality of first videos, from a plurality of mutually different viewpoints; (D) determining whether the first selected viewpoint is included in a plurality of second viewpoints corresponding to the plurality of fourth videos; (E) displaying a fourth video that is included in the plurality of fourth videos and corresponds to the first selected viewpoint, when the first selected viewpoint is determined to be included in the plurality of second viewpoints; and (F) selecting one second viewpoint from among the plurality of second viewpoints as a second selected viewpoint, and displaying a fourth video that is included in the plurality of fourth videos and corresponds to the second selected viewpoint, when the first selected viewpoint is determined to not be included in the plurality of second viewpoints.

This makes it possible to display videos to the user without interruption, even when video captured from a selected viewpoint cannot be obtained.

For example, in (F), among the plurality of second viewpoints, a second viewpoint closest to the first selected viewpoint may be selected as the second selected viewpoint.

This makes it possible to reduce changes in viewpoints when videos are switched.

For example, in (F), based on evaluation values of the plurality of second viewpoints, a second viewpoint having a highest evaluation may be selected as the second selected viewpoint.

This makes it possible to, for example, cause the transmission side to select a viewpoint desired to be presented to the viewer, when switching the selected viewpoint.

For example, the evaluation values may be determined based on view counts of videos captured from the plurality of second viewpoints.

This makes it possible to automatically present a popular viewpoint to the user.

For example, in (A), first viewpoint information indicating the plurality of first viewpoints may be further obtained, in (B), the plurality of first viewpoints and the first selected viewpoint may be further displayed, in (C), second viewpoint information indicating the plurality of second viewpoints may be further obtained, in (E), the plurality of second viewpoints and the first selected viewpoint may be further displayed, and in (F), the plurality of second viewpoints and the second selected viewpoint may be further displayed.

This makes it possible to present information indicating a plurality of viewpoints and information indicating the selected viewpoint to the user.

For example, the video information method may further include: (G) selecting a plurality of fifth videos from among the plurality of second videos; and (H) selecting a plurality of sixth videos from among the plurality of fourth videos. In (B), one third viewpoint may be selected as the first selected viewpoint from among a plurality of third viewpoints corresponding to the plurality of fifth videos, and a fifth video that is included in the plurality of fifth videos and corresponds to the first selected viewpoint may be displayed. In (D), whether the first selected viewpoint is included in a plurality of fourth viewpoints corresponding to the plurality of sixth videos may be determined. In (E), when the first selected viewpoint is determined to be included in the plurality of fourth viewpoints, a sixth video that is included in the plurality of sixth videos and corresponds to the first selected viewpoint may be displayed. In (F), when the first selected viewpoint is determined to not be included in the plurality of fourth viewpoints, one fourth viewpoint may be selected from among the plurality of fourth viewpoints as the second selected viewpoint, and a sixth video that is included in the plurality of sixth videos and corresponds to the second selected viewpoint may be displayed.

For example, this allows the server to transmit videos captured from a plurality of the same viewpoints to a plurality of terminal apparatuses, and allows each terminal apparatus to select a plurality of videos appropriate for the user of the terminal apparatus. Accordingly, it is possible to present videos appropriate for the user, to the user.

For example, in (F): when the first selected viewpoint is determined to not be included in the plurality of fourth viewpoints and the first selected viewpoint is included in the plurality of second viewpoints, a fourth video that is included in the plurality of fourth videos and corresponds to the first selected viewpoint may be displayed, and when the first selected viewpoint is determined to not be included in the plurality of fourth viewpoints and the first selected viewpoint is not included in the plurality of second viewpoints, a sixth video that is included in the plurality of sixth videos and corresponds to the second selected viewpoint may be displayed.

This makes it possible to continuously present videos captured from specific viewpoints that the user wants to see.

A video display device according to one aspect of the present disclosure includes processing circuitry and memory, and the processing circuitry executes the video display method using the memory.

This makes it possible to display videos to the user without interruption, even when video captured from a selected viewpoint cannot be obtained.

A program according to one aspect of the present disclosure is a program for causing a computer to execute the video display method.

This makes it possible to display videos to the user without interruption, even when video captured from a selected viewpoint cannot be obtained.

It should be noted that general or specific aspects may be implemented as a system, a method, an integrated circuit, a computer program, a computer-readable storage medium such as a CD-ROM, or any selective combination thereof.

Embodiments will be specifically described hereinafter with reference to the drawings. The following embodiments are examples of the present disclosure. Values, shapes, materials, components, arrangement positions and connection configuration of the components, steps, order of the steps, and the like are examples, and do not limit the present disclosure. Among the components described in the following embodiment, those not described in independent claims, which define broadest concepts, are described as arbitrary components.

Embodiment 1

(1) In a method for selecting cameras according to the present embodiment, cameras capturing M videos that can be displayed by a display application or the like are initially selected from N cameras on the basis of estimated positions and attitudes (capture angles) of cameras. In this method, it is determined for each of the initially selected M cameras whether camera switching is necessary, and if so, a new camera is selected from N-M cameras.

In this method, if all the selected cameras are reset, initial selection is newly performed.

The total number of cameras, which is denoted by N, and the number of cameras initially selected, which is denoted by M, may be increased or decreased as necessary.

(2) Methods used to estimate the positions and attitudes of the cameras include a method in which N or fewer videos are used, a method in which sensor information regarding the cameras is used, and a method in which both are used.

(3) Methods used to perform the initial selection include a method of capturing a capture target space without a blind spot, a method of capturing a particular subject are a plurality of angles, and a method including both.

(4) Scenes in the M videos or movement of the cameras is checked at arbitrary time intervals in order to determine whether to switch cameras. For example, the number of cameras to be switched is 1 to M, inclusive. If one camera is to be switched, a camera capturing a scene similar to a scene captured by the camera to be switched is selected. Alternatively, two or more cameras may be newly selected for one camera to be switched.

If 2 to (M-1) cameras are to be switched, the same selection process for switching one camera is performed for each of the cameras. If M cameras are to be switched, the same process as in the initial selection is performed. At this time, M may be increased or decreased.

As a result, even if there are an enormous number of viewable videos, multi-view video content valuable to a viewer can be distributed without necessitating the viewer, a server manager, a video manager, and a video monitor to perform extra operations.

First, the configuration of a video distribution system 100 according to the present embodiment will be described. FIG. 1 is a block diagram illustrating the overall configuration of the video distribution system 100 according to the present embodiment. The video distribution system 100 includes a plurality of cameras 101, terminal apparatuses 102, and a server 103 capable of communicating with one another through a network 104A or 104B.

The cameras 101 generate a plurality of videos of the same scene captured in the same time period from different viewpoints. Each of the cameras 101 is owned by one of a plurality of users. The cameras 101, for example, are owned by a plurality of spectators in a stadium or the like. The cameras 101 capture videos and obtain sounds. In addition to capturing videos, the cameras 101 obtain sensor information, which is information other than the videos, indicating positional information and attitude information (capture angles) regarding the cameras 101 using a Global Positioning System (GPS), Wi-Fi, gyro sensors, or the like. The cameras 101 may be any devices at least having an image capturing function and, for example, may be digital still cameras, digital video cameras, smartphones, mobile terminals, or the like. The cameras 101 may include not only cameras owned by the spectators but also a fixed camera or a broadcast camera. The cameras 101 transmit the captured videos, the obtained sounds, and the sensor information to the server 103 through the network 104A.

In the present embodiment, the cameras 101 are digital cameras or smartphones owned by the users, for example, and are therefore assumed to be of various different types (have various different functions).

The networks 104A and 104B, for example, are the Internet. Although the networks 104A and 104B are separately illustrated in FIG. 1, the cameras 101, the terminal apparatuses 102, and the server 103 may be connected to one another through a single network, instead. Part or the entirety of the communication between the devices may be performed directly, rather than through the network 104A or 104B. The devices may be connected to one another by a wired or wireless connection.

The server 103 is used for temporarily storing the videos captured by the cameras 101. The server 103 then distributes part of the videos stored therein to the terminal apparatuses 102 through the network 104B in accordance with instructions issued by users 106 through the terminal apparatuses 102. At this time, the server 103 executes a selection method in which camera information is used in order to select a number of videos that can be played back by the terminal apparatuses 102 from an enormous number of videos. The camera information indicates positions, capture angles, and focal distances of the cameras 101. The camera information is information registered to the server 103 in advance, the sensor information obtained along with the videos, information calculated by processing the videos, or information calculated using the sensor information and the videos information. The selection method is the method of capturing a capture target space without a blind spot, the method of capturing a particular subject from a plurality of angles, or both. The camera information may include information regarding an angle of view (zoom magnification) as well as the above information.

The server 103 performs processes such as switching of viewpoint videos in accordance with instructions from the users 106 or results of analyses of a scene captured or movement of the cameras 101.

Each of the terminal apparatuses 102 receives viewpoint videos from the server 103 in accordance with an instruction from the corresponding user 106 and outputs the viewpoint videos to a corresponding monitor 105 using a method according to an instruction from the user 106. The monitors 105 may be output devices of any type, such as monitors of desktop personal computers (PCs), tablet terminals, smartphones, mobile phones, or laptop PCs. Although the terminal apparatuses 102 and the monitors 105 are separately illustrated in FIG. 1, the terminal apparatuses 102 may include the monitors 105.

The users issue instructions by touching screens or using mice, for example, but input devices of any type may be used.

The instructions from the users are transmitted to the server 103. The instructions from the users are used as triggers to cause the server 103 to start to distribute videos and to switch viewpoint videos. The server 103 determines a method for selecting videos on the basis of an instruction from a user.

Audio data need not necessarily be obtained by all the cameras 101. The video distribution system 100 may include a microphone that obtains sound. The server 103 may distribute sounds accompanying selected videos to the terminal apparatuses 102, select a sound obtained by a camera 101 (or a microphone) closest to a target area or a subject, select the highest fidelity sound from the obtained sounds, or create a sound to be distributed by combining a plurality of sounds with one another.

The cameras 101 may transmit a plurality of viewpoint videos in real-time, and the users 106 may view the viewpoint videos in real-time using the terminal apparatuses 102. At least one of the transmission of the videos and the viewing of the videos need not be performed in real-time. That is, the users 106 may view viewpoint videos captured in the past at arbitrary timings. Transmission and reception of video signals (videos) described in the following description mainly refer to stream transmission and reception, in which the video signals are continuously transmitted and received.

Figure 2:
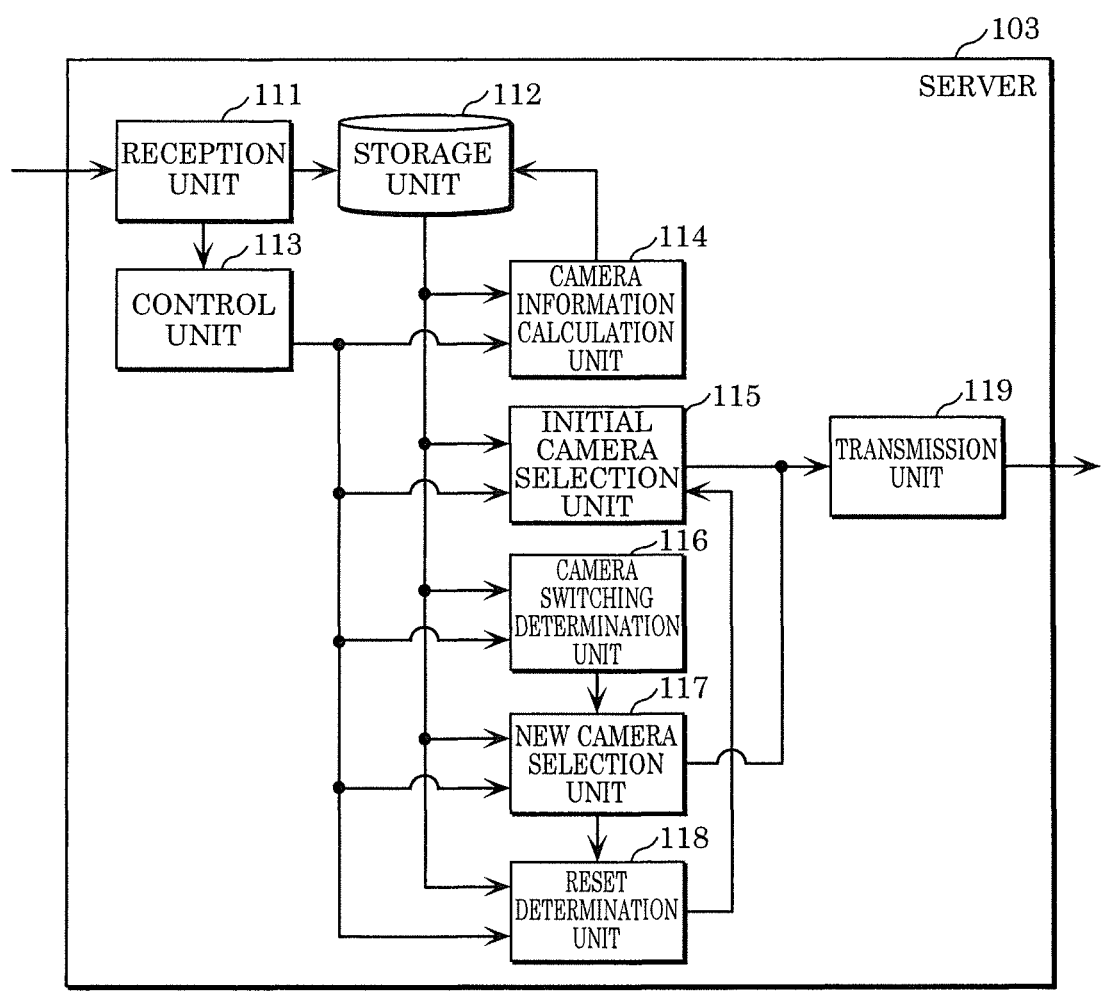
FIG. 2 is a block diagram illustrating a server according to Embodiment 1.

Next, the configuration of the server 103 will be described. FIG. 2 is a block diagram illustrating the configuration of the server 103. The server 103 includes a reception unit 111, a storage unit 112, a control unit 113, a camera information calculation unit 114, an initial camera selection unit 115, a camera switching determination unit 116, a new camera selection unit 117, a reset determination unit 118, and a transmission unit 119.

The reception unit 111 receives viewpoint videos and sensor information transmitted from the cameras 101. The storage unit 112 adds identification (ID) information for identifying the cameras 101 to the viewpoint videos and the sensor information received by the reception unit 111 and stores the ID information. The sensor information is output from Wi-Fi, the GPS, gyro sensors, or the like and identifies positions and attitudes of the cameras 101. The storage unit 112 stores the positions and attitudes of the cameras 101 calculated by the camera information calculation unit 114 using the viewpoint videos and the sensor information.

The storage unit 112 may store the viewpoint videos and the sensor information received by the reception unit 111 or, for example, may divide the viewpoint videos into frames and store frames at the same point of time as a set in order to enable the camera information calculation unit 114 to perform three-dimensional reconfiguration.

The control unit 113 controls each processing unit.

The camera information calculation unit 114 obtains a plurality of viewpoint videos from the storage unit 112 and calculates positions and attitudes of the cameras 101 through the three-dimensional reconfiguration. The camera information calculation unit 114 may obtain the sensor information from the storage unit 112 and calculate the positions and attitudes of the cameras 101 using the sensor information, or may calculate the positions and attitudes of the cameras 101 using both the viewpoint videos and the sensor information. The calculated positions and attitudes of the cameras 101 are stored in the storage unit 112.

The initial camera selection unit 115 selects a number of cameras 101 based on the number of viewpoints to be provided for a user from an enormous number of cameras 101 capturing a subject. The initial camera selection unit 115 uses the positions and attitudes of the cameras 101 calculated by the camera information calculation unit 114 for the selection.

The camera switching determination unit 116 checks whether each camera capturing a displayed video is capturing a capture target space or the subject, and if not, determines that the camera is to be switched.

If the camera switching determination unit 116 determines that a camera 101 is to be switched, the new camera selection unit 117 selects a new camera 101. The new camera selection unit 117 uses the positions and attitudes of the cameras 101 calculated by the camera information calculation unit 114 for the selection. If there is no appropriate camera, the new camera selection unit 117 decreases the number of cameras 101 selected.

The reset determination unit 118 performs the initial camera selection again if the user 106 issues a reset instruction or the number of cameras selected becomes zero or equal to or smaller than a threshold.

The operation of the server 103 will be described hereinafter. First, a process performed by the camera information calculation unit 114 will be described.

Figure 3:
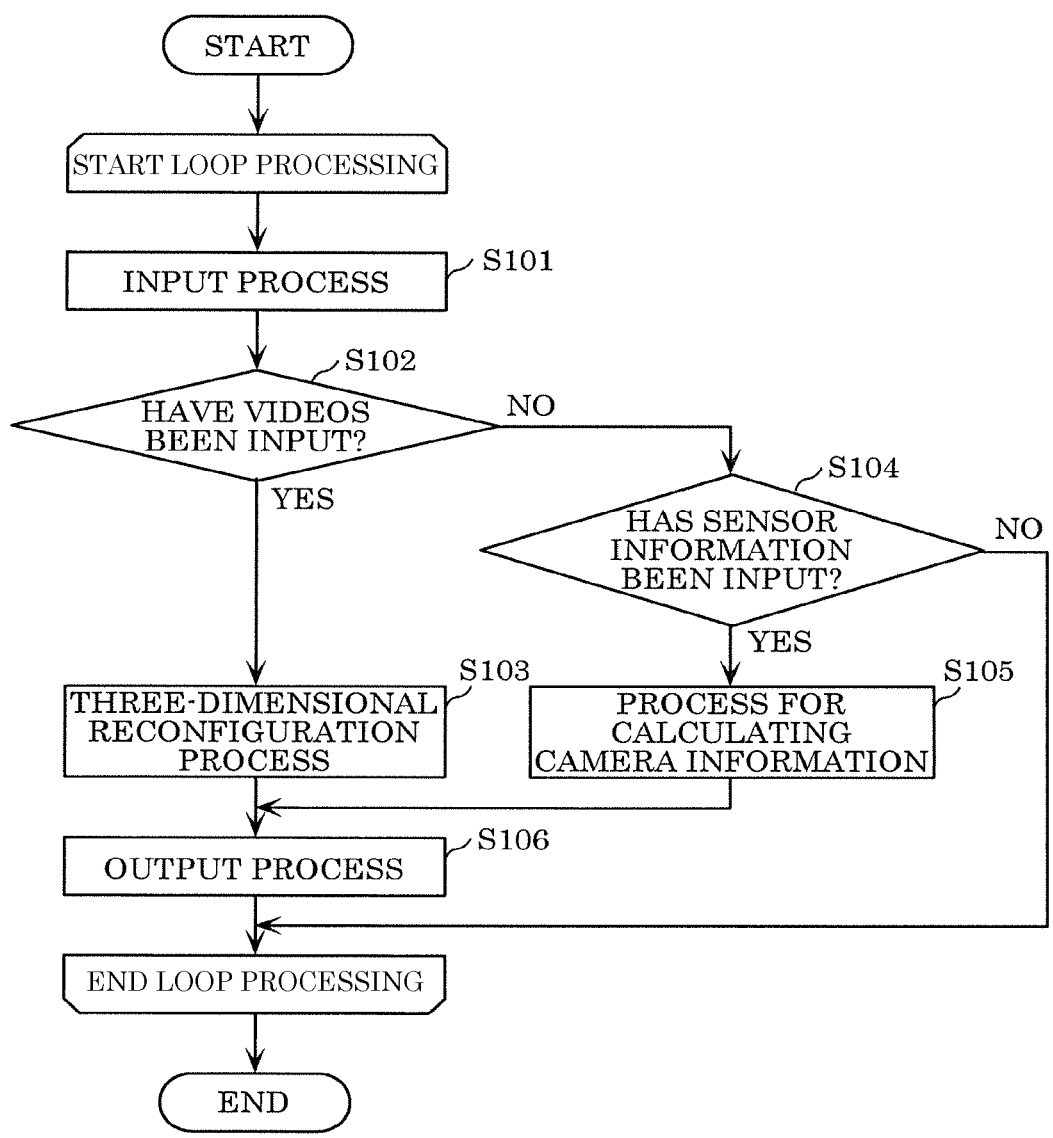
FIG. 3 is a flowchart illustrating a process for calculating camera information according to Embodiment 1.

FIG. 3 is a flowchart illustrating a process for calculating camera information performed by the camera information calculation unit 114.

First, as an input process, the camera information calculation unit 114 obtains the viewpoint videos captured by the cameras 101, the sensor information, or both from the storage unit 112 (S101). The information to be obtained is specified by the control unit 113. The camera information calculation unit 114 may divide the viewpoint videos into frames and create image sets, each consisting of frames at the same point of time, in order to perform the three-dimensional reconfiguration.

If the information obtained in the input process is the viewpoint videos (yes in S102), the camera information calculation unit 114 performs the three-dimensional reconfiguration (S103). More specifically, the camera information calculation unit 114 calculates the positions and attitudes of the cameras 101 by performing the three-dimensional reconfiguration of the cameras 101 using the viewpoint videos. In the three-dimensional reconfiguration, translation vectors and rotation matrices of the cameras 101 in a three-dimensional coordinate space defined by three axes of x, y, and z are calculated under constraints of epipolar geometry. A specific example of the three-dimensional reconfiguration based on the epipolar geometry will be described in detail later with reference to FIG. 4. The translation vectors T and the rotation matrices R are represented by the following expressions (1) and (2). The translation vectors T indicate the positions of the cameras 101 in the three-dimensional space, and the rotation matrices R indicate inclinations of the cameras 101 from the axes of the three-dimensional space, that is, the attitudes of the cameras 101. In the expressions, α, ß, and γ denote rotation angles of the cameras 101 along the x, y, and z axes, respectively.

[MATHEMATICAL FORMULA 1]

$$T = [x, y, z] \quad \text{expression (1)}$$

$$R = \begin{bmatrix} \cos\alpha\cos\beta\cos\gamma - \sin\alpha\sin\gamma & -\cos\alpha\cos\beta\sin\gamma - \sin\alpha\cos\gamma & \cos\alpha\sin\beta \\ \sin\alpha\cos\beta\cos\gamma + \cos\alpha\sin\gamma & -\sin\alpha\cos\beta\sin\gamma - \cos\alpha\cos\gamma & \sin\alpha\sin\beta \\ -\sin\beta\cos\gamma & \sin\beta\sin\gamma & \cos\beta \end{bmatrix} \quad \text{expression (2)}$$

If the information obtained in the input process is the sensor information (no in S102 and Yes in S104), the camera information calculation unit 114 calculates the positions and attitudes of the cameras 101 using the sensor information output from Wi-Fi, the GPS, the gyro sensors, or the like (S105). The camera information calculation unit 114, for example, sets the three-dimensional coordinate space and calculates coordinates of the positions of the cameras 101 in the three-dimensional coordinate space and the inclinations of the cameras 101 from the axes of the three-dimensional coordinate space, that is, the attitudes of the cameras 101.

Next, the camera information calculation unit 114 stores the positions and attitudes of the cameras 101 calculated in step S103 or S105 in the storage unit 112 (S106).

The processing in steps S101 to S106 is repeated at predetermined time intervals.

The determination as to inputting of videos (S102) and the determination as to inputting of sensor information (S104) need not be performed in this order. The order may be reversed, or part or the entirety of the determinations may be performed in parallel.

A principle of the three-dimensional reconfiguration will be described hereinafter with reference to FIG. 4.

In the three-dimensional reconfiguration, for example, coordinates and attitudes of cameras in a world coordinates system are calculated under constraints of the epipolar geometry. Furthermore, three-dimensional positions of points in images captured by the cameras are calculated in the world coordinate system.

Figure 4:
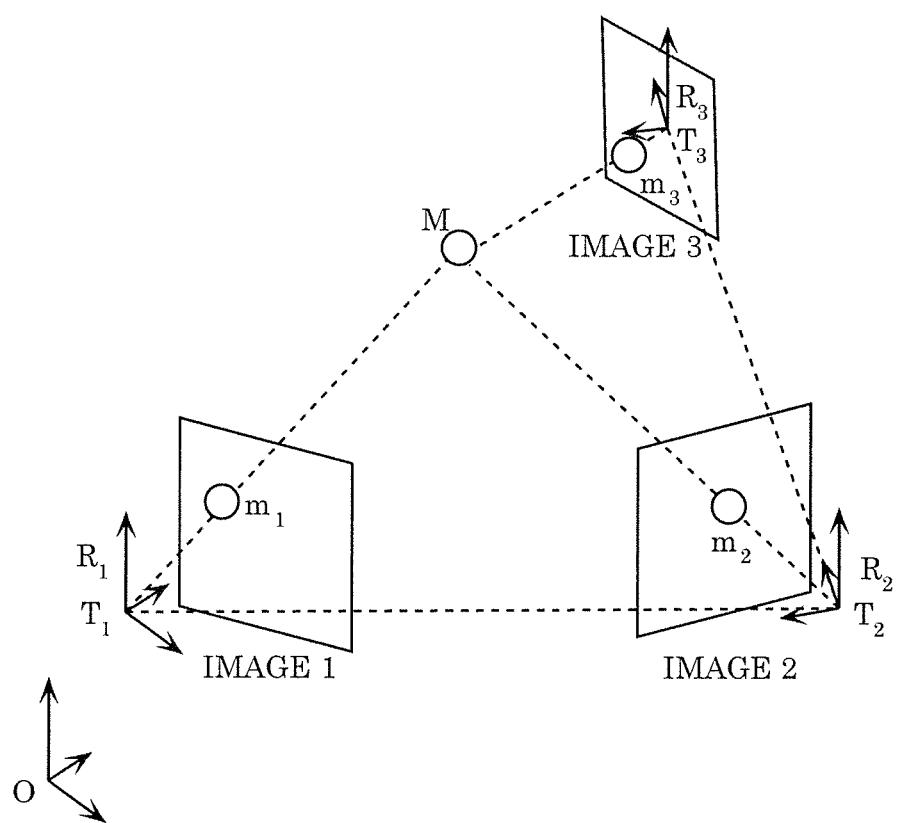
FIG. 4 is a diagram illustrating three-dimensional reconfiguration according to Embodiment 1.

In FIG. 4, 0 denotes an origin of the world coordinate system, and $T_1$, $T_2$, and $T_3$ indicate coordinates of cameras 1, 2, and 3 in the world coordinate system. $R_1$, $R_2$, and $R_3$ indicate inclinations of camera coordinate systems of cameras 1, 2, and 3 relative to the world coordinate system, and M denotes a point on a subject. In addition, $m_1$, $m_2$, and $m_3$ indicate positions of the point M on the subject in images 1, 2, and 3 captured by cameras 1, 2, and 3, respectively.

In order to obtain positions and capture angles of cameras 1, 2, and 3, rotation matrices and translation vectors between cameras 1, 2, and 3 in the world coordinates system need to be calculated. First, a method for calculating the rotation matrix and the translation vector between images 1 and 2 will be described. When the point $m_1=(u_1, v_1, 1)$ in image 1 and the point $m_2=(u_2, v_2, 1)$ correspond to each other, an epipolar equation $m_1^T F m_2 = 0$ holds for the points $m_1$ and $m_2$. Here, F will be referred to as a "fundamental matrix (F matrix)".

On the basis of expression (3), in which an internal parameter K of cameras 1, 2, and 3 is used, the points $m_1$ and $m_2$ can be obtained as expressions (4) and (5), which represent points in the camera coordinate systems. As a result, the epipolar equation can be converted into expression (6).

[MATHEMATICAL FORMULA2]

$$\tilde{m}=K^{-1}m \qquad \text{expression (3)}$$

$$\tilde{m}_1=(x_1,y_1,z_1) \qquad \text{expression (4)}$$

$$\tilde{m}_2=(x_2,y_2,z_2) \qquad \text{expression (5)}$$

$$\tilde{m}_1^T E \tilde{m}_2 = 0 \qquad \text{expression (6)}$$

Here, E will be referred to as an "essential matrix (E matrix)". Each element of the E matrix can be calculated using a plurality of corresponding points. After calculating each element of the F matrix using a plurality of corresponding points, namely, for example, the points $m_1$ and $m_2$ in the images, the E matrix may be obtained using an expression $E K^{-1} F K$. By decomposing the E matrix, a rotation matrix and a translation vector from image 1 to image 2 in the world coordinate system can be obtained.

If a position of camera 1 in the world coordinate system and inclinations of camera 1 relative to the axes of the world coordinate system are known, positions and attitudes of cameras 1 and 2 in the world coordinate system can be obtained using the above relationship. The position and attitude of camera 1 in the world coordinate system may be calculated from sensor information other than a video, or may be measured in advance. Alternatively, the camera coordinate system of camera 1 may be determined as a world coordinate system, and positions and attitudes of the other cameras may be calculated.

The three-dimensional point M in the world coordinate system can be obtained on the basis of a triangle obtained using the rotation matrix and the translation vector between images 1 and 2.

In the present embodiment, the above geometrical relationship is expanded to three or more viewpoints. In an example in which image 3 is added to images 1 and 2, more specifically, E matrices are calculated between images 2 and 3 and between images 1 and 3, and relative rotation matrices and translation vectors are obtained for these cameras. By integrating these pieces of information together, the rotation matrix and translation vector of camera 3, which has captured image 3, in the world coordinate system can be calculated. Alternatively, the rotation matrix and translation vector of image 3 may be calculated in relation to image 1 and to image 2 on the basis of corresponding points. More specifically, corresponding points are obtained between images 1 and 3 and between images 2 and 3. If a point $m_3$ in image 3 corresponding to the point $m_1$ in image 1 and the point $m_2$ in image 2 is obtained, a relationship between the point $m_3$ in image 3 and coordinates in the three-dimensional space can be obtained since the three-dimensional coordinates of the corresponding point M are known. At this time, the following expression (7) holds true.

[MATHEMATICAL FORMULA3]

$$\tilde{m}=PM \qquad \text{expression (6)}$$

Here, P will be referred to as a "perspective matrix (P matrix)". Because P=KE, where P denotes the P matrix, E denotes the E matrix, and E denotes the internal parameter, the E matrix of image 3 can be obtained. The rotation matrix and the translation vector can thus be obtained.

Figure 5:
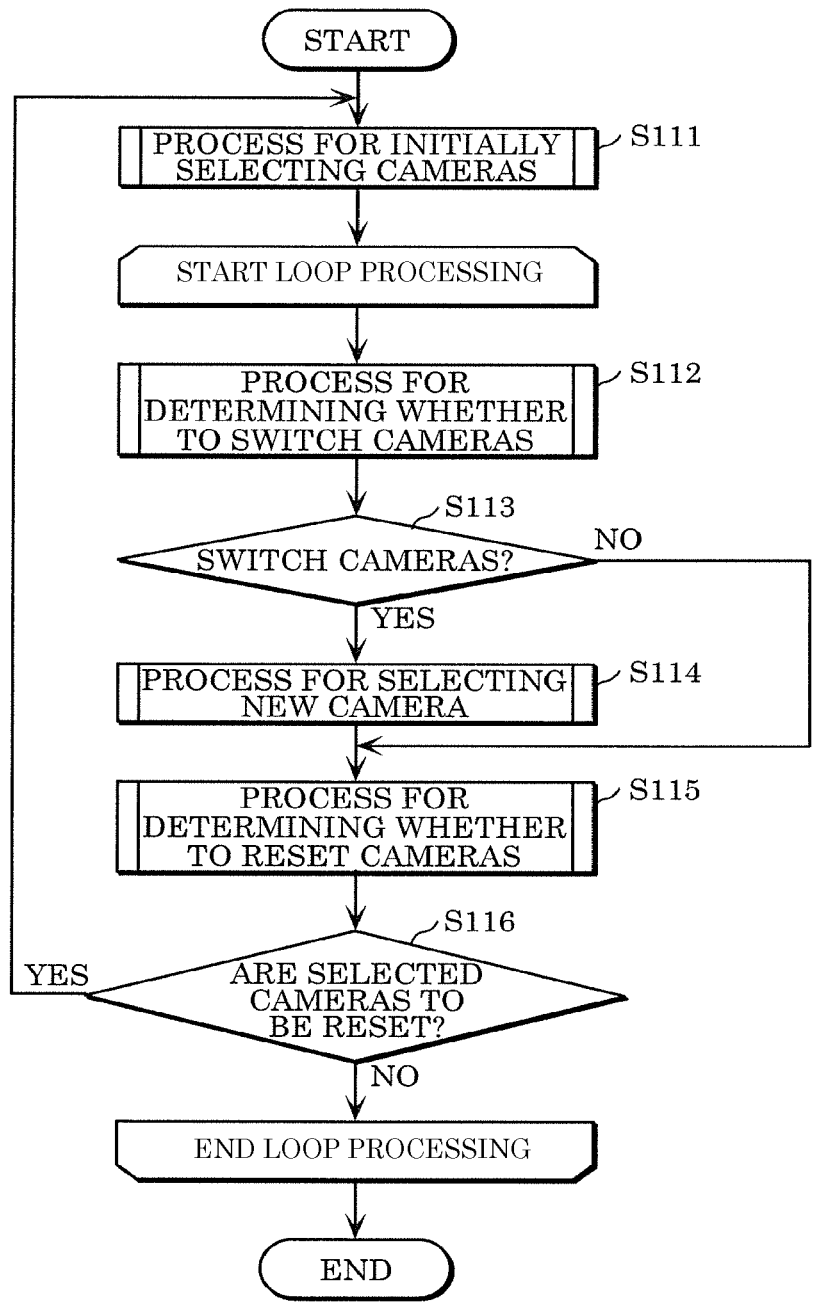
FIG. 5 is a flowchart illustrating a process for selecting videos according to Embodiment 1.

A process for selecting videos performed by the server 103 will be described hereinafter. FIG. 5 is a flowchart illustrating the process for selecting videos performed by the server 103.

First, the initial camera selection unit 115 performs a process for initially selecting cameras (S111). More specifically, the initial camera selection unit 115 selects an arbitrary number of cameras provided for the user from an enormous number of cameras 101 capturing subject. The initial camera selection unit 115 uses the positions and attitudes of the cameras 101 calculated by the camera information calculation unit 114 for the selection.

Next, the camera switching determination unit 116 performs a process for determining whether to switch cameras (S112). More specifically, the camera switching determination unit 116 checks whether each camera capturing a displayed video is capturing a capture target space or a subject, and if not, determines that the camera is to be switched.

If in step S112 the camera switching determination unit 116 determines that the camera is to be switched (yes in S113), the new camera selection unit 117 performs a process for selecting a new camera (S114). More specifically, the camera switching determination unit 116 uses the positions and attitudes of the cameras 101 calculated by the camera information calculation unit 114 for the selection.

If there is no appropriate camera, the new camera selection unit 117 may decrease the number of cameras selected. If there are a plurality of appropriate cameras for the camera to be switched, the new camera selection unit 117 may increase the number of cameras selected.

Next, the reset determination unit 118 performs a process for determining whether to reset cameras (S115). More specifically, if the user 106 has issued a reset instruction, or if the number of cameras selected is zero or equal to or smaller than a threshold, the reset determination unit 118 determines that all the currently selected cameras are to be reset.

If in step S115 the reset determination unit 118 determines that all the currently selected cameras are to be reset (yes in S116), the initial camera selection is newly performed (S111). At this time, the initial camera selection unit 115 may increase or decrease the number of cameras selected in the initial camera selection.

The processing in steps S112 to S116 is repeated at predetermined time intervals.

Figure 6:
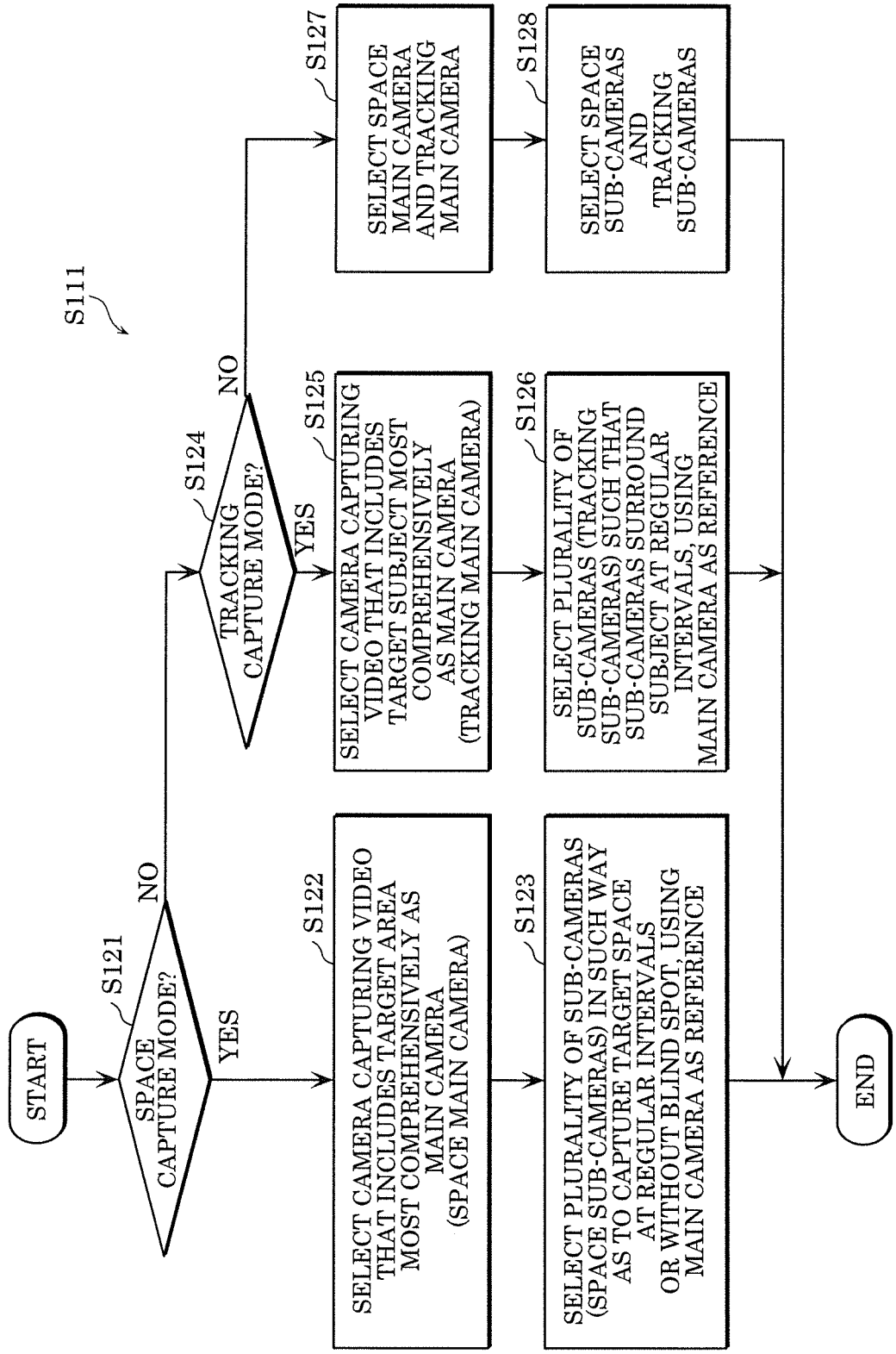
FIG. 6 is a flowchart illustrating a process for initially selecting cameras according to Embodiment 1.

The process for initially selecting cameras (S111 in FIG. 5) performed by the initial camera selection unit 115 will be described hereinafter. FIG. 6 is a flowchart illustrating the process for initially selecting videos (S111).

In the present embodiment, three capture modes, namely a space capture mode, a tracking capture mode, and a hybrid capture mode, are used. Not all three of the modes, however, need to be used; one or two capture modes may be used, instead.

The control unit 113 controls selection of a capture mode. More specifically, the control unit 113 selects the capture mode on the basis of an instruction from the user, occurrence of an event, automatic detection of a tracking target, or the number of cameras selected.

The space capture mode is a mode in which cameras are selected in order to capture a target area, which is an area in a specified actual space. The tracking capture mode is a mode in which cameras are selected in order to track a subject, which is a moving object such as a person or an object in a specified actual space and capture the subject. The hybrid capture mode is a combination of the space capture mode and the tracking capture mode.

If the capture mode is the space capture mode (yes in S121), the initial camera selection unit 115 selects a camera capturing video that most comprehensively includes the target area, which is a three-dimensional area corresponding to an area in a video specified by the user or a three-dimensional area determined to be important as a result of a scene analysis, as a main camera (S122). The selected camera will also be referred to as a "space main camera".

If the three-dimensional reconfiguration has been performed, the initial camera selection unit 115 uses three-dimensional models to associate an area in a video and three-dimensional positions with each other. In the scene analysis, the initial camera selection unit 115 determines a center of a capture target space or a path to the capture target space to be important.

Next, the initial camera selection unit 115 selects a plurality of sub-cameras in such a way as to capture the capture target space at regular intervals or without a blind spot, using the main camera as a reference (S123). These cameras will also be referred to as "space sub-cameras".

On the other hand, if the capture mode is the tracking capture mode (yes in S124), the initial camera selection unit 115 selects a camera capturing video that most comprehensively includes the subject, which is a subject specified by the user or a subject determined to be important as a result of the scene analysis, as a main camera (S125). This camera will also be referred to as a "tracking main camera". If there are a plurality of subjects, the initial camera selection unit 115 selects a main camera for each subject.

In the scene analysis, the initial camera selection unit 115 determines a person whose action is abnormal or a person who is the center of attention in a game to be important.

Note that the initial camera selection unit 115 may select a camera capturing the subject from the front the most as a main camera, rather than a camera capturing video that includes the subject most comprehensively.

Next, the initial camera selection unit 115 selects a plurality of sub-cameras such that the sub-cameras surround the subject at regular intervals, using the main camera as a reference (S126). These cameras will also be referred to as "tracking sub-cameras".

On the other hand, if the capture mode is the hybrid capture mode (no in S121 and S124), the initial camera selection unit 115 selects a space main camera by the same method as in the selection of a main camera in the space capture mode and a tracking main camera by the same method as in the selection of a main camera in the target capture mode (S127).

Next, the initial camera selection unit 115 assigns the number of sub-cameras to the space capture mode and the tracking capture mode at an arbitrary ratio. The initial camera selection unit 115 then selects space sub-cameras by the same method as in the space capture mode and tracking sub-cameras by the same method as in the tracking capture mode (S128).

The determination as to the space capture mode (S121) and the determination as to the tracking capture mode (S124) need not be performed in this order. The order may be reversed, or part or the entirety of determinations may be performed in parallel.

Figure 7:
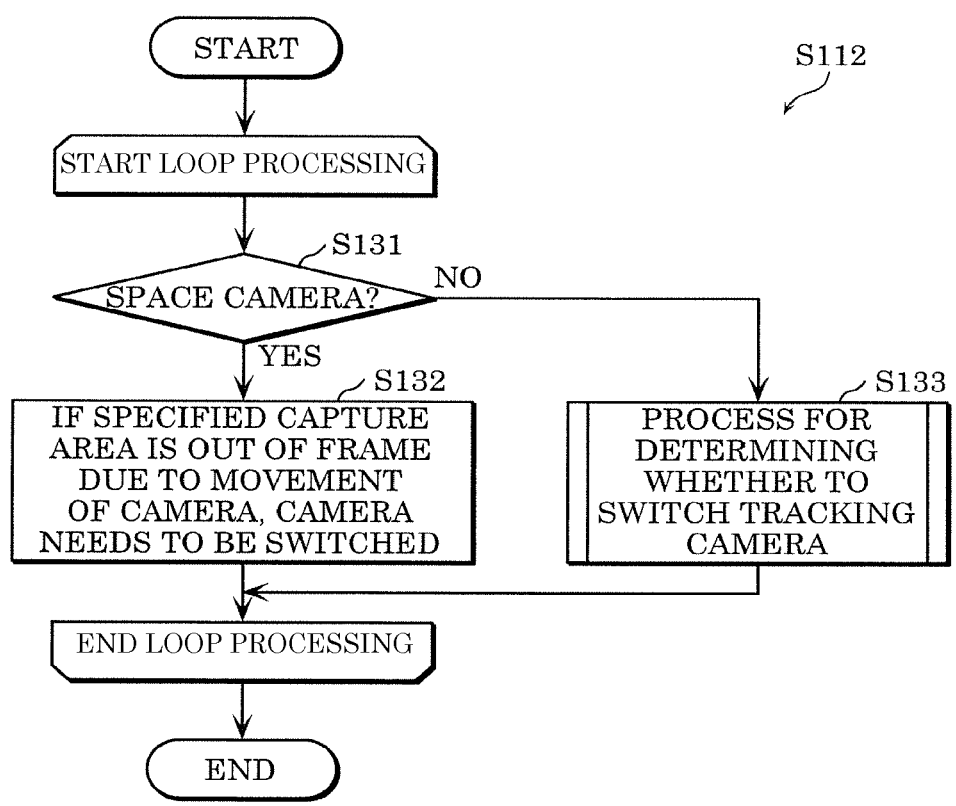
FIG. 7 is a flowchart illustrating a process for determining whether to switch cameras according to Embodiment 1.

The process for determining whether to switch cameras (S112 in FIG. 5) performed by the camera switching determination unit 116 will be described hereinafter. FIG. 7 is a flowchart illustrating the process for determining whether to switch cameras (S112).

The camera switching determination unit 116 performs processing in steps S131 to S133 for each of the cameras selected in the process for initially selecting cameras.

First, the camera switching determination unit 116 determines whether a camera to be subjected to the process (hereinafter referred to as a "target camera") is a space camera (a space main camera or a space sub-camera) (S131).

If the target camera is a space camera (yes in S131) and a specified capture area is out of the frame due to movement of the target camera, the camera switching determination unit 116 determines that the target camera needs to be switched (S132). More specifically, if the amount of movement of the target camera or a change in the capture angle of the target camera exceeds a threshold for the movement of the target camera or the capture angle of the target camera set in advance in accordance with an angle of view of the target camera 101, the camera switching determination unit 116 determines that the capture area is out of the frame.

On the other hand, if the target camera is a tracking camera (a tracking main camera or a tracking sub-camera) (no in S131), the camera switching determination unit 116 performs a process for determining whether to switch a tracking camera (S133). If the three-dimensional reconfiguration has been performed in a process for obtaining camera information, for example, the camera switching determination unit 116 tracks the subject using three-dimensional models.

Figure 8:
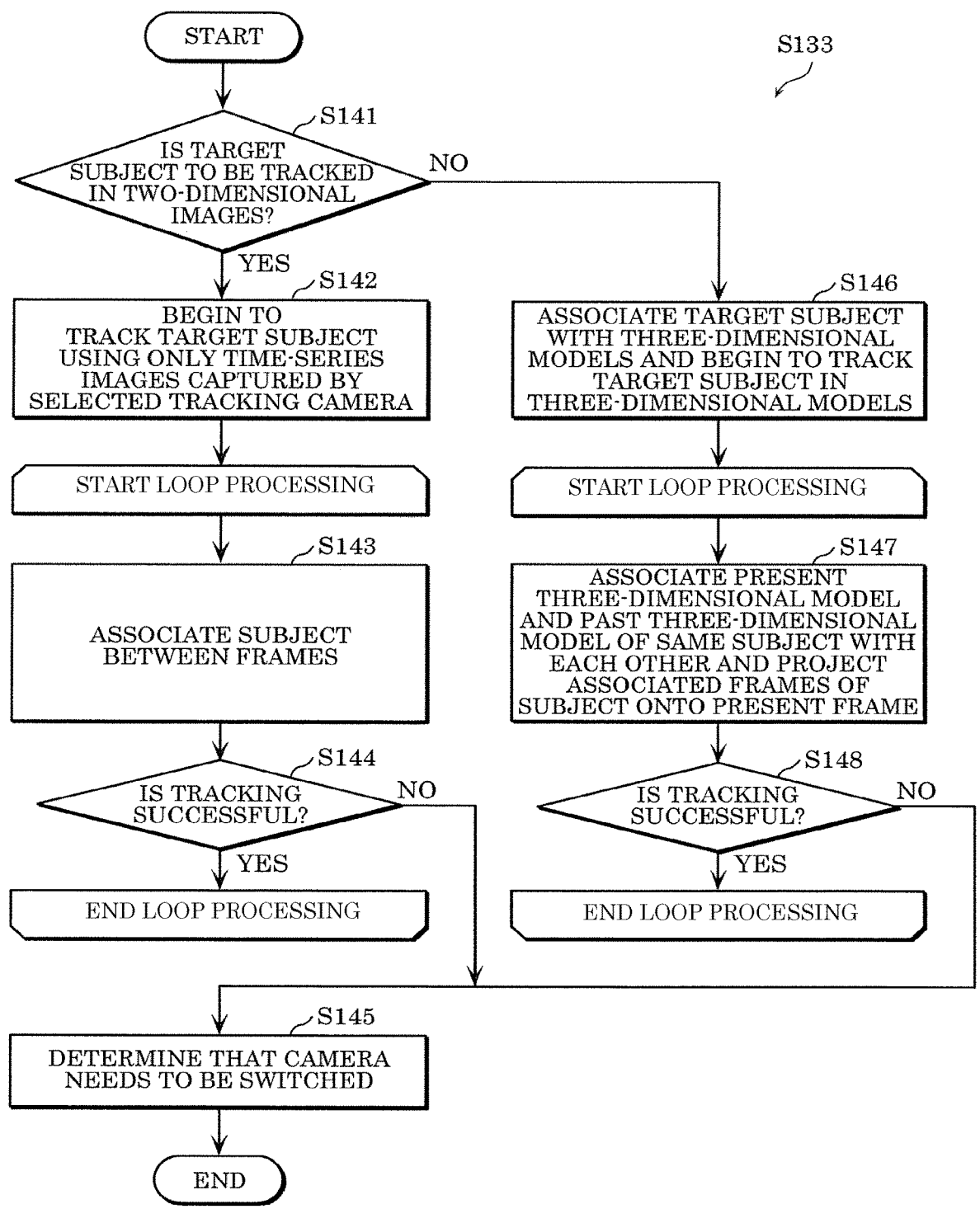
FIG. 8 is a flowchart illustrating a process for determining whether to switch a tracking camera according to Embodiment 1.

The process for determining whether to switch a tracking camera (S133 in FIG. 7) will be described hereinafter. FIG. 8 is a flowchart illustrating the process for determining whether to switch a tracking camera (S133).

First, the camera switching determination unit 116 determines whether to track the subject in two-dimensional images or three-dimensional models (S141). More specifically, if the three-dimensional reconfiguration has not been performed, the camera switching determination unit 116 determines that the camera switching determination unit 116 tracks the subject in two-dimensional images. If the three-dimensional reconfiguration has been performed, the camera switching determination unit 116 determines whether to track the subject in two-dimensional images or three-dimensional models on the basis of an allowable load of the server, a required tracking accuracy, or an instruction from the user.

The camera switching determination unit 116 need not selectively perform the tracking in two-dimensional images and the tracking in three-dimensional models but may perform either of the two.

If the camera switching determination unit 116 tracks the subject in two-dimensional images (yes in S141), the camera switching determination unit 116 begins to track the subject, which has been specified as a result of a scene analysis or by the user, using a time series of images captured by a selected tracking camera (S142).

The camera switching determination unit 116 associates the same subject between a present frame and a past frame at a frame rate used for the capturing (S143).

If the tracking is successful (yes in S144), that is, if the association of the subject is successful, the camera switching determination unit 116 performs processing in step S143 and later for a next frame. On the other hand, if the tracking fails (no in S144), that is, if the association of the subject fails, the camera switching determination unit 116 determines that the selected camera can no longer track the subject and needs to be switched (S145).

On the other hand, if the camera switching determination unit 116 tracks the subject in three-dimensional models (no in S141), the camera switching determination unit 116 associates the subject with the three-dimensional models and begins to track the subject in the three-dimensional models (S146).

The camera switching determination unit 116 associates a present three-dimensional model and a past three-dimensional model of the same subject with each other at the frame rate used for the capturing. The camera switching determination unit 116 then projects the associated frames of the subject onto a present frame of a selected tracking camera (S147).

If the tracking is successful, that is, if the three-dimensional models have been associated between frames and the subject is included in the present frame obtained as a result of the projection (yes in S148), the camera switching determination unit 116 performs the processing in step S147 and later for a next frame. On the other hand, if the tracking fails (no in S148), that is, if the association of the three-dimensional models between frames fails, or if the present frame obtained as a result of the projection does not include subject, the camera switching determination unit 116 determines that the selected camera can no longer track the subject and needs to be switched (S145).

The process for determining whether to switch a tracking camera and a process for selecting a new tracking camera can be performed when the camera switching determination unit 116 tracks the subject only in two-dimensional images, when the camera switching determination unit 116 tracks the subject only in three-dimensional models, and when the camera switching determination unit 116 tracks the subject using both two-dimensional images and three-dimensional models. Details of these cases will be described later with reference to FIGS. 10 to 12.

Figure 9:
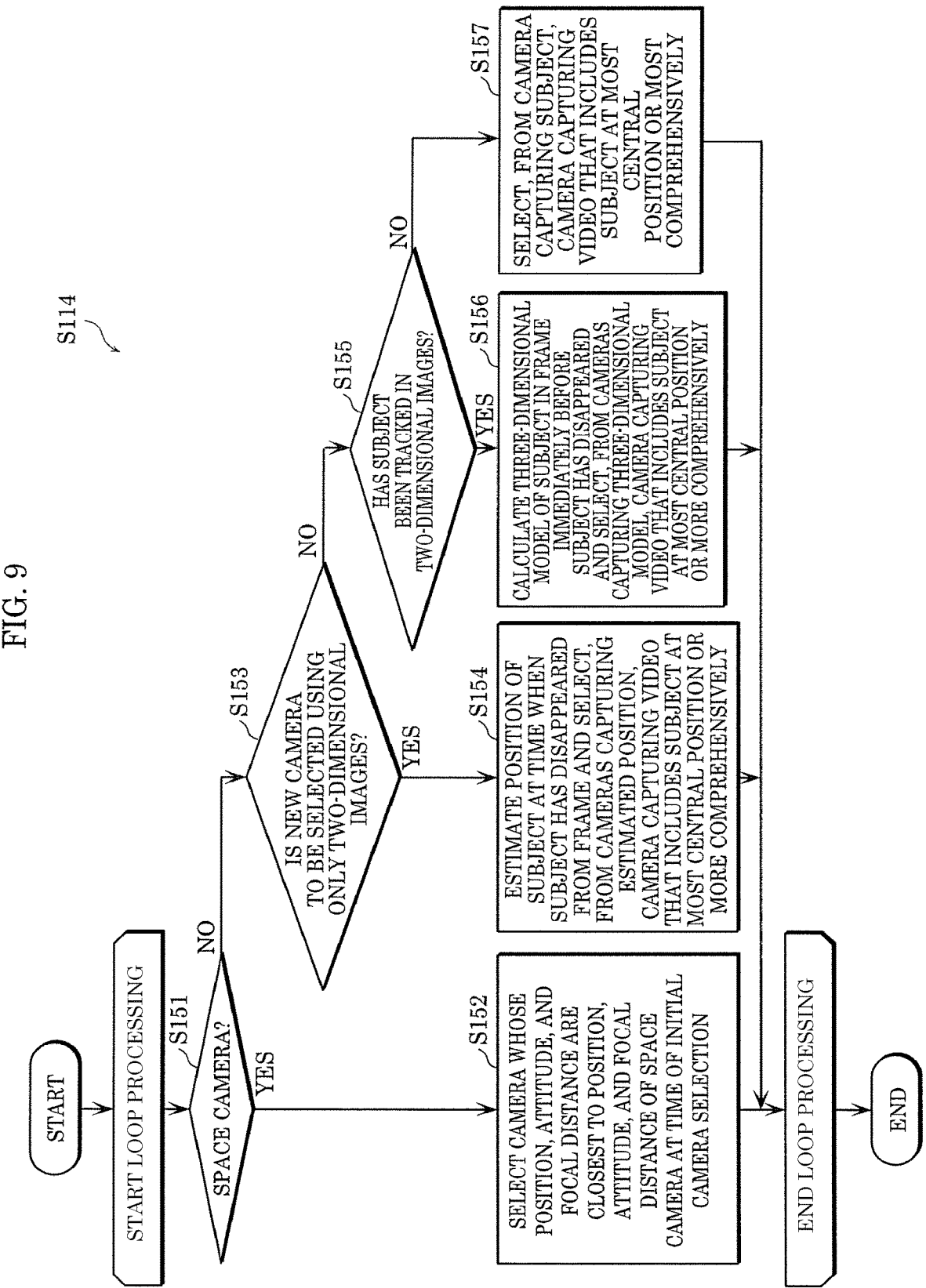
FIG. 9 is a flowchart illustrating a process for selecting a new camera according to Embodiment 1.

The process for selecting a new camera (S114 in FIG. 5) will be described hereinafter. FIG. 9 is a flowchart illustrating the process for selecting a new camera (S114).

Processing in steps S151 to S157 illustrated in FIG. 9 is performed for each camera determined to require switching.

If a target camera is a space camera (yes in S151), the new camera selection unit 117 selects, from a plurality of candidate cameras located within an arbitrarily set range, a camera whose position, attitude, and focal distance are closest to a position, an attitude, and a focal distance of the space camera at a time of the initial camera selection as a new space camera (S152).

More specifically, the following evaluation expression (8) is used.

$$\text{Score} = w1^*(pos(cA) - pos(cB))\wedge 2 + \\ w2^*(dir(cA) - dir(cB))\wedge 2 + \\ w3^*(\text{for}(cA) - \text{for}(cB))\wedge 2 \qquad \text{Expression (8)}$$

Here, w1, w2, and w3 are weighting coefficients, pos(ck) denotes a position of a camera k, dir(ck) denotes an attitude of the camera k, for(ck) denotes a focal distance of the camera k, cA denotes the space camera before the switching, and cB indicates a candidate camera.

If the evaluation expression is used, the new camera selection unit 117 selects one of the plurality of candidate cameras whose score is smallest as a new space camera.

On the other hand, if the target camera is a tracking camera (no in S151), the new camera selection unit 117 determines whether to select a new camera using two-dimensional images or three-dimensional models (S153). The determination method, for example, is the same as that used in step S141.

If a new camera is selected using two-dimensional images (yes in S153), the new camera selection unit 117 estimates a position of a subject tracked by the camera switching determination unit 116 at a time when the subject has disappeared from a frame. The new camera selection unit 117 then selects, from cameras capturing the estimated position, a camera capturing video that includes the subject at a most central position or most comprehensively (S154).

On the other hand, if a new camera is selected using three-dimensional models (no in S153), the new camera selection unit 117 determines whether the subject has been tracked in two-dimensional images or three-dimensional models in the process for determining whether to switch cameras (S155).

If the subject has been tracked in two-dimensional images (yes in S155), the new camera selection unit 117 calculates a three-dimensional model of the subject tracked by the camera switching determination unit 116 for a frame immediately before the subject has disappeared. The new camera selection unit 117 then selects, from cameras capturing images of the three-dimensional model, a camera capturing video that includes the subject at a most central position or most comprehensively (S156).

On the other hand, if the subject has been tracked in three-dimensional models (no in S155), the new camera selection unit 117 selects, from cameras capturing the subject tracked by the camera switching determination unit 116, a camera capturing video that includes the subject at a most central position or most comprehensively (S157).

If there is no camera appropriate for switching by any switching method, the new camera selection unit 117 need not perform switching and may decrease the number of cameras selected. If there are a plurality of cameras appropriate for switching, the new camera selection unit 117 may increase the number of cameras selected.

The determination as to the capture mode (S151), the determination as to the switching method (S153), and the determination as to the tracking method (S155) need not be performed in this order. The order may be arbitrarily determined, or part or the entirety of some or all of the determinations may be performed in parallel.

Figure 10:
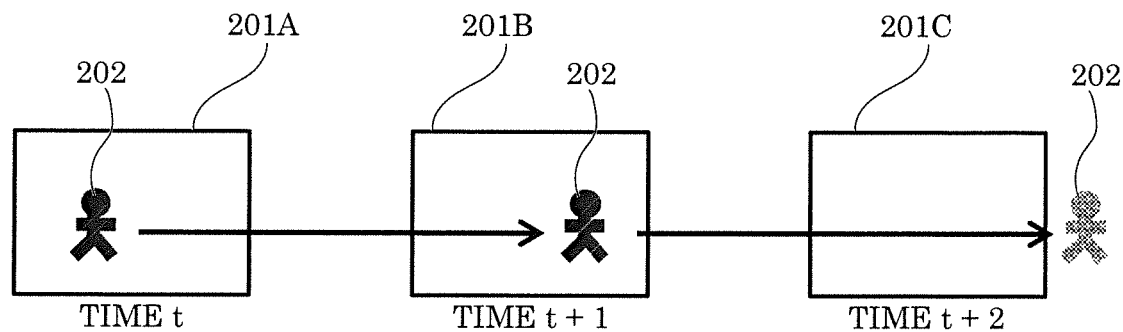
FIG. 10 is a diagram illustrating an operation for tracking a subject using two-dimensional images according to Embodiment 1.
Figure 11:
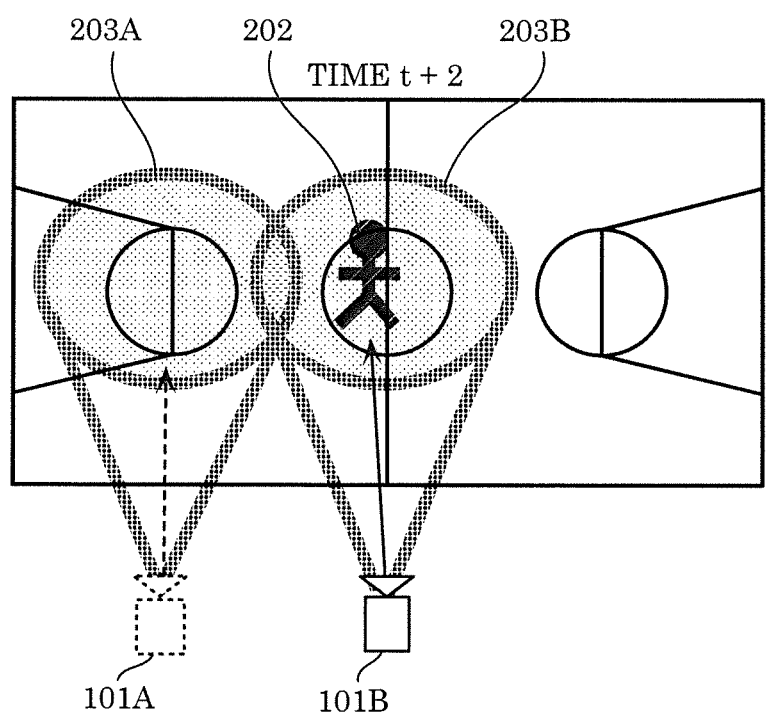
FIG. 11 is a diagram illustrating the operation for tracking a subject using two-dimensional images according to Embodiment 1.

An operation for tracking a subject using two-dimensional images in the process for determining whether to switch a tracking camera and the process for selecting a new camera will be described in detail hereinafter. FIGS. 10 and 11 are diagrams illustrating the operation.

FIG. 10 is a diagram illustrating frames 201A, 201B, and 201C captured by a tracking camera at times t, t+1, and t+2, respectively.

First, at the time t+1, the camera switching determination unit 116 tracks a subject 202 by associating the frame 201B at the time t+1 and the frame 201A at the time t with each other. Frames to be associated with each other need not be consecutive frames. Frames separated from each other by one or more frames may be associated with each other, or three or more frames including a future frame, namely, for example, the frame at the time t+2, may be associated with one another.

More specifically, the camera switching determination unit 116 associates frames through template matching of a rectangular area surrounding the subject. Alternatively, the camera switching determination unit 116 may integrate results of template matching for sub-areas obtained by dividing the rectangular area and associate frames using a result of the integration, or may associate frames by associating a plurality of feature points or local feature values on the subject with one another.

Alternatively, the camera switching determination unit 116 may track the subject through online learning in which a subject area is determined as a correct area and nearby areas are determined as incorrect areas.

The camera switching determination unit 116 need not track the subject using one selected camera. The camera switching determination unit 116 may track the subject using a plurality of cameras including the selected camera, integrate results of the tracking performed by the plurality of cameras, and track the subject using a result of the integration. The camera switching determination unit 116 detects the same subjects captured by the cameras, for example, by performing particular object identification using a database obtained in advance by learning video of the subject captured from a plurality of viewpoints.

At the time t+2, the subject 202 moves out of frame of the tracking camera. FIG. 11 is a diagram illustrating an actual space at the time t+2. A camera 101A is a selected tracking camera and is capturing an area 203A.

Since the subject 202 has moved out of frame at the time t+2, the camera switching determination unit 116 determines that the camera needs to be switched.

The new camera selection unit 117 calculates the area 203A whose image is being captured by the camera on the basis of a position, an attitude, and a focal distance of the selected tracking camera calculated by the camera information calculation unit 114. The new camera selection unit 117 estimates that the subject 202 who has moved out of frame is located near a right end of the area 203A.

The new camera selection unit 117 then selects, from a plurality of cameras capturing an area near the right end of the area 203A, a camera 101B, which is capturing video that includes the subject 202 at a most central position or most comprehensively, as a new tracking camera. In this example, the camera 101B is capturing an area 203B including the subject 202.

In order to continue the tracking, the subject 202 needs to be identified in the image captured by the camera 101B. The new camera selection unit 117, for example, associates a frame of the camera 101A at the time t+1 and a frame of the camera 101B at the time t+2 with each other. The new camera selection unit 117 associates the frames with each other, for example, by the same method as for associating frames of the camera 101A.

In order to correct a difference between fields of view of the cameras 101A and 101B, the new camera selection unit 117 may track the subject using frames obtained as a result of a projective transformation based on camera information such as positions, attitudes, and focal distances of the cameras 101A and 101B.

The camera switching is performed not only when the subject has moved out of frame but also when the subject is included in a field of view of a selected tracking camera but has disappeared from the frame due to occlusion.

The new camera selection unit 117 need not necessarily switch a camera immediately after the subject disappears from a frame. The new camera selection unit 117 may continue estimating the movement of the subject even after the disappearance and wait until the subject appears in a frame again, instead. That is, the new camera selection unit 117 may perform camera switching if the subject is not included in a frame for a predetermined period of time (a plurality of frames).

Figure 12:
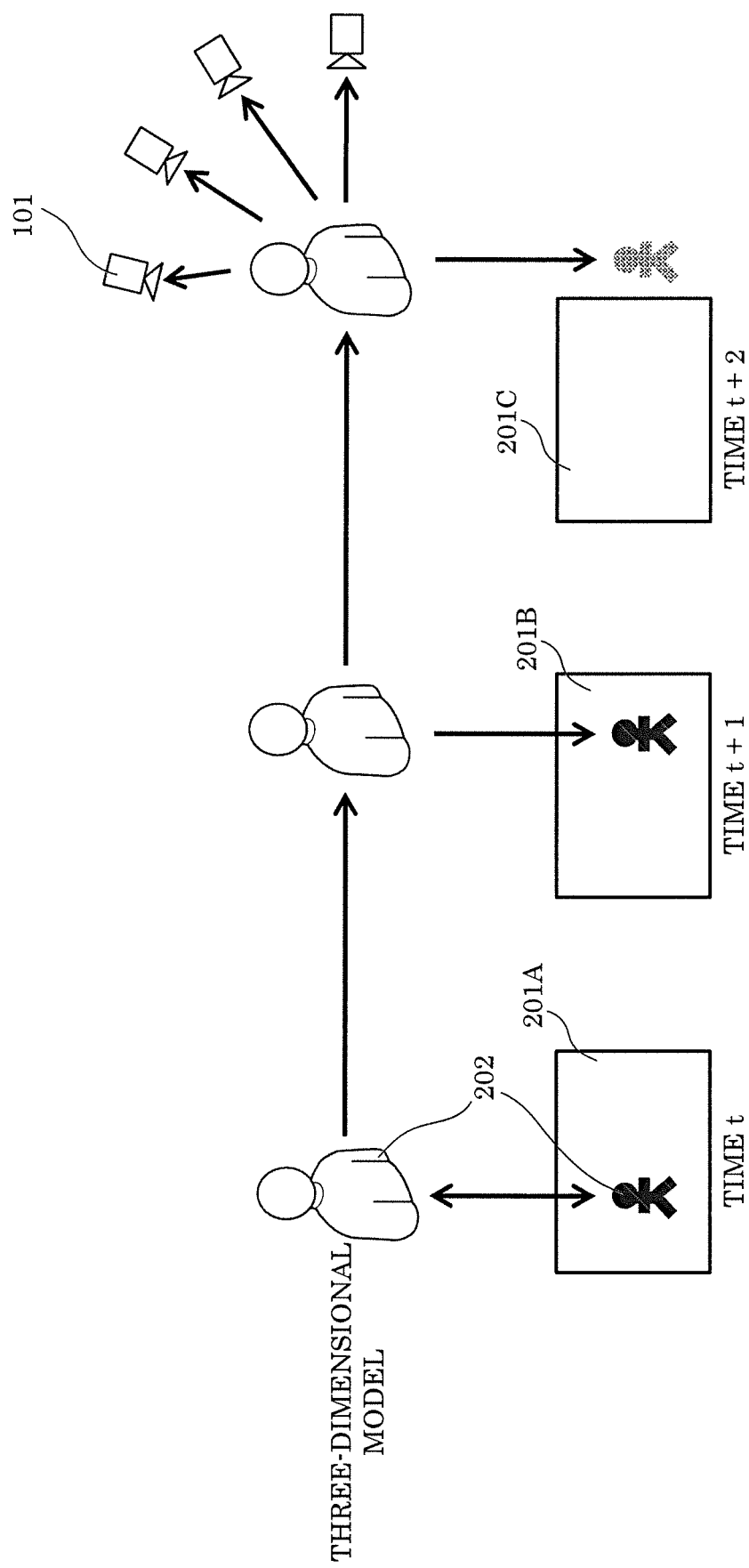
FIG. 12 is a diagram illustrating an operation for tracking the subject using three-dimensional models according to Embodiment 1.

An operation for tracking the subject using three-dimensional models in the process for determining whether to switch a tracking camera and the process for selecting a new camera will be described in detail hereinafter. FIG. 12 is a diagram illustrating the operation.

First, if the subject 202 to be tracked is specified in the image (frame 201A) at the time t, the subject 202 in the image needs to be identified in a three-dimensional model.

The camera switching determination unit 116 calculates a perspective projection matrix between the image and the three-dimensional space on the basis of a position, an attitude, and a focal distance of a selected tracking camera calculated by the camera information calculation unit 114. The camera switching determination unit 116 then identifies the subject 202 in the three-dimensional model by projecting feature points on the subject 202 in the image onto the three-dimensional space using the perspective projection matrix.

At the time t+1, the camera switching determination unit 116 tracks the subject 202 by associating a three-dimensional model at the time t+1 and the three-dimensional model at the time t with each other. The camera switching determination unit 116 need not associate three-dimensional models at consecutive times with each other. The camera switching determination unit 116 may associate three-dimensional models at two times separated from each other by one or more times (frames) with each other, or may associate three-dimensional models at three or more times including a future three-dimensional model, namely, for example, a three-dimensional model at the time t+2, with one another.

More specifically, the camera switching determination unit 116 associates three-dimensional models with each other through matching of a voxel surrounding the subject. The camera switching determination unit 116 may integrate results of matching of sub-voxels obtained by dividing the voxel and associate three-dimensional models with each other using a result of the integration, or may associate three-dimensional models with each other by associating a plurality of three-dimensional feature points or three-dimensional local feature values on the subject with one another.

Alternatively, the camera switching determination unit 116 may track the subject through online learning in which a subject area is determined as a correct area and nearby areas are determined as incorrect areas.

During the tracking, the camera switching determination unit 116 projects the subject 202 in the three-dimensional model at each time onto an image plane at each time and checks whether the subject 202 is included in the field of view of the tracking camera. More specifically, the camera switching determination unit 116 projects the subject 202 by the same method as for the association between the image and the three-dimensional model at the time t.

At the time t+2, the subject 202 moves out of frame of the tracking camera. In order to select a new tracking camera, the new camera selection unit 117 projects the three-dimensional model of the subject 202 onto an image plane of each camera 101. The new camera selection unit 117 projects the three-dimensional model by the same method as for the association between the image and the three-dimensional model at the time t.

The new camera selection unit 117 then selects a camera 101 capturing an image that includes the subject 202 at a most central position or most comprehensively as a new tracking camera.

As in the case described with reference to FIGS. 10 and 11 in which two-dimensional images are used, the camera switching is performed not only when the subject has moved out of frame but also when the subject is included in a field of view of a selected tracking camera but has disappeared from the frame due to occlusion.

The new camera selection unit 117 need not necessarily switch a camera immediately after the subject disappears from a frame. The new camera selection unit 117 may continue estimating the movement of the subject even after the disappearance and wait until the subject appears in a frame again, instead.

Figure 13:
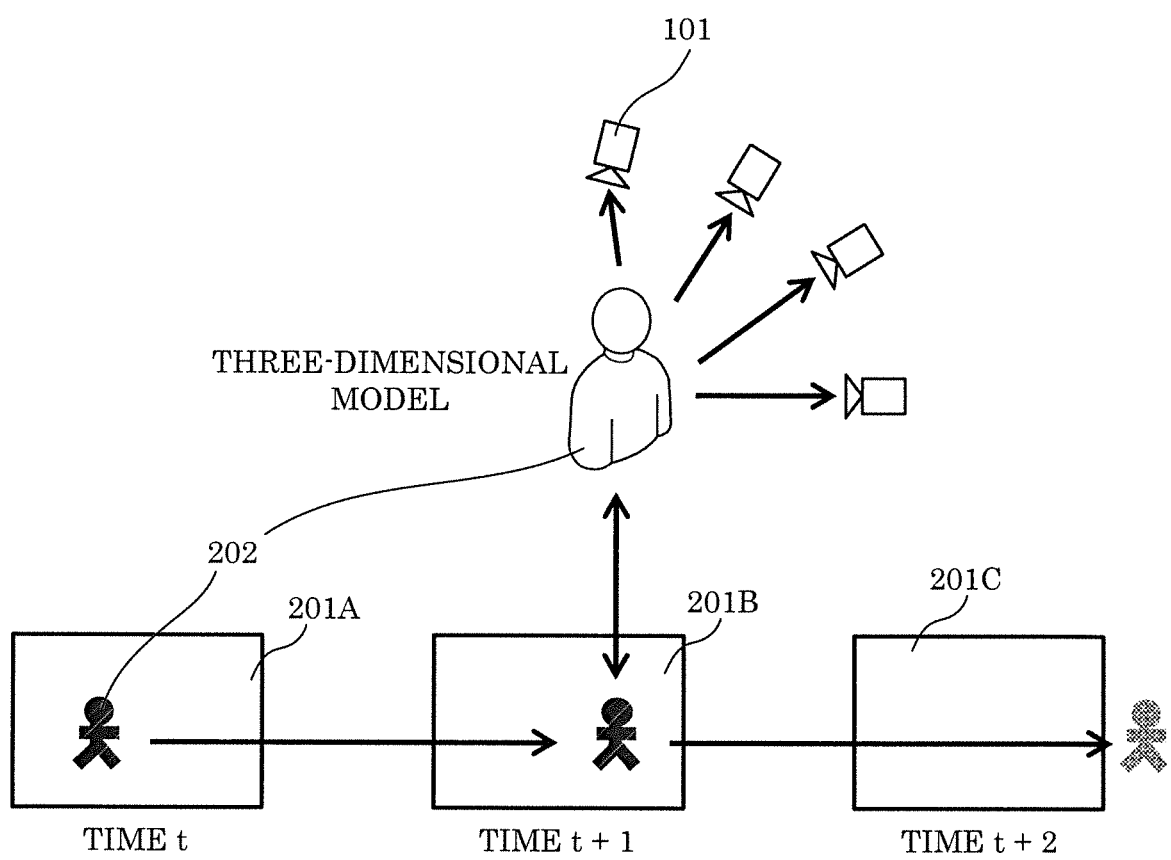
FIG. 13 is a diagram illustrating an operation for tracking the subject using two-dimensional images and three-dimensional models according to Embodiment 1.

An operation for tracking the subject using both two-dimensional images and three-dimensional models in the process for determining whether to switch a tracking camera and the process for selecting a new camera will be described in detail hereinafter. FIG. 13 is a diagram illustrating the operation.

At the time t, the camera switching determination unit 116 tracks the subject 202 by the same method as that used when, as illustrated in FIG. 10, only two-dimensional images are used.

Since the tracking camera has lost sight of the subject 202 at the time t+2, the new camera selection unit 117 selects a new tracking camera using the frame 201B at the time t+1, which is a last time that the tracking of the subject 202 has been successful, and the three-dimensional model at the time t+1.

The camera switching determination unit 116 associates the subject 202 in the frame 201B at the time t+1 and the subject 202 in the three-dimensional model at the time t+1 with each other by the same method as that used when, as illustrated in FIG. 10, only two-dimensional images are used. The new camera selection unit 117 selects a new tracking camera on the basis of three-dimensional models by the same method described with reference to FIG. 12. The camera switching determination unit 116 continues tracking the subject 202 by the same method described with reference to FIGS. 10 and 11 using a time series of images captured by the new tracking camera.

As in the cases described with reference to FIGS. 10 to 12, the camera switching is performed not only when the subject has moved out of frame but also when the subject is included in a field of view of a selected tracking camera but has disappeared from the frame due to occlusion.

The new camera selection unit 117 need not necessarily switch a camera immediately after the subject disappears from a frame. The new camera selection unit 117 may continue estimating the movement of the subject even after the disappearance and wait until the subject appears in a frame again, instead.

In the cases described with reference to FIGS. 12 and 13, the camera information calculation unit 114 may calculate the positions, attitudes, and focal distances of the cameras and the camera switching determination unit 116 may reconfigure three-dimensional models of the subject 202. In this case, the camera switching determination unit 116 may use videos captured by all the cameras 101, videos including the subject 202, or videos of a selected tracking camera and nearby cameras 101.

In the tracking of the subject in the process for determining whether to switch a tracking camera described with reference to FIGS. 8 and 10 to 13, the camera switching determination unit 116 may select cameras suitable to track the subject separately from a selected camera used for displaying video for the user and track the subject using these cameras.

Figure 14:
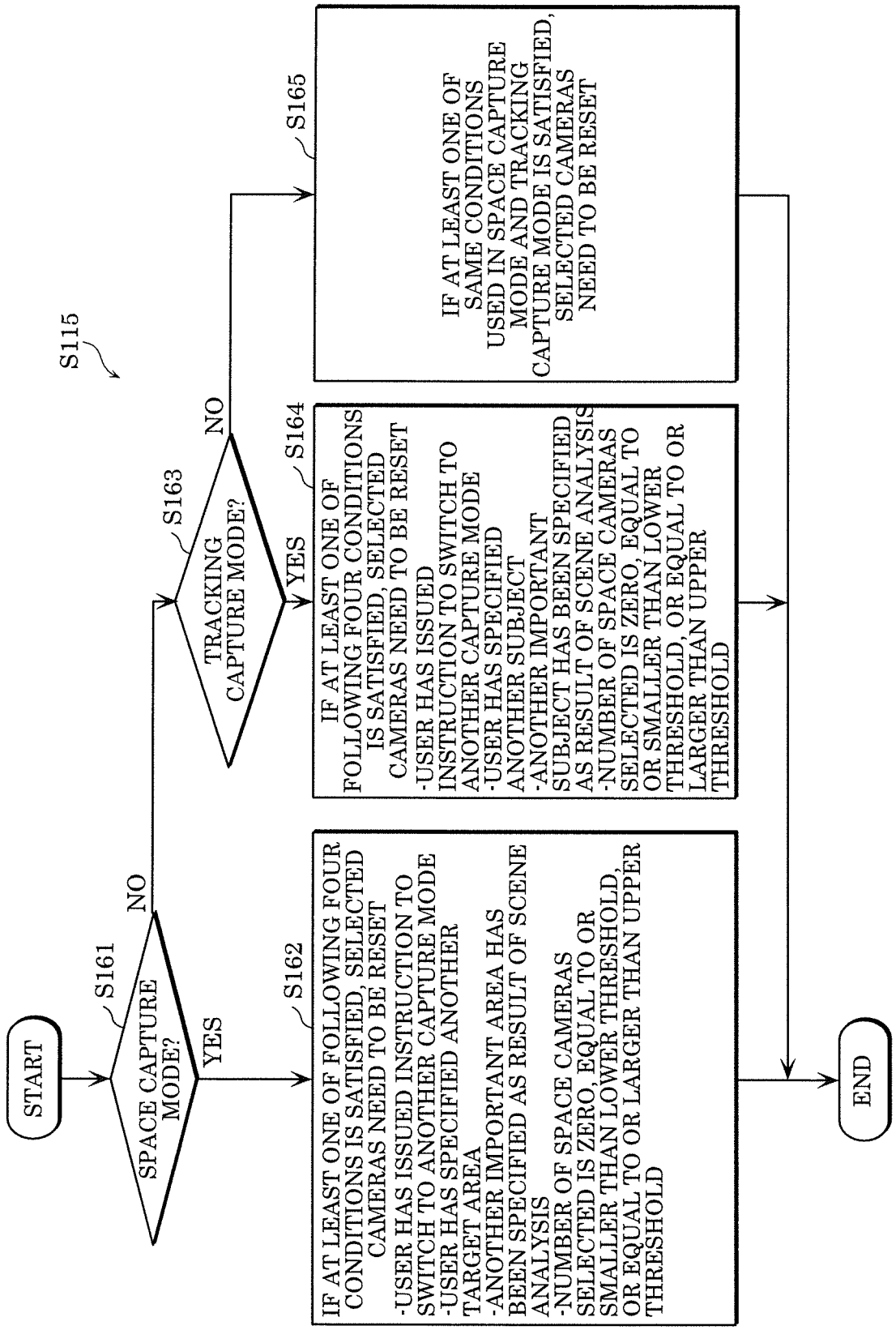
FIG. 14 is a flowchart illustrating a process for determining whether to reset cameras according to Embodiment 1.

The process for determining whether to reset cameras (S115 in FIG. 5) will be described hereinafter. FIG. 14 is a flowchart illustrating the process for determining whether to reset cameras (S115).

If the capture mode is the space capture mode (yes in S161) and at least one of the following four conditions is satisfied, the reset determination unit 118 determines that selected cameras 101 need to be reset (S162). (1) The user has issued an instruction to switch to another capture mode. (2) The user has specified another target area. (3) Another important area (target area) has been specified as a result of a scene analysis. (4) The number of space cameras selected is zero, equal to or smaller than a lower threshold, or equal to or larger than an upper threshold.

If the capture mode is the tracking capture mode (yes in S163) and at least one of the following four conditions is satisfied, the reset determination unit 118 determines that selected cameras need to be reset (S164). (1) The user has issued an instruction to switch to another capture mode. (2) The user has specified another subject. (3) Another important subject has been specified as a result of a scene analysis. (4) The number of tracking cameras selected is zero, equal to or smaller than a lower threshold, or equal to or larger than an upper threshold.

If the capture mode is the hybrid capture mode (no in S161 and S163) and at least one of the same conditions used in the space capture mode and the tracking capture mode is satisfied, the reset determination unit 118 determines that selected cameras need to be reset (S165).

Figure 15:
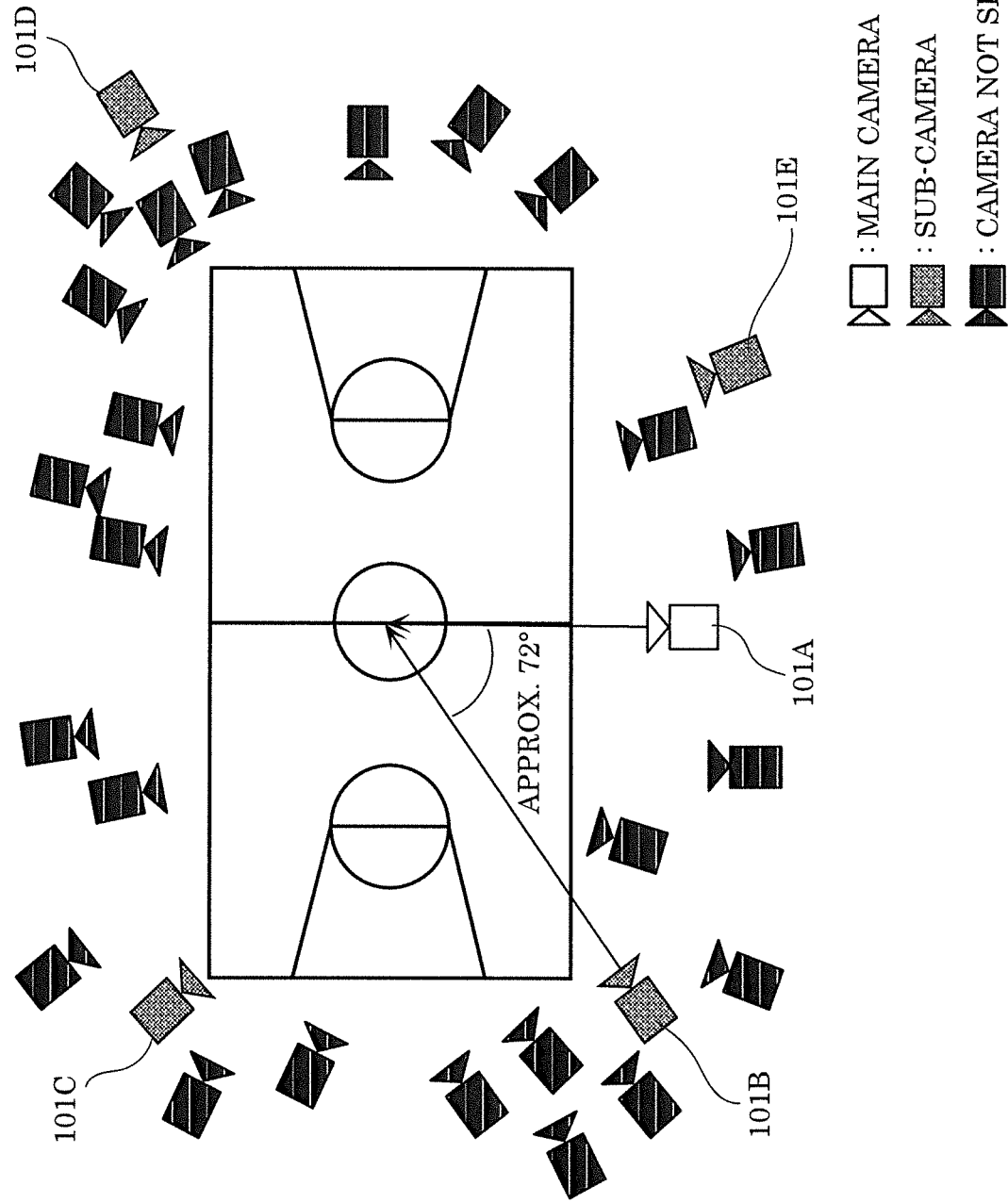
FIG. 15 is a diagram illustrating an example of selection of cameras in an event space in a space capture mode according to Embodiment 1.
Figure 16:
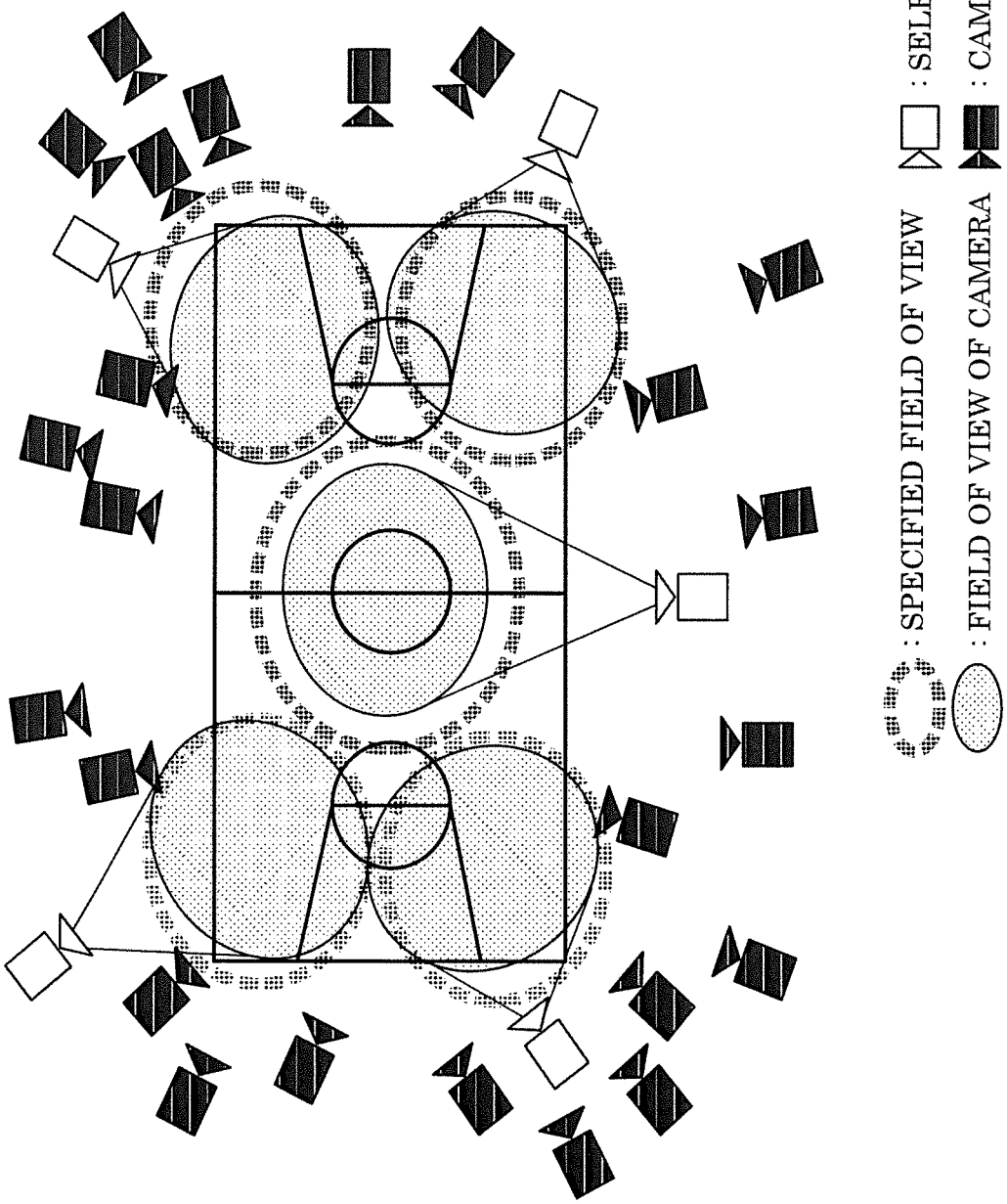
FIG. 16 is a diagram illustrating another example of the selection of cameras in the event space in the space capture mode according to Embodiment 1.

A specific example of the selection of cameras in an event space (e.g., a stadium or a concert hall) in the space capture mode will be described hereinafter. FIGS. 15 and 16 are diagrams illustrating the specific example of the selection of cameras in an event space in the space capture mode.

First, an example will be described with reference to FIG. 15 in which a plurality of cameras are selected at regular intervals.

The initial camera selection unit 115 selects, as a main camera, a camera 101A capturing video that most comprehensively includes a target area, which is a three-dimensional area corresponding to an area in a video specified by the user or a three-dimensional region determined to be important as a result of a scene analysis. The initial camera selection unit 115 also selects sub-cameras at regular capture angle intervals on the basis of a position of the main camera.

The server 103 may output information indicating whether each selected camera is a main camera or a sub-camera, as well as a result of the selection of cameras. The information is used by a display application.

As illustrated in FIG. 15, an event space where a spectator stand is provided in such a way as to surround a basketball court 360 degrees will be taken as an example.

The initial camera selection unit 115 selects sub-cameras 101B to 101E at regular intervals on the basis of a position of the main camera 101A so that the user can view a game from various angles. The main camera 101A may be a camera closest to a position specified by the user, a camera capturing video that includes the position specified by the user at a most central position or most comprehensively, or a camera closest to seats from which visibility of the game is the best, which are determined in advance.

The sub-cameras 101B to 101E are selected on the basis of the position of the main camera 101A and a position of a center of the event space.

If the initial camera selection unit 115 selects a total of five cameras including the main camera and the sub-cameras, for example, the initial camera selection unit 115 selects the sub-cameras at intervals of about 72° with a center of a center circle, which is located at the center of the event space, determined as an origin and an angle of the main camera determined as 0°. An angle relative to the origin is calculated on the basis of a position and a capture angle of each camera. The origin need not necessarily be the center of the event space, but may be a position of a hoop, an electric bulletin board, or a bench, instead.

Alternatively, the initial camera selection unit 115 may calculate intervals of cameras for every combination of five cameras capturing the specified position and select a combination in which five cameras are arranged at most regular intervals with the center of the center circle determined as the origin. In this case, each camera need not be classified as a main camera or a sub-camera.

Next, an example will be described with reference to FIG. 16 in which cameras 101 are selected on the basis of fields of view. As illustrated in FIG. 16, an event space where a spectator stand is provided in such a way as to surround a basketball court 360 degrees will be taken as an example.

The initial camera selection unit 115 selects space cameras capturing the basketball court, which is the event space, without a blind spot so that the user can watch a game from various angles.

If the initial camera selection unit 115 selects five cameras, for example, the initial camera selection unit 115 determines fields of view of the five cameras in advance. The fields of view may be selected by the user, or may be selected by the initial camera selection unit 115 in such a way as to divide the basketball court into five equal parts.

The initial camera selection unit 115 selects cameras whose fields of view are closest to the predetermined fields of view as space cameras. The initial camera selection unit 115 calculates a field of view of each camera on the basis of a position, an attitude, and a focal distance of each camera.

The initial camera selection unit 115 may determine the fields of view without overlap so that the user can watch seamlessly connected videos when a selected camera is switched. If videos captured by selected cameras can be combined with one other to generate a panoramic video and the video can be displayed by a display application, the initial camera selection unit 115 may determine the fields of view such that the videos overlap with one another for the purpose of combining.

Figure 17:
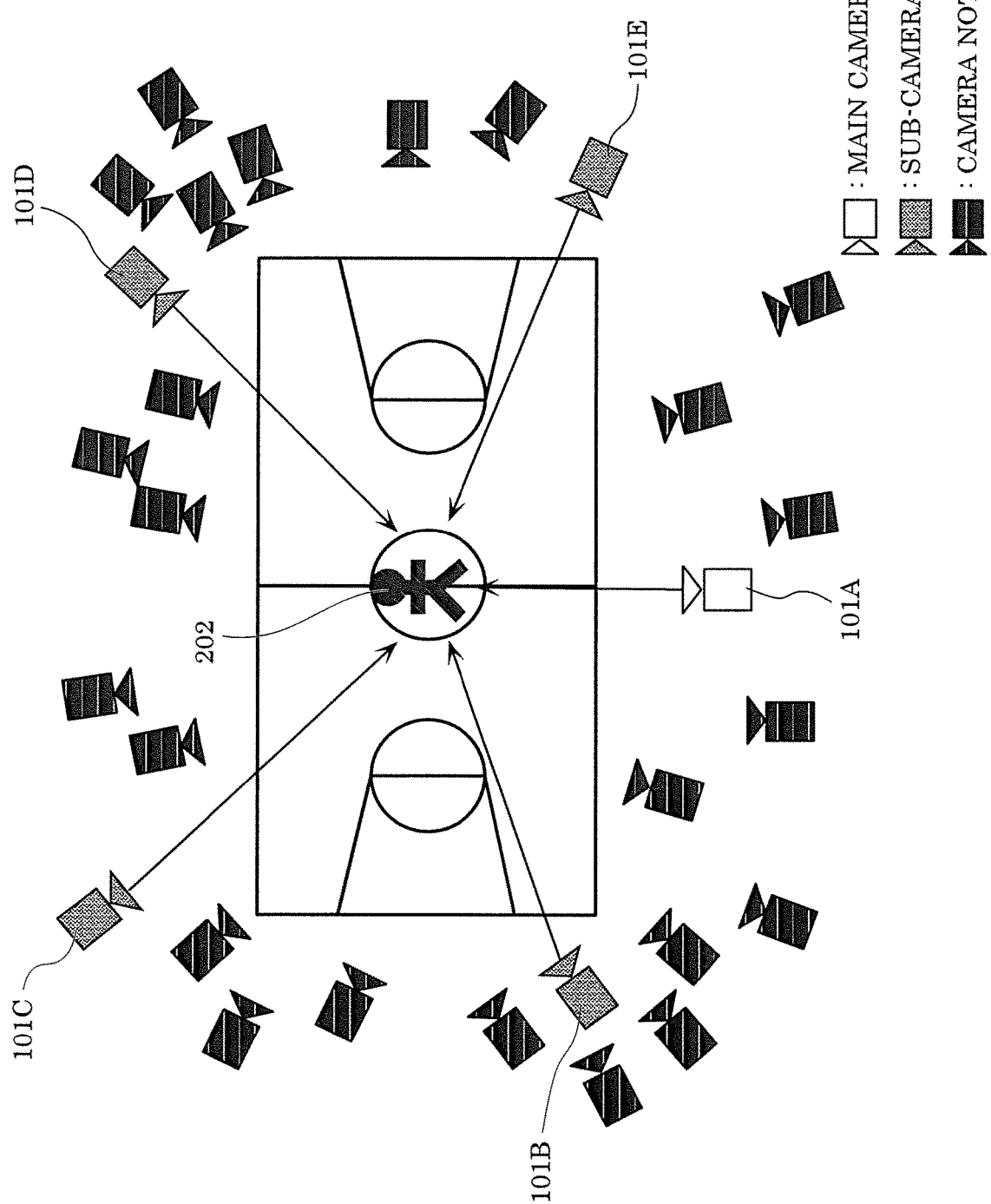
FIG. 17 is a diagram illustrating an example of selection of cameras in the event space in a tracking capture mode according to Embodiment 1.
Figure 18:
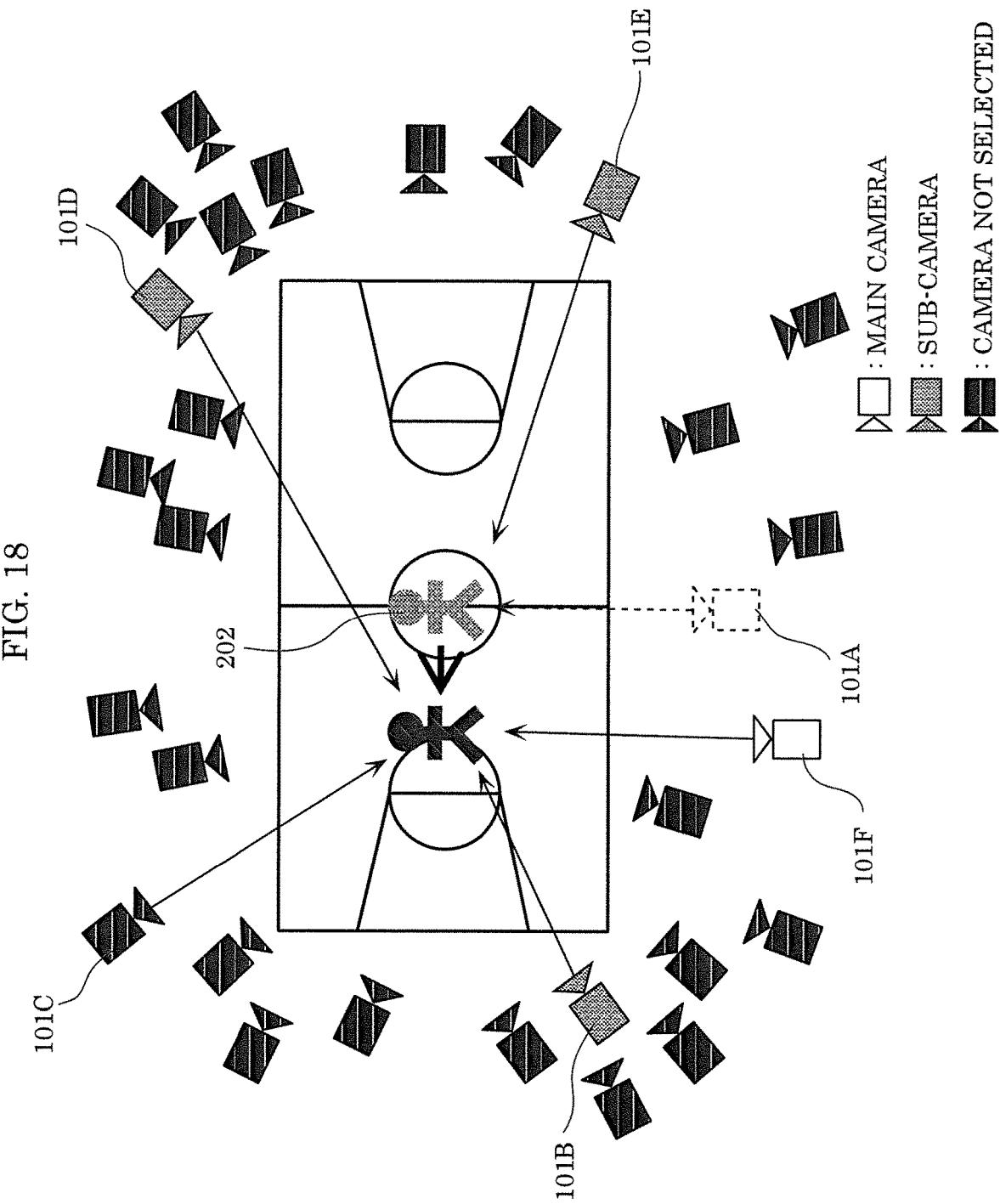
FIG. 18 is a diagram illustrating an example of selection of a new camera in the event space in the tracking capture mode according to Embodiment 1.
Figure 19:
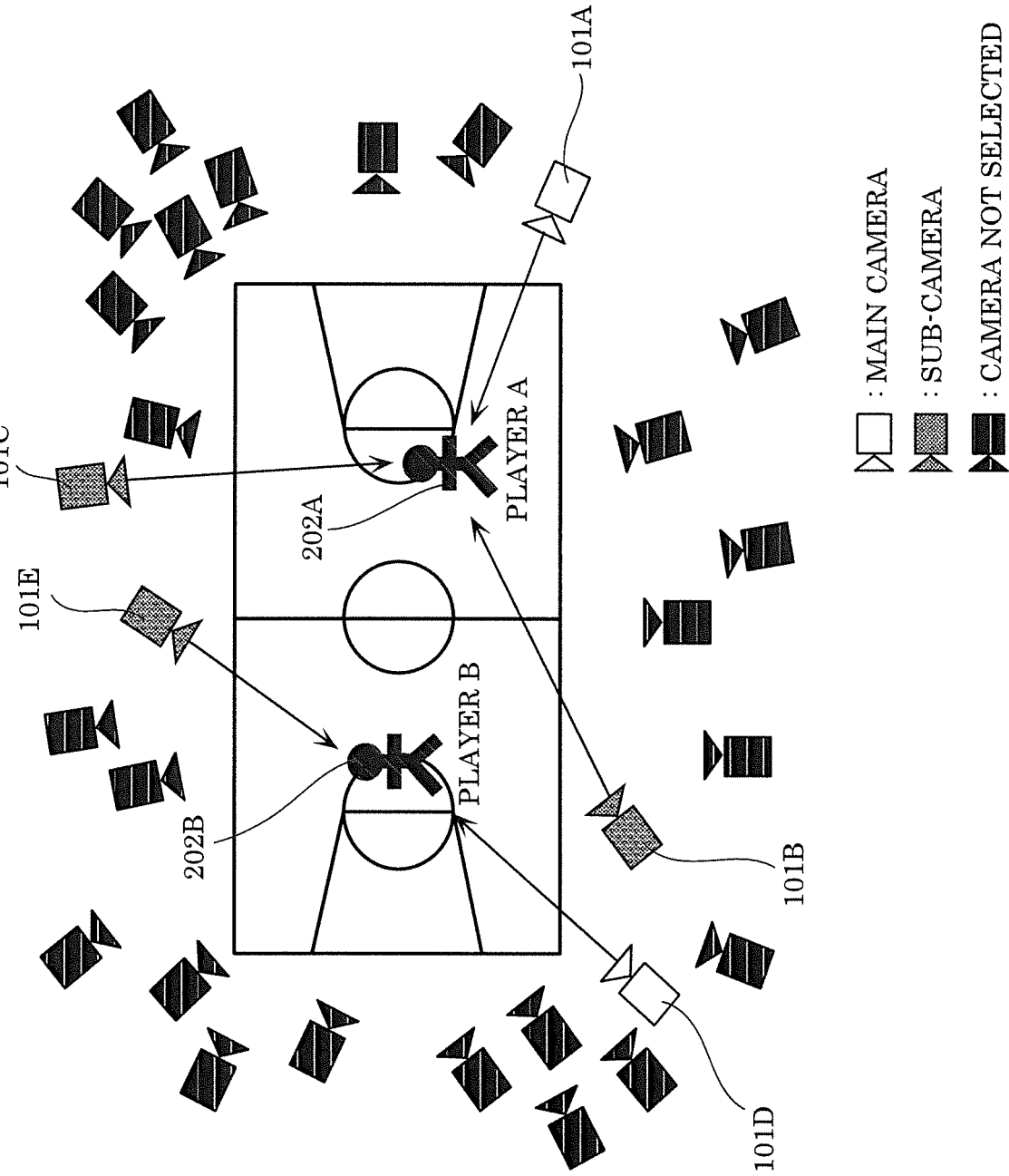
FIG. 19 is a diagram illustrating another example of the selection of cameras in the event space in the tracking capture mode according to Embodiment 1.

A specific example of the selection of cameras in the event space in the tracking capture mode will be described hereinafter. FIGS. 17, 18, and 19 are diagrams illustrating the specific example of the selection of cameras in the event space in the tracking capture mode.

FIG. 17 is a diagram illustrating a process for initially selecting cameras performed when there is only one subject. As illustrated in FIG. 17, a case will be described in which only one subject is focused upon in a basketball game.

The initial camera selection unit 115, for example, identifies a player who has the ball as specified by the user or as a result of a scene analysis and selects the identified player, who is a player to be focused upon, as the subject 202 (target subject).

The initial camera selection unit 115 selects a camera 101A capturing the player from the front of the player or video that includes the player most comprehensively as a main camera and sub-cameras 101B to 101E at regular capture angle intervals on the basis of a position of the main camera. If the initial camera selection unit 115 selects five cameras, for example, the initial camera selection unit 115 selects the sub-cameras 101B to 101E at intervals of about 72° with a position of the player determined as an origin and an angle of the main camera 101A determined as 0°. The initial camera selection unit 115 calculates an angle relative to the origin on the basis of a position and a capture angle of each camera. The target subject need not necessarily be a player, but may be a hoop or an electric bulletin board.

FIG. 18 is a diagram illustrating the process for selecting a new camera in the event space in the tracking capture mode performed when there is only one subject. As illustrated in FIG. 18, a case will be described in which only one target subject is focused upon in a basketball game.

In the tracking capture mode, the new camera selection unit 117 tracks the subject and, if a currently selected tracking camera can no longer capture the subject, switches the camera. If the subject is disappearing from the field of view of a certain tracking camera, for example, the new camera selection unit 117 searches for a camera capturing an image of the subject at a most central position in accordance with a result of the tracking of the subject and determines the camera obtained as a result of the search as a new tracking camera.

If three-dimensional reconfiguration based on multi-view videos has been performed, the subject has been reconfigured as a three-dimensional model. The new camera selection unit 117 therefore tracks the subject in a three-dimensional space. The new camera selection unit 117 switches the tracking camera to a camera capturing video that includes three-dimensional points on the subject at a most central position or most comprehensively.

If three-dimensional reconfiguration based on multi-view video has not been performed, the new camera selection unit 117 tracks the subject in two-dimensional videos. During the tracking, the new camera selection unit 117 predicts the next movement of the subject using a past frame and a present frame and switches the tracking camera to a camera capturing a space to which the subject is going.

If the subject 202 is moving as illustrated in FIG. 18, for example, the new camera selection unit 117 tracks the subject 202.

If three-dimensional models of the subject 202 have been reconfigured, the new camera selection unit 117 tracks the subject 202 in the three-dimensional space. If three-dimensional models of the subject 202 have not been reconfigured, the new camera selection unit 117 predicts the movement of the subject 202 in two-dimensional videos. The new camera selection unit 117 then switches the selected camera to a camera 101F capturing video that includes the subject 202 at a most central position or most comprehensively.

FIG. 19 is a diagram illustrating an operation at a time when there are a plurality of subjects in the event space. As illustrated in FIG. 19, a case will be described in which a plurality of subjects 202A and 202B are focused upon in a basketball game.

The initial camera selection unit 115 selects two or more players to be focused upon as the subjects 202A and 202B as a result of specification of the subjects 202A and 202B performed by the user or a scene analysis and assigns at least one camera to each subject. The initial camera selection unit 115 selects cameras each of which is capturing a subject from the front of the subject or video that includes a subject most comprehensively as main cameras. That is, there are the same number of main cameras as subjects. Next, the initial camera selection unit 115 selects sub-cameras at regular capture angle intervals on the basis of a position of each main camera.

If five cameras are to capture images of two players, for example, the initial camera selection unit 115 assigns three cameras to player A (subject 202A) and two cameras to player B (subject 202B). Since a main camera has been assigned to each player, the initial camera selection unit 115 selects sub-cameras 101B and 101C for player A at intervals of about 120° with a position of player A determined as an origin and an angle of a main camera 101A determined as 0°. Similarly, the initial camera selection unit 115 selects a sub-camera 101E for player B at an interval of about 180° with a position of player B determined as an origin and an angle of a main camera 101D determined as 0°.

The initial camera selection unit 115 assigns more cameras to a player to whom priority has been given by the user or a player who has the ball or who is closest to the ball identified as a result of a scene analysis. If the number of players to be focused upon exceeds the number of cameras selected, the initial camera selection unit 115 ranks the players in order of priority and assigns the selected cameras to the players in order of priority.

The camera switching determination unit 116 tracks the players by the same method described with reference to FIG. 18.

The initial camera selection unit 115 may select cameras in the hybrid capture mode, which is a combination of the space capture mode and the tracking capture mode, insofar as the number of cameras selected permits.

Figure 20:
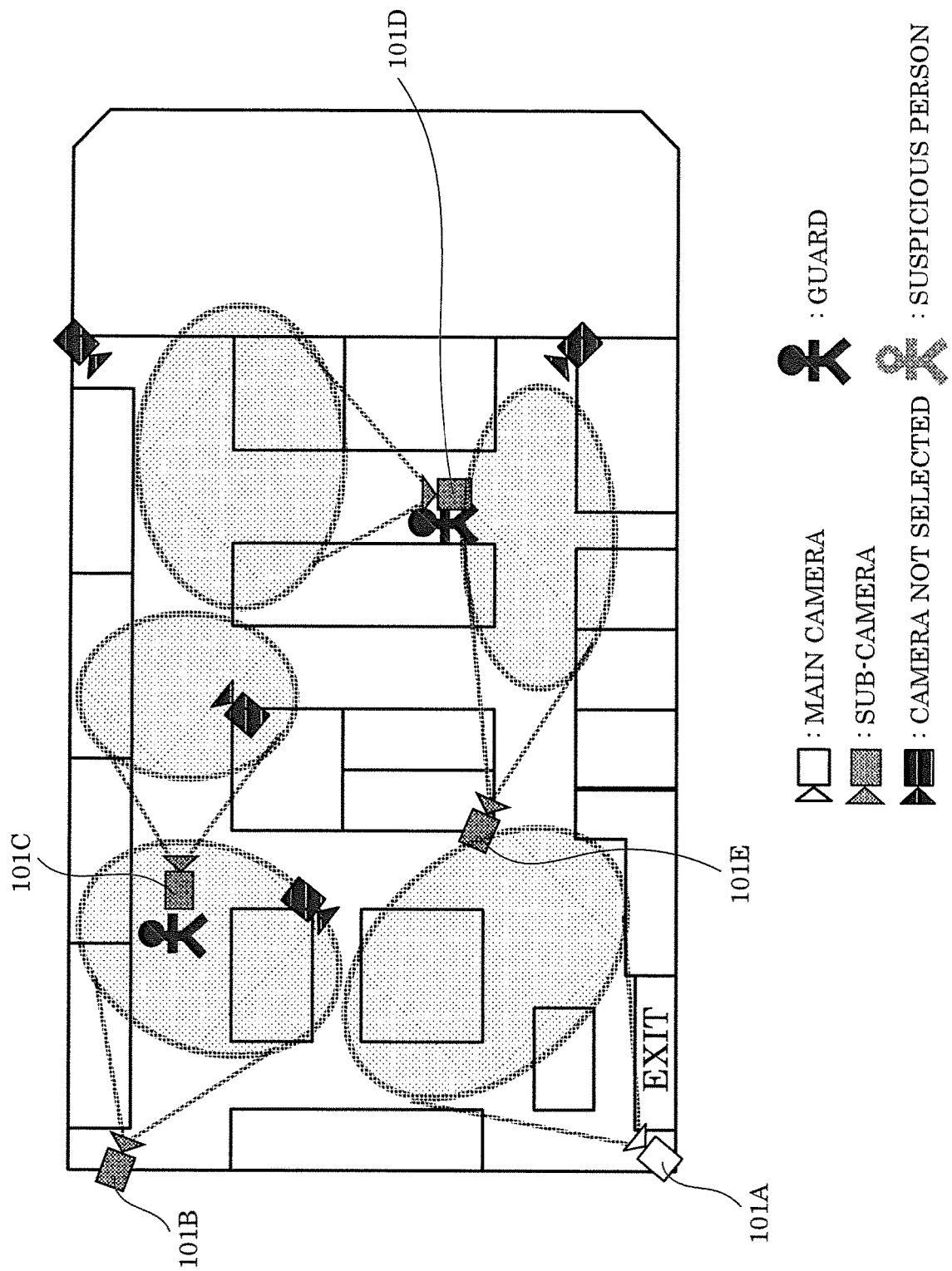
FIG. 20 is a diagram illustrating an example of selection of cameras in a security environment in the space capture mode according to Embodiment 1.

An example of an operation in a security environment of a shopping center will be described hereinafter with reference to FIGS. 20 and 21. FIG. 20 is a diagram illustrating selection of cameras in the security environment of the shopping center in the space capture mode.

As illustrated in FIG. 20, the security environment of the shopping center in which cameras are fixed on a ceiling and pillars and mobile cameras are carried by guards will be taken as an example.

The initial camera selection unit 115 selects cameras without a blind spot in order to keep the entirety of the shopping center under guard. The initial camera selection unit 115 selects a camera capturing a place or a person specified by the user through a user interface (UI) or a place determined to be important for security purposes, such as a product delivery entrance, as a main camera. The initial camera selection unit 115 then selects sub-cameras in order to monitor places where the main camera is not monitoring.

In the example illustrated in FIG. 20, for example, a camera 101A capturing an exit is selected as a main camera, and sub-cameras 101B to 101E are selected in order to monitor the entirety of the shopping center.

The initial camera selection unit 115 obtains areas of the shopping center that can be can be captured by security cameras and blind spots as preliminary information. The blind spots may be monitored by the mobile cameras carried by the guards.

Figure 21:
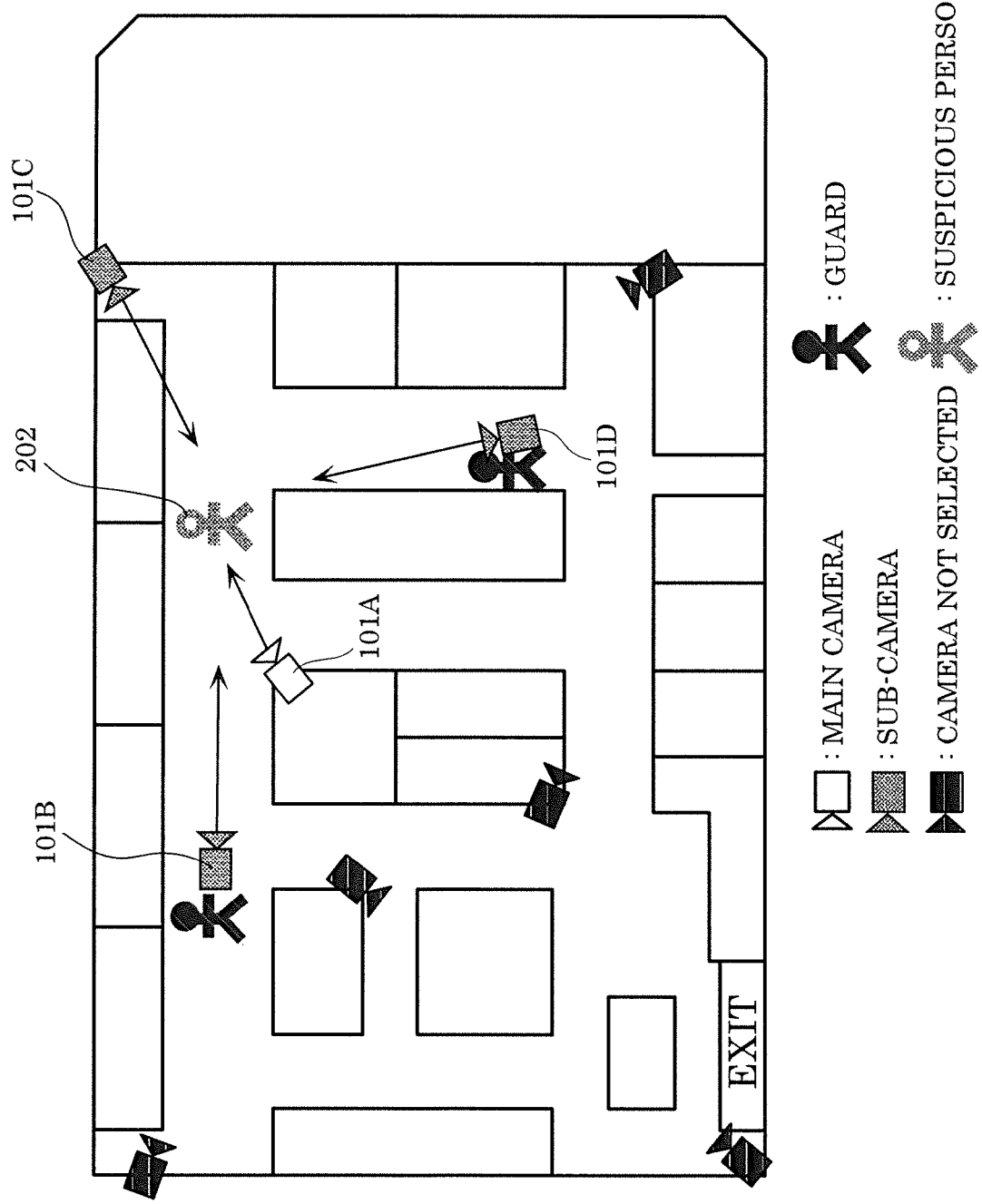
FIG. 21 is a diagram illustrating another example of the selection of cameras in the security environment in the tracking capture mode according to Embodiment 1.

FIG. 21 is a diagram illustrating selection of cameras in the security environment of the shopping center in the tracking capture mode.

As illustrated in FIG. 21, a case will be described in which only one subject 202 is focused upon in the security environment of the shopping center.

The initial camera selection unit 115 identifies at least one person specified by the user through the UI or at least one person whose action is abnormal identified as a result of a scene analysis and selects the identified person(s) as the target subject(s). The initial camera selection unit 115 also ranks the cameras in the shopping center on the basis of distances between the subject and the cameras, angles of the cameras relative to the front of the subject, or areas (the number of pixels) of the subject included in images captured by the cameras, and selects a certain number of cameras in order of priority. At this time, the initial camera selection unit 115 selects a camera of highest priority as a main camera.

In the example illustrated in FIG. 21, the camera 101A is selected as a main camera, and cameras 101B to 101D are selected as sub-cameras.

The target subject need not be a person, but may be a place where an event, such as a fire or collapse of a pile of products, has occurred, instead.

In the examples illustrated in FIGS. 15 to 21, a sound transmitted from the server 103 to the terminal apparatus 102 may be one obtained by the main camera, one obtained by a terminal closest to the main camera, one obtained by a terminal closest to a place specified by the user through the UI, one obtained by a terminal closest to the subject, one of highest sound quality, or one obtained by combining sounds obtained by a plurality of terminals.

Figure 22:
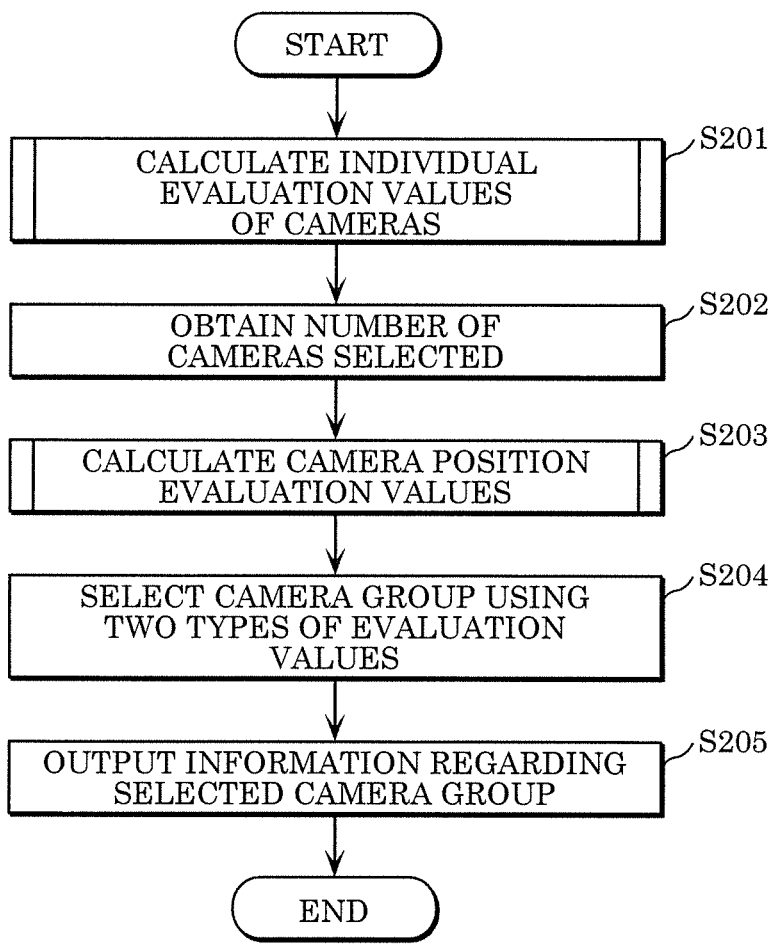
FIG. 22 is a flowchart illustrating the process for initially selecting cameras according to Embodiment 1.

Details and another example of the process for initially selecting cameras described with reference to FIG. 6 will be described hereinafter. FIG. 22 is a flowchart illustrating the process for initially selecting cameras.

First, the initial camera selection unit 115 calculates individual evaluation values of cameras (S201). The initial camera selection unit 115 then selects a main camera on the basis of the calculated evaluation values. More specifically, the initial camera selection unit 115 selects a camera having a largest evaluation value as a main camera.

Next, the initial camera selection unit 115 obtains the number of cameras selected (S202). The initial camera selection unit 115, for example, obtains the number of cameras specified by the user or a predetermined number of cameras.

Next, the initial camera selection unit 115 calculates combined evaluation values (camera position evaluation values) on the basis of positions of the cameras (S203). More specifically, the initial camera selection unit 115 calculates the evaluation value for each combination of the main camera and (the number of cameras selected—1) sub-cameras on the basis of the positions of the cameras.

Next, the initial camera selection unit 115 selects a camera group using the individual evaluation values of the cameras calculated in step S201 and the camera position evaluation values calculated in step S203 (S204). More specifically, the initial camera selection unit 115 selects cameras having highest total evaluation values, which are obtained from the two types of evaluation values.

The initial camera selection unit 115, for example, calculates a product of a sum of the individual evaluation values of cameras included in the selected camera group and the camera position evaluation value of the camera group as a total evaluation value. A method for calculating a total evaluation value is not limited to this, but may be an arbitrary method such as weight addition, instead.

Finally, the initial camera selection unit 115 outputs information regarding a selected camera group (S205).

Although the initial camera selection unit 115 selects a main camera and then makes a determination for a camera group including the selected main camera on the basis of total evaluation values here, the initial camera selection unit 115 may obtain a combination having a highest total evaluation value and then select one of cameras, which are included in the combination, having a highest evaluation value as a main camera, instead.

Figure 23:
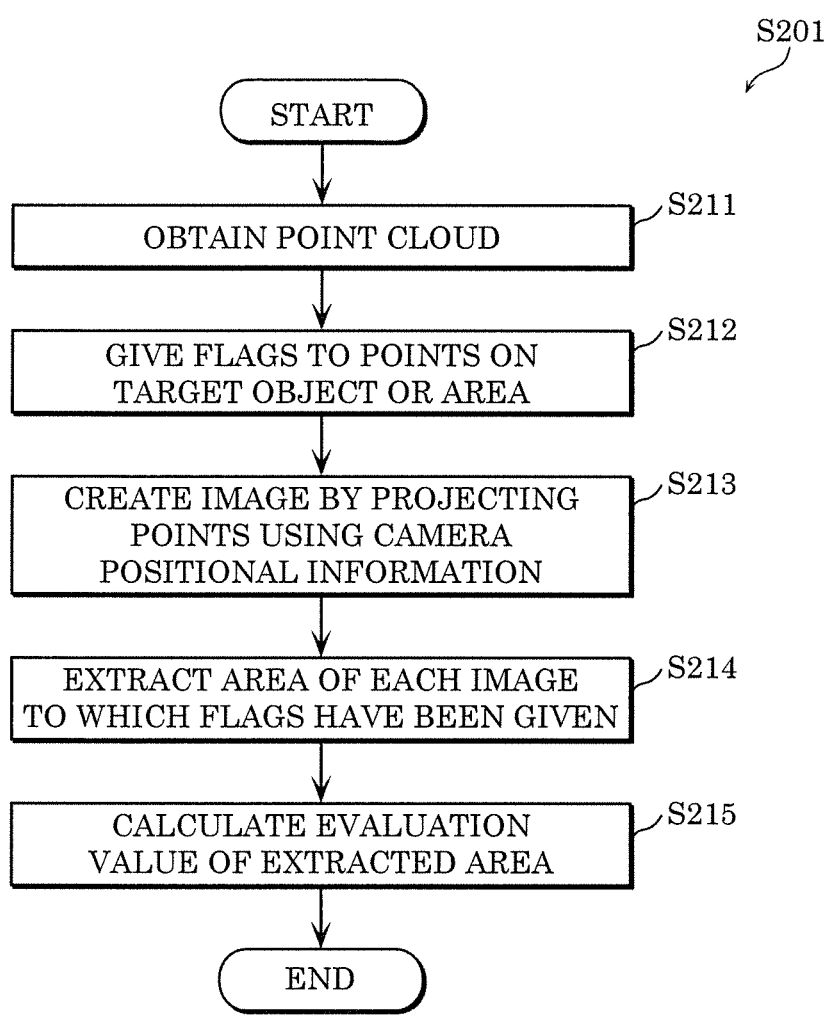
FIG. 23 is a flowchart illustrating a process for calculating individual evaluation values of cameras according to Embodiment 1.

The process for calculating individual evaluation values of cameras (S201 in FIG. 22) will be described hereinafter. FIG. 23 is a flowchart illustrating the process for calculating individual evaluation values of cameras.

First, the initial camera selection unit 115 obtains a point cloud (S211). The point cloud includes a reconfigured three-dimensional model and camera positional information.

Next, the initial camera selection unit 115 gives flags to points on a target subject (target object) or a target area in the three-dimensional model (S212).

Figure 24:
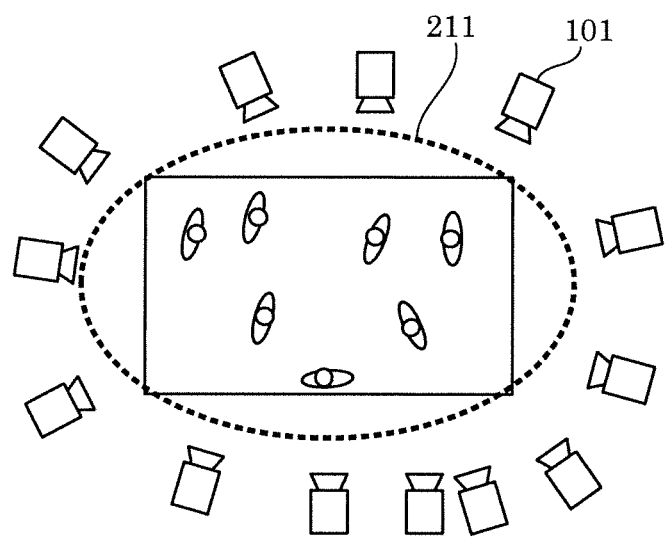
FIG. 24 is a diagram illustrating an example of selection of a target space according to Embodiment 1.
Figure 25:
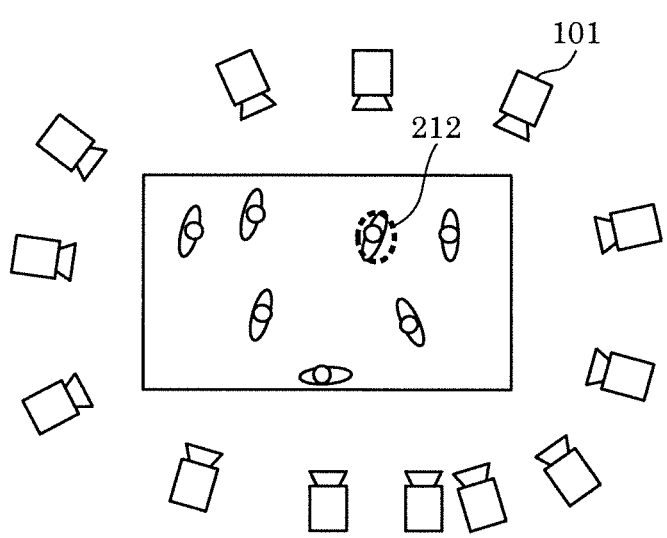
FIG. 25 is a diagram illustrating an example of selection of a subject according to Embodiment 1.

FIG. 24 is a diagram illustrating an example of selection of a target area 211. FIG. 25 is a diagram illustrating an example of selection of a target subject 212. As a method for selecting a target subject or a target area, a method in which the user manually selects a target subject or a target area or a method in which a target subject or a target area is automatically selected may be used.

If the user manually selects the target subject or the target area, the user selects the target subject or the target area through the UI. The initial camera selection unit 115 back-projects the selected area in a two-dimensional plane onto a three-dimensional model to select the target subject or target area in the three-dimensional model.

If the target subject or the target area is automatically selected and the server 103 has obtained map information in advance, the initial camera selection unit 115 selects an important security area such as an exit as the target area. Alternatively, the initial camera selection unit 115 automatically detects a suspicious person through attitude recognition or the like and selects the suspicious person as the target subject.

If the server 103 has not obtained map information in advance, the initial camera selection unit 115 determines that a most crowded area is important, and determines the most crowded area as the target area. Alternatively, the initial camera selection unit 115 automatically detects a suspicious person through attitude recognition or the like and selects the suspicious person as the target subject.

Next, the initial camera selection unit 115 creates an image by projecting the points onto the two-dimensional plane using the camera positional information (S213).

Next, the initial camera selection unit 115 extracts an area of each image to which the flags have been given (S214).

Next, the initial camera selection unit 115 calculates an evaluation value of the extracted area of each image to calculate an evaluation value of each image (camera) (S215).

The initial camera selection unit 115, for example, increases the evaluation value if the extracted area in each image is large. Alternatively, the camera switching determination unit 116 may increase the evaluation value if a visible area is large. The visible area refers to an area of each image in which the extracted area can be actually recognized. If there is an object or the like in front of the target area or the target subject, the visible area becomes small. Alternatively, the initial camera selection unit 115 may give priority to each portion of the target area or the target subject and increase the evaluation value if many portions of high priority are included in an image or a portion of high priority included in an image is large. The initial camera selection unit 115 may increase the evaluation value, for example, if a face of the subject is included in an image. The initial camera selection unit 115 may increase the evaluation value if each image is vivid or distortion in each image is small.

Figure 26:
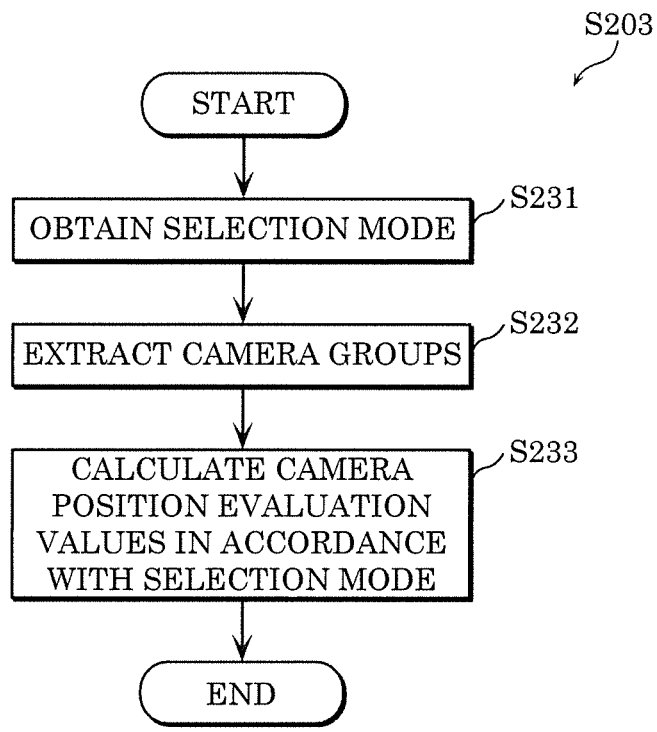
FIG. 26 is a flowchart illustrating a process for calculating camera position evaluation values according to Embodiment 1.

The process for calculating camera position evaluation values (S203 in FIG. 22) will be described hereinafter. FIG. 26 is a flowchart illustrating the process for calculating camera position evaluation values.

First, the initial camera selection unit 115 obtains a selection mode (S231). The selection mode may be a bird's eye view mode or a particular angle mode. The camera switching determination unit 116 obtains a selection mode specified by the user or a predetermined selection mode.

Figure 27:
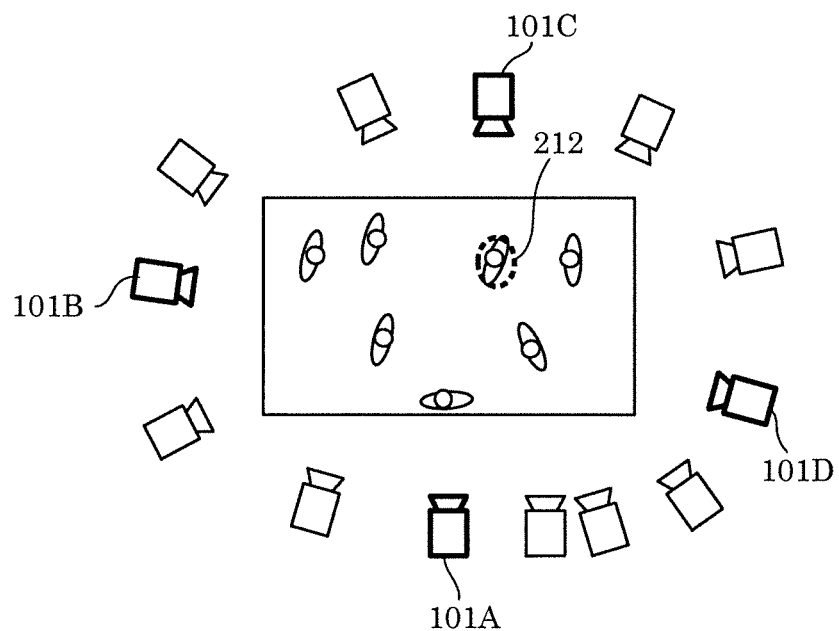
FIG. 27 is a diagram illustrating an example of selection of cameras in a bird's eye view mode according to Embodiment 1.
Figure 28:
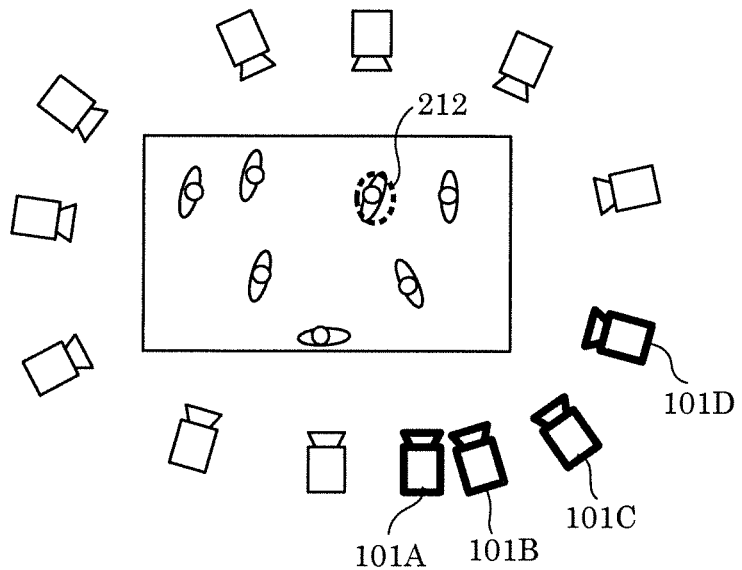
FIG. 28 is a diagram illustrating an example of selection of cameras in a particular angle mode according to Embodiment 1.

As illustrated in FIG. 27, in the bird's eye view mode, cameras 101A to 101D capturing images of the target subject 212 (or the target area) from various angles at regular intervals are selected. As illustrated in FIG. 28, in the particular angle mode, cameras 101A to 101D capturing the target subject 212 (or the target area) from a particular angle are selected. The bird's eye view mode is effective, for example, in a stadium where seats surround a court or a field. The particular angle mode is effective in a concert hall where seats are provided in one direction of a stage or when the user desires to watch video from a particular angle.

Next, the initial camera selection unit 115 selects a plurality of camera groups, each including a selected number of cameras (S232). Next, the initial camera selection unit 115 calculates a camera position evaluation value of each camera group in accordance with the selection mode (S233).

More specifically, in the bird's eye view mode, the initial camera selection unit 115 determines the camera position evaluation value in accordance with whether the plurality of cameras are arranged at regular intervals relative to a target representative point. More specifically, the initial camera selection unit 115 increases the evaluation value if the plurality of cameras are arranged at regular intervals. If a ratio of an area of the target subject to an area of the entirety of an image is higher than a certain value, the initial camera selection unit 115 may give priority to the positional information. That is, the initial camera selection unit 115 may decrease the evaluation value if a camera is too close to the target subject.

In the particular angle mode, the initial camera selection unit 115 determines the camera position evaluation value in accordance with how closely the plurality of cameras are arranged to one another in a specified angle. More specifically, the initial camera selection unit 115 increases the evaluation value if the plurality of cameras are arranged close to one another in the specified angle.

The initial camera selection unit 115 may take into consideration an attitude of the subject (an angle of the face or the like) and increase the evaluation value if the subject faces a camera. In this case, the attitude of the subject can be detected through face recognition or the like.

As a method for extracting a camera group (S232) and calculating the camera position evaluation values (S233), one of the following methods may be used.

That is, the initial camera selection unit 115 extracts all combinations of cameras as camera groups. Alternatively, the initial camera selection unit 115 may classify a plurality of cameras such that similar cameras (e.g., close to one another) are classified into the same class, and extract all combinations of cameras representing all classes as camera groups. Alternatively, the initial camera selection unit 115 may select a main camera on the basis of the evaluation values of the cameras and extract all combinations of cameras including the main camera as camera groups.

As a method for switching cameras in a time direction, the following method may be used. That is, the camera switching determination unit 116 stores information regarding a camera group selected in the past. The camera switching determination unit 116 stores a camera group evaluation value at each time and determines whether to switch the camera group. At this time, a parameter for controlling a switching frequency in the time direction is prepared, and the camera switching determination unit 116 determines whether to switch the camera group using the parameter. More specifically, the camera switching determination unit 116 uses the parameter to perform control such that when time elapsed since a previous switching operation is short, switching is not performed. When the time elapsed since the previous switching operation is shorter than a first time, for example, the camera switching determination unit 116 may determine that switching is not to be performed. When the time elapsed since the previous switching operation is equal to or longer than the first time but shorter than a second time, the camera switching determination unit 116 may make a determination in accordance with a first criterion. When the time elapsed since the previous switching operation is longer than the second time, the camera switching determination unit 116 may make a determination in accordance with a second criterion (the camera group is more likely to be switched).

Although the server 103 performs camera switching and resetting as necessary after the process for initially selecting cameras (S111) in the example illustrated in FIG. 5, the server 103 may repeatedly perform the process for initially selecting cameras at certain time intervals. In this case, too, the above-mentioned parameter may be used to perform control such that switching is not performed too frequently.

Figure 29:
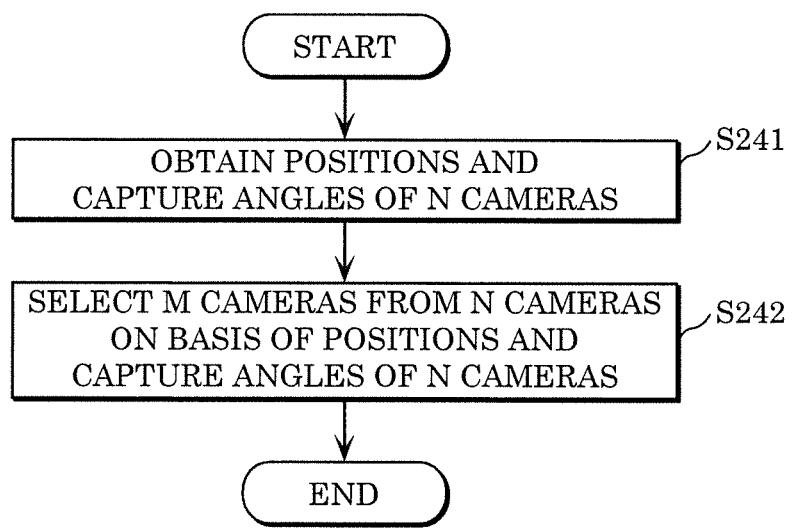
FIG. 29 is a flowchart illustrating a method for selecting cameras according to Embodiment 1.

As described above, the method for selecting cameras according to the present embodiment is a method for selecting cameras in which M (M is a natural number smaller than N) cameras 101 (selected cameras) capturing videos to be displayed are selected from N (N is a natural number equal to or larger than 2) cameras 101 capturing the same scene. In this method, a process illustrated in FIG. 29 is performed.

First, the server 103 obtains positions and capture angles of the N cameras 101 (S241). More specifically, the server 103 calculates the positions and capture angles of the N cameras 101 by performing three-dimensional reconfiguration using images captured by the N cameras 101. Alternatively, the server 103 calculates the positions and capture angles of the N cameras 101 using information obtained by sensors (e.g., the GPS, Wi-Fi, or gyro sensors) included in the N cameras 101 and transmitted from the N cameras 101.

Next, the server 103 selects M cameras 101 from the N cameras 101 on the basis of the obtained positions and capture angles of the N cameras 101 (S242). More specifically, the server 103 selects M cameras 101 on the basis of the positions and capture angles of the N cameras 101 such that the M cameras 101 can capture a target space without a blind spot. That is, the server 103 selects, on the basis of the positions and capture angles of the N cameras 101, M cameras 101 whose images hardly overlap with one another and whose images include the target space most comprehensively. Alternatively, the server 103 selects, on the basis of the positions and capture angles of the N cameras 101, M cameras 101 capturing the target space or a target subject from a plurality of angles at regular intervals.

The server 103 may also obtain focal distances of the N cameras 101 in step S241 and select M cameras 101 from the N cameras 101 in step S242 on the basis of the obtained positions, capture angles, and focal distances of the N cameras 101.

According to the method for selecting cameras, appropriate cameras can be automatically selected from a plurality of cameras on the basis of positions and capture angles of the plurality of cameras.

As illustrated in FIG. 5, the server 103 also determines whether to switch some of the selected M cameras 101 to other cameras (S112) in a frame after step S242 (S111). More specifically, as illustrated in FIG. 8, the server 103 tracks the target subject over frames and, if the tracking of the target subject fails, determines that a selected camera 101 is to be switched. Even more specifically, the server 103 associates three-dimensional models of the target subject between frames and projects the associated three-dimensional models of the target subject onto a present frame. If the target subject is not included in an obtained frame, the server 103 determines that the tracking has failed (S147).

If the server 103 determines in step S112 that some cameras are to be switched (yes in S112), the server 103 selects new cameras for the cameras on the basis of the positions and capture angles of the N cameras 101 (S114).

The server 103 also determines whether to perform the processing in step S242 (S111) again in a frame after step S242 (S111) (S115). If the server 103 determines in step S115 that the processing in step S242 (S111) is to be performed again (yes in S116), the server 103 selects M cameras 101 from the N cameras 101 on the basis of the positions and capture angles of the N cameras 101 (S111).

In step S112, the server 103 may determine that some cameras are to be switched if time elapsed since a previous switching operation is shorter than the first time. The server 103 may determine, in accordance with the first criterion, whether to switch some cameras to other cameras if the time elapsed since the previous switching operation is equal to or longer than the first time but shorter than the second time, which is longer than the first time. The server 103 may determine whether to switch some cameras to other cameras in accordance with the second criterion, according to which the cameras are more likely to be switched than when the first criterion is used, if the time elapsed since the previous switching operation is equal to or longer than the second time.

As illustrated in FIG. 22, in step S242 (S111), the server 103 calculates first evaluation values of the N cameras (individual evaluation values of the cameras) on the basis of the videos captured by the N cameras (S201). The server 103 also calculates second evaluation values (camera position evaluation values) of camera groups, which are combinations of M cameras 101 included in the N cameras 101, on the basis of the position and capture angles of the cameras 101 (S203). The server 103 then calculates a third evaluation value of each camera group on the basis of the first evaluation values of the M cameras included in each camera group and the second evaluation value of each camera group and selects the M cameras included in a camera group having a highest third evaluation value (S204).

Variation 1 of Embodiment 1

Figure 30A:
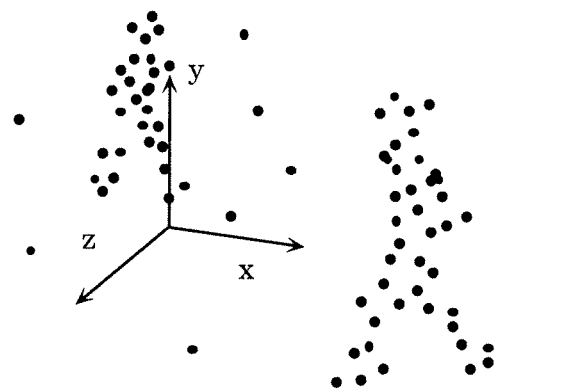
FIG. 30A is a schematic drawing illustrating one example of three-dimensional model information according to a variation of Embodiment 1.
Figure 30B:
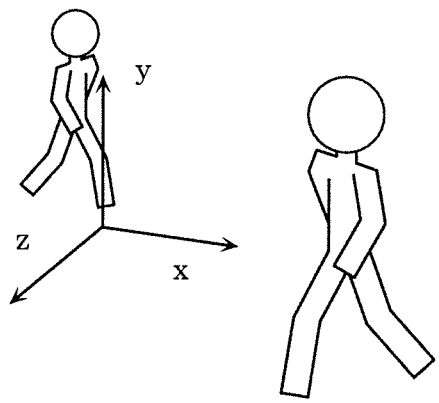
FIG. 30B is a schematic drawing illustrating one example of three-dimensional model information according to the variation of Embodiment 1.
Figure 30C:
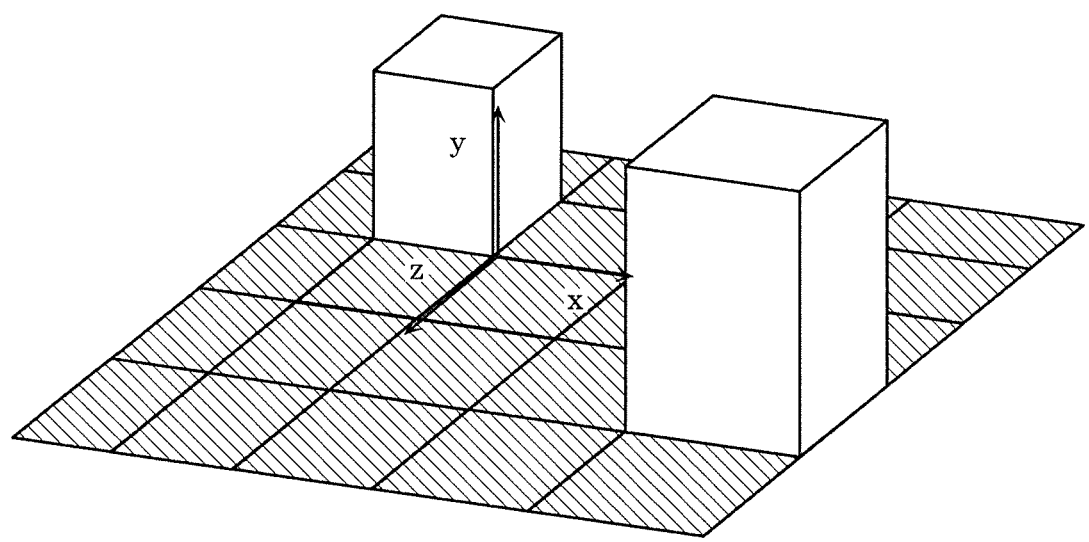
FIG. 30C is a schematic drawing illustrating one example of three-dimensional model information according to the variation of Embodiment 1.

In Embodiment 1, in the process for calculating individual evaluation values of cameras (S201 in FIG. 22) performed by the initial camera selection unit 115, a point cloud is obtained in step S211 illustrated in FIG. 23, but so long as the information can be used to render a three-dimensional model and camera positional information, it is not limited to a point cloud. For example, instead of the point cloud obtained in step S211, voxel information in a three-dimensional space may be used. Hereinafter, this will be described with reference to the schematic drawings illustrated in FIGS. 30A through 30C. FIG. 30A illustrates one example of a point cloud obtained from a given three-dimensional space.

For example, a three-dimensional model is generated via a volume intersection technique using estimated camera parameters, camera videos, and camera background images. Initial camera selection unit 115 may perform the processes in steps S212 through S215 using the generated three-dimensional model and camera parameters. One example of a result obtained from such processes is the voxel data illustrated in FIG. 30B. The process for giving the voxel data a flag in step S212 can be implemented by giving a flag to each voxel including, for example, a generated human model and volumetric information, instead of performing the operations for each point in the case of a point cloud. In such cases, three-dimensional object reconfiguration rather than reconfiguration using points is easy, making it possible to remove gaps, for example, in the three-dimensional model. Thus, precise evaluation values can be generated since loss in the projected image can be reduced.

Moreover, a simplified three-dimensional model in which at least part of the shape of the target object has been simplified, such as turning an object into a cylindrical pillar shape, may be used. As one example of a method for achieving this, the base surface of a capturing space is divided in regular intervals, and a cylindrical or polygonal pillar model of a size equivalent to the object on each divided area is defined. Then, using the camera parameters, the videos from the cameras are back projected onto the three-dimensional space, and the likelihood that the object will be present on the pillar model described above is estimated. One example of a result obtained from such processes is the model information illustrated in FIG. 30C. The process of giving the flag to this simplified model information described in step S212 can be achieved by giving a flag to each polygonal pillar, for example. Using this method simplifies the process for generating three-dimensional model information and the processes for creating the projected image and calculating evaluation values. This in turn reduces the processing load.

A mesh model used as three-dimensional information for rendering an object for computer graphics (CG), for example, may be used as an input. A mesh model is a model that stores vertices for each mesh, and can be rendered by adding information for connecting points in a point cloud.

Three-dimensional information may be generated by extracting, for example, the posture of a person or attitude of an object from two-dimensional information in a video, shaping a mesh model on the basis of the extracted information, and arranging the shaped mesh model at a position obtained from a simplified three-dimensional model. This makes it possible to generate a virtual three-dimensional model including three-dimensional information on the object, without having to perform three-dimensional recognition or information processing. This in turn increases the precision of the calculated evaluation values. Moreover, by searching for positional information on the arrangement of the mesh model, this method can also be applied to the searching for and evaluation of optical projection points in a technique like augmented reality (AR) in which a virtual space or object, such as CG, is projected onto the real world.

Note that in the process for giving a tag to such three-dimensional information in step S212, in addition to giving a flag using three-dimensional information, a combination of an analysis result from a two-dimensional image and three-dimensional information may be used. For example, identification information, such as feature amount information, e.g., color information or histogram of oriented gradients (HoG) information, gait information, and the jersey number of the athlete, is extracted from each region of an object detection result in a video. An identification process relating to detection results between different cameras using such identification information is performed in order to perform recognition of a single subject using a plurality of cameras. When matching is performed using identification information in the identification process, taking into consideration the estimated area of capture from camera parameters, matching is performed in a detection result included in the same area of capture. This makes it possible to reduce the number of combinations of identification matching performed, and thus reduce the number of calculations performed.

As described above, the method for selecting cameras according to the present variation is a method for selecting cameras in which M (M is a natural number smaller than N) cameras capturing videos to be displayed are selected from N (N is a natural number equal to or larger than 2) cameras capturing the same scene. The method includes an evaluation value calculation step of calculating an evaluation value for each of the N cameras based on an image that corresponds to an image captured by the camera, obtained by projecting three-dimensional information, and a selection step of selecting M cameras from the N cameras based on the evaluation values.

With this, the method for selecting cameras can appropriately select a camera from among a plurality of cameras on the basis of camera evaluation values.

For example, the three-dimensional information may be a point cloud.

This makes it possible to simplify the calculation of the evaluation values since an object can be reproduced in a focused manner in the projected image, by projecting a point cloud including a great number of feature points for the object.

For example, the three-dimensional information is three-dimensional information in a voxel space.

This makes it possible to, by projecting the fine information in the voxel space, improve the precision of the evaluation values since there is little loss, for example, in the pixels in the projected image.

Embodiment 2

In the present embodiment, the configuration of and operations performed by a reception device (terminal apparatus 102) that visualize information transmitted from the transmission unit 119, described in Embodiment 1, will be described.

First, the transmission unit 119 in Embodiment 1 and the variation thereof will be described with reference to FIGS.

31 and 32. Since operations by components in the server 103 other than the transmission unit 119 are the same as described in Embodiment 1 and the variation thereof, repeated description will be omitted.

Figure 31:
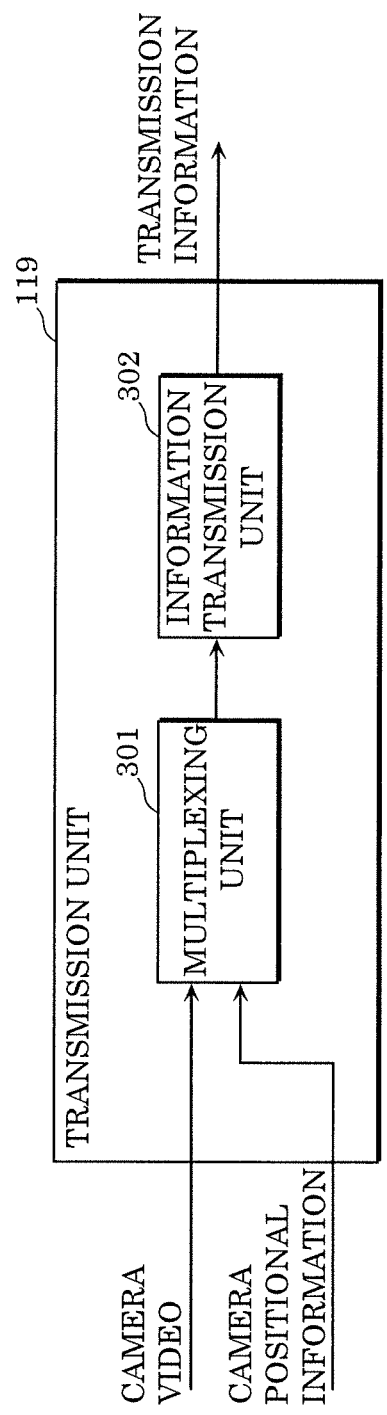
FIG. 31 is a block diagram of a transmission unit according to Embodiment 2.

FIG. 31 is a block diagram illustrating one example of the transmission unit 119. The transmission unit 119 includes a multiplexing unit 301 and an information transmission unit 302. The transmission unit 119 generates transmission information including camera positional information and video, and transmits the generated transmission information.

Figure 32:
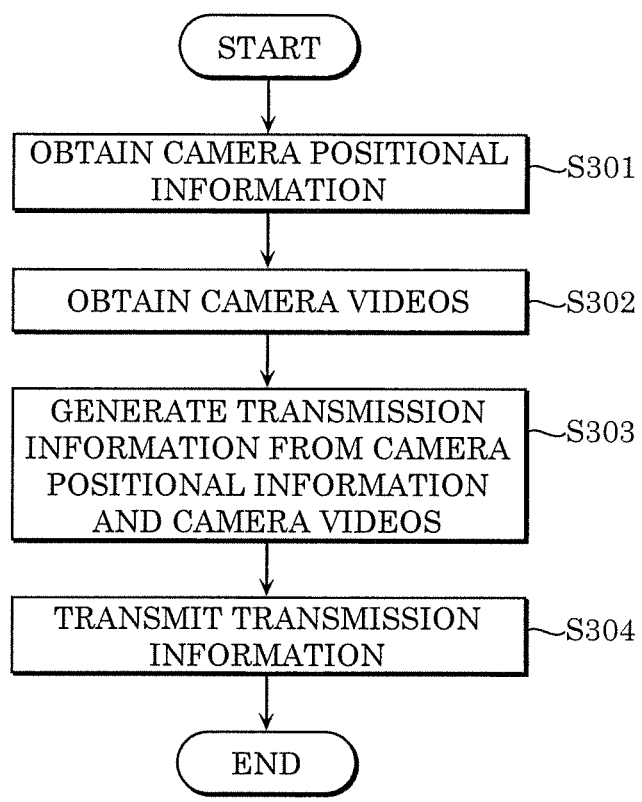
FIG. 32 is a flow chart illustrating a process performed in the transmission unit according to Embodiment 2.

FIG. 32 is a flow chart illustrating a process performed by the transmission unit 119. First, the multiplexing unit 301 obtains camera positional information on the cameras selected by the initial camera selection unit 115 and the new camera selection unit 117 (S301). Here, the camera positional information indicates the positions and angles (attitudes) of the plurality of selected cameras.

Next, the multiplexing unit 301 obtains camera videos, which are video information relating to the selected cameras (S302). In other words, the camera videos are videos captured by the plurality of cameras selected by the new camera selection unit 117. Next, the multiplexing unit 301 generates transmission information by multiplexing the camera positional information and camera videos obtained in steps S301 and S302 (S303). Finally, the transmission unit 119 transmits the transmission information generated in step S303 to the terminal apparatus 102 (S304).

Figure 33:
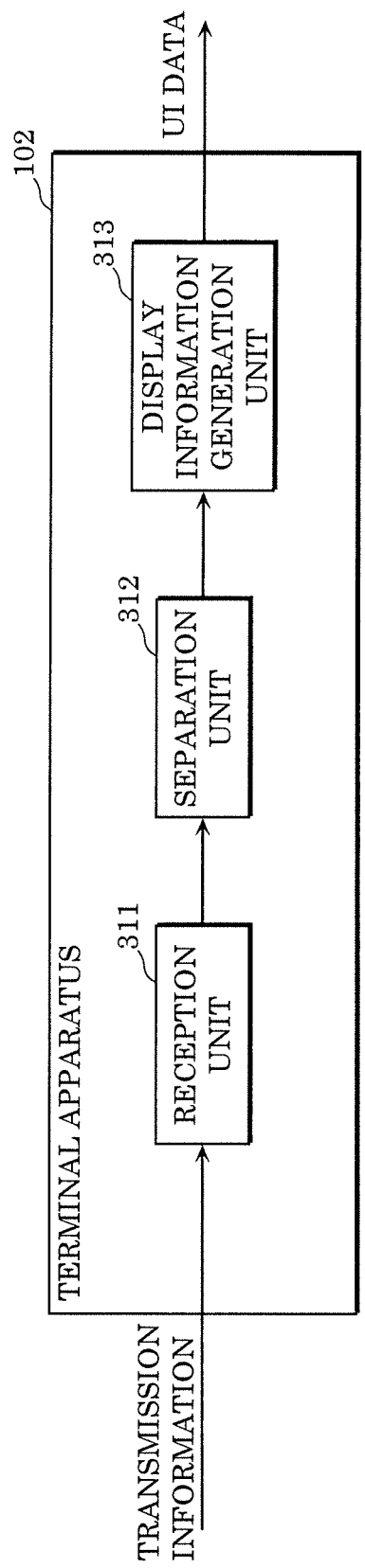
FIG. 33 is a block diagram of a terminal apparatus according to Embodiment 2.

Next, the configuration of and processes performed by a terminal apparatus 102 will be described with reference to FIGS. 33 and 34. FIG. 33 is a block diagram illustrating one example of a terminal apparatus 102. The terminal apparatus 102 includes a reception unit 311, a separation unit 312, and a display information generation unit 313. The terminal apparatus 102 generates UI data to be displayed on the monitor 105, from the transmission information transmitted from the server 103.

Figure 34:
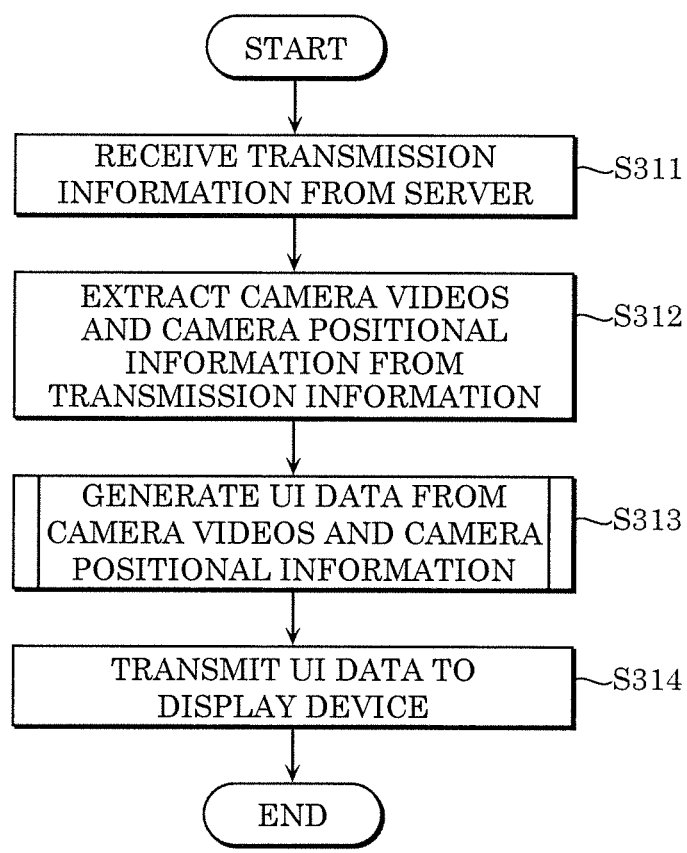
FIG. 34 is a flow chart illustrating a process performed in the terminal apparatus according to Embodiment 2.

FIG. 34 is a flow chart illustrating a process performed by the terminal apparatus 102. First, the reception unit 311 receives transmission information transmitted from the server 103 (S311). Next, the separation unit 312 separates the camera videos and camera positional information from the transmission information (S312). Next, the display information generation unit 313 generates UI data to be displayed on the monitor 105, from the camera video information and camera positional information obtained in step S312 (S313). Next, the display information generation unit 313 transmits the UI data generated in step S313 to the monitor 105 (S314). The processes described above result in information being presented to the user 106.

Here, UI data is used to present information to the user 106 by displaying an image or video on the monitor 105, and includes at least information for presenting the camera video and camera positional information. Note that hereinafter, the one or more cameras included in camera positional information received by the terminal apparatus 102, such as the camera positional information obtained in step S312, are referred to as a candidate camera group.

Here, one example of the UI data generated in step S313 will be given with reference to the schematic drawings in FIGS. 35 and 36. In the UI data illustrated in FIG. 35, on the right is camera UI indicating positions of cameras included in the candidate camera group, and on the left is a video display region. Hereinafter, the single camera in the candidate camera group that corresponds to video displayed in this video display region and is selected from the candidate camera group in the terminal apparatus 102 is referred to as the selected camera. Moreover, the camera video corresponding to the selected camera is referred to as the selected video. Here, in order to visually highlight the selected camera, the selected camera is illustrated in the camera UI as being shaded with diagonal lines. Note that any method may be used to visually highlight the selected camera; the method is not limited to shading with diagonal lines. For example, the selected camera may be colored. For example, the outline of the selected camera may be drawn with bold lines.

Figure 35:
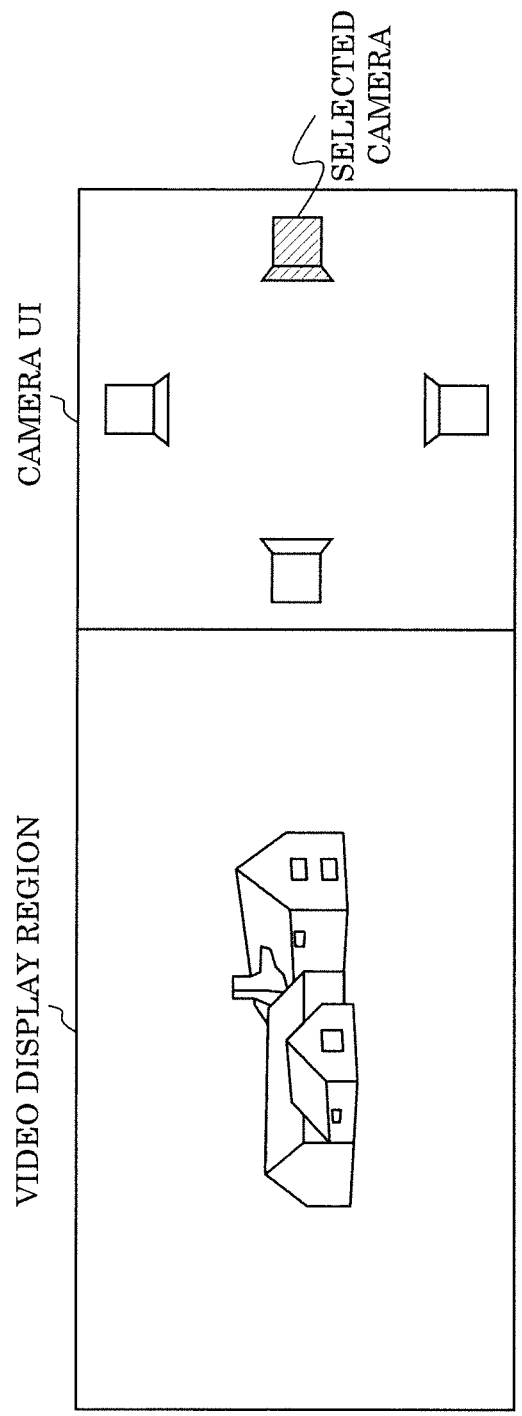
FIG. 35 is a schematic drawing illustrating one example of UI data according to Embodiment 2.
Figure 36:
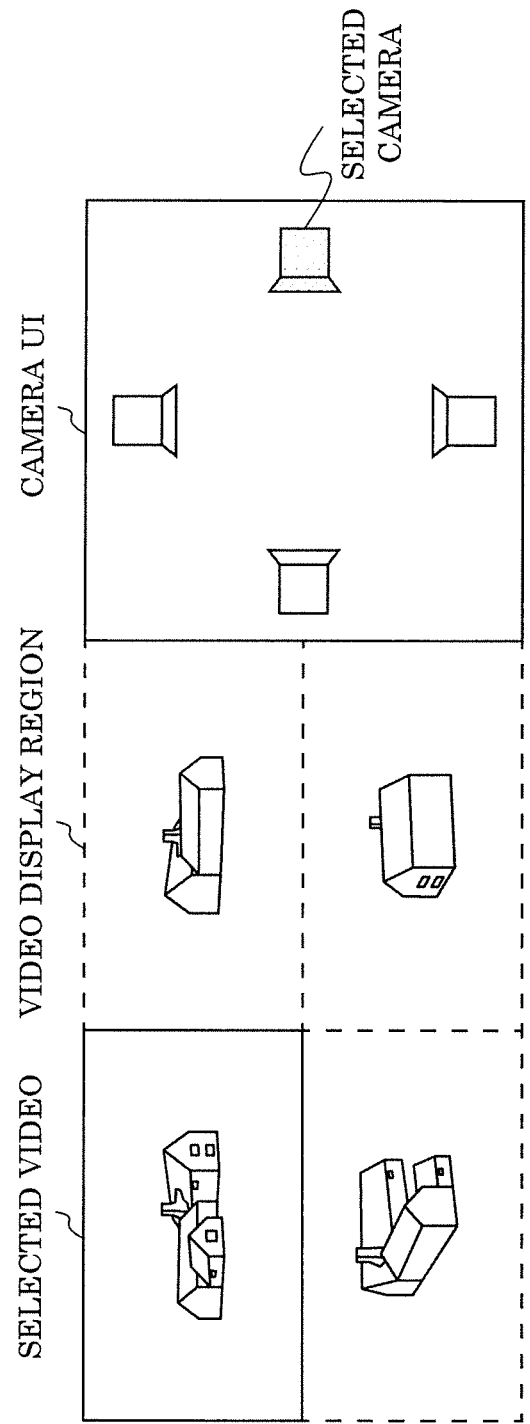
FIG. 36 is a schematic drawing illustrating one example of UI data according to Embodiment 2.

In the example illustrated in FIG. 36, on the right is the camera UI, just like in FIG. 35. However, on the left, the video display region is divided into a plurality of regions. Videos captured by some or all of the cameras in the candidate camera group, including the selected camera, are displayed in the divided regions. Here, in order to clarify which video display region the selected video corresponding to the selected camera is being displayed in, the frame outlining the selected video display region is drawn with a solid line, and the frames of the other regions are drawn with broken lines. However, note that any method may be used that visually signifies the selected video. Examples of how to visually signify the selected video other than using solid and broken frame lines include changing the color or thickness of the frame lines, and causing the frame line of the selected video to blink.

Moreover, the selected camera is not limited to a single camera; two or more cameras may be selected as selected cameras. In such cases, in order to clarify which video display regions the selected cameras correspond to in the camera UI, each selected camera may be displayed in a different color or the outlines of frames corresponding to the cameras may be displayed in different thicknesses. In other words, in order to show the relationships between the selected cameras and the selected video display regions on the camera UI, the corresponding selected cameras and selected videos may be displayed in the same manner. Since this provides a visual connection in the information presented in the video display regions and the camera UI, it is easier for the user to recognize which cameras correspond to which regions.

Note that the UI data may include at least the video display regions and the camera UI, and may include other information. For example, the UI data may include information indicating, for example, in a sports broadcast, the score and the game clock. The camera UI indicating camera position may display the camera positions three-dimensionally, and a two-dimensional display removed of height information, such as a plan view, may be used. When the camera positions are displayed three-dimensionally, the user can grasp the positional relationship between the cameras in three dimensions, which is beneficial to the user when the user goes to specify a camera. On the other hand, when the camera positions are displayed two-dimensionally, the number of calculations required for UI generation and display can be reduced, since the amount of information on the UI is reduced. This allows for even low-performance terminals to display the UI.

Hereinbefore, description has been provided based on the UI data illustrated in FIG. 35, but the same advantageous effects can be achieved even when the processes are performed on other types of UI data.

Figure 37:
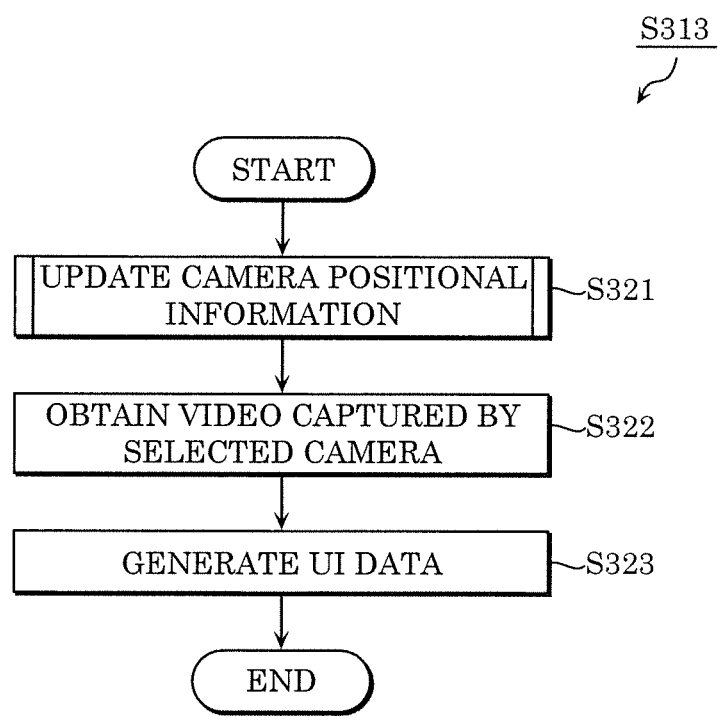
FIG. 37 is a flow chart illustrating a UI data generation process according to Embodiment 2.

Next, the UI data generation process of step S313 in FIG. 34 will be described with reference to FIG. 37. FIG. 37 is a flow chart illustrating the UI data generation process (S313).

First, the display information generation unit 313 updates the camera positional information based on the transmission information (S321). Next, the display information generation unit 313 obtains a camera video to be displayed, on the basis of the update process performed in step S321 (S322). Finally, the display information generation unit 313 generates UI data using the information obtained in steps S321 and S322 (S323). With these operations, the display information generation unit 313 generates UI data from the transmission information.

Figure 38:
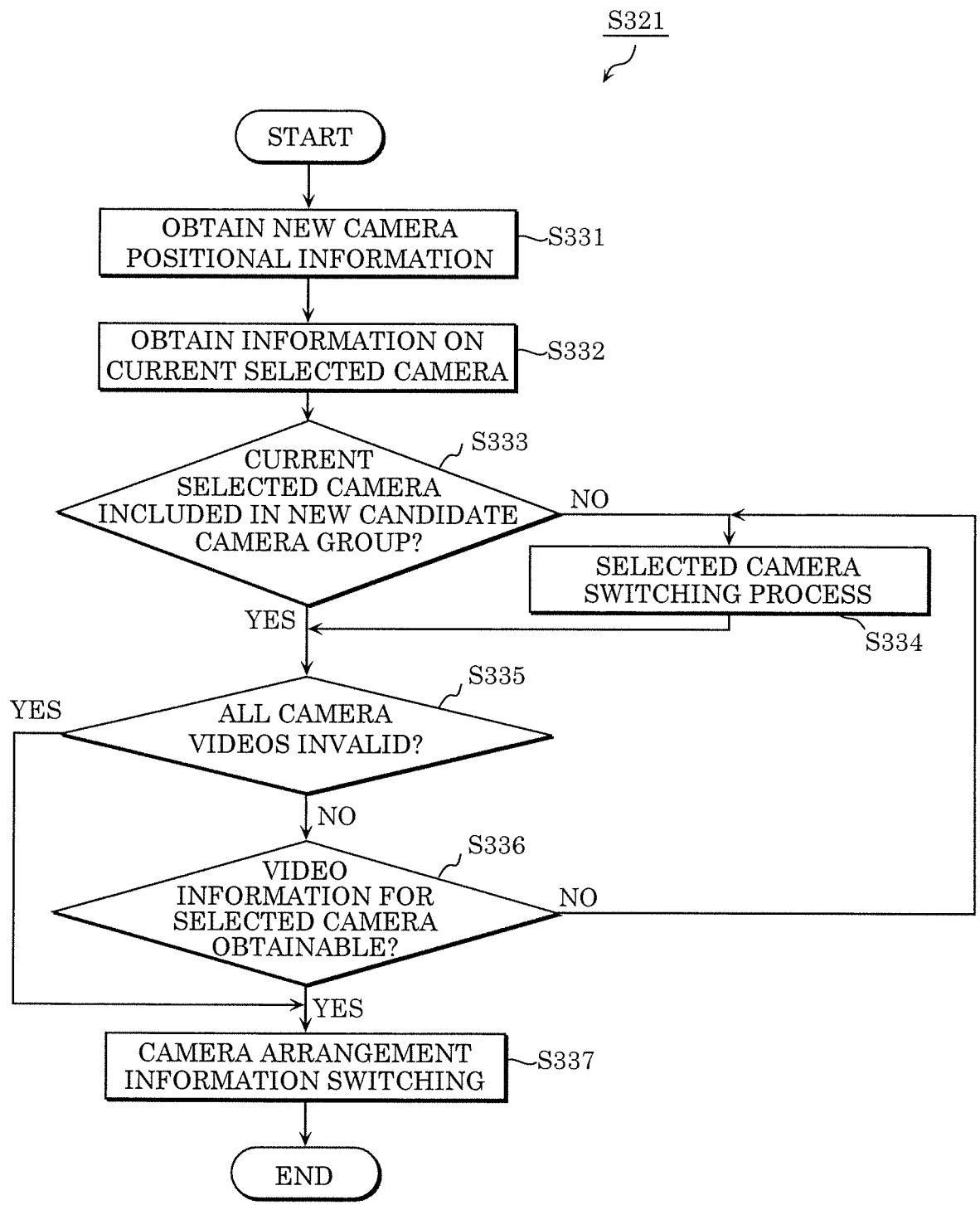
FIG. 38 is a flow chart illustrating a process for updating camera positional information according to Embodiment 2.

Next, the process of updating the camera positional information in step S321 will be described in detail. FIG. 38 is a flow chart illustrating the process for updating the camera positional information (S321).

First, the display information generation unit 313 obtains information identifying a new candidate camera group by obtaining newly received M (2 or more) items of camera positional information (S331). Next, the display information generation unit 313 obtains information on the current selected camera corresponding to the video being displayed in the video display region at the time of reception (S332). Next, the display information generation unit 313 determines whether the current selected camera obtained in step S332 is included in the new candidate camera group or not, based on the camera positional information newly obtained in step S331 (S333).

When the current selected camera is determined to not be included in the new candidate camera group (no in S333), the display information generation unit 313 performs a selected camera switching process to change the selected camera (S334).

Next, display information generation unit 313 determines whether all camera videos corresponding to all cameras included in the new candidate camera group are invalid or not (S335). When the camera video captured by at least one camera included in the new candidate camera group is valid (no in S335), the display information generation unit 313 determines whether the selected video is valid or not (S336). If the selected video is invalid (no in S336), the display information generation unit 313 performs the process of step S334 on all cameras except the camera whose camera video is determined to be invalid. When videos for all cameras in the candidate camera group are invalid (yes in S335), the display information generation unit 313 performs a camera arrangement information switching process, and selects a camera in the candidate camera group as the selected camera (S337). When the selected video is valid (yes in S336), the display information generation unit 313 performs the camera arrangement information switching process, and displays the video captured by the selected camera (S337).

Here, one example of the determination of the validity/invalidity of the camera video in steps S335 and S336, for example, is determining whether the video can be played back or not. For example, due to loss of data in the path from the server 103 to the terminal apparatus 102 and the like, there are instances in which camera video cannot be played back.

There are also instances in which, in the process for updating the camera positional information, the current selected camera is not included in the next candidate camera group. More specifically, when the candidate camera group displayed in the camera UI changes as a result of a change in time or number of cameras, there are instances in which the current selected camera is excluded from the candidate camera group (i.e., the selected camera is excluded from the displayed cameras). This results in not being able to obtain the video captured by the current selected camera. In order to address this, the display information generation unit 313 performs the processes in steps S333 and S334.

Figure 39:
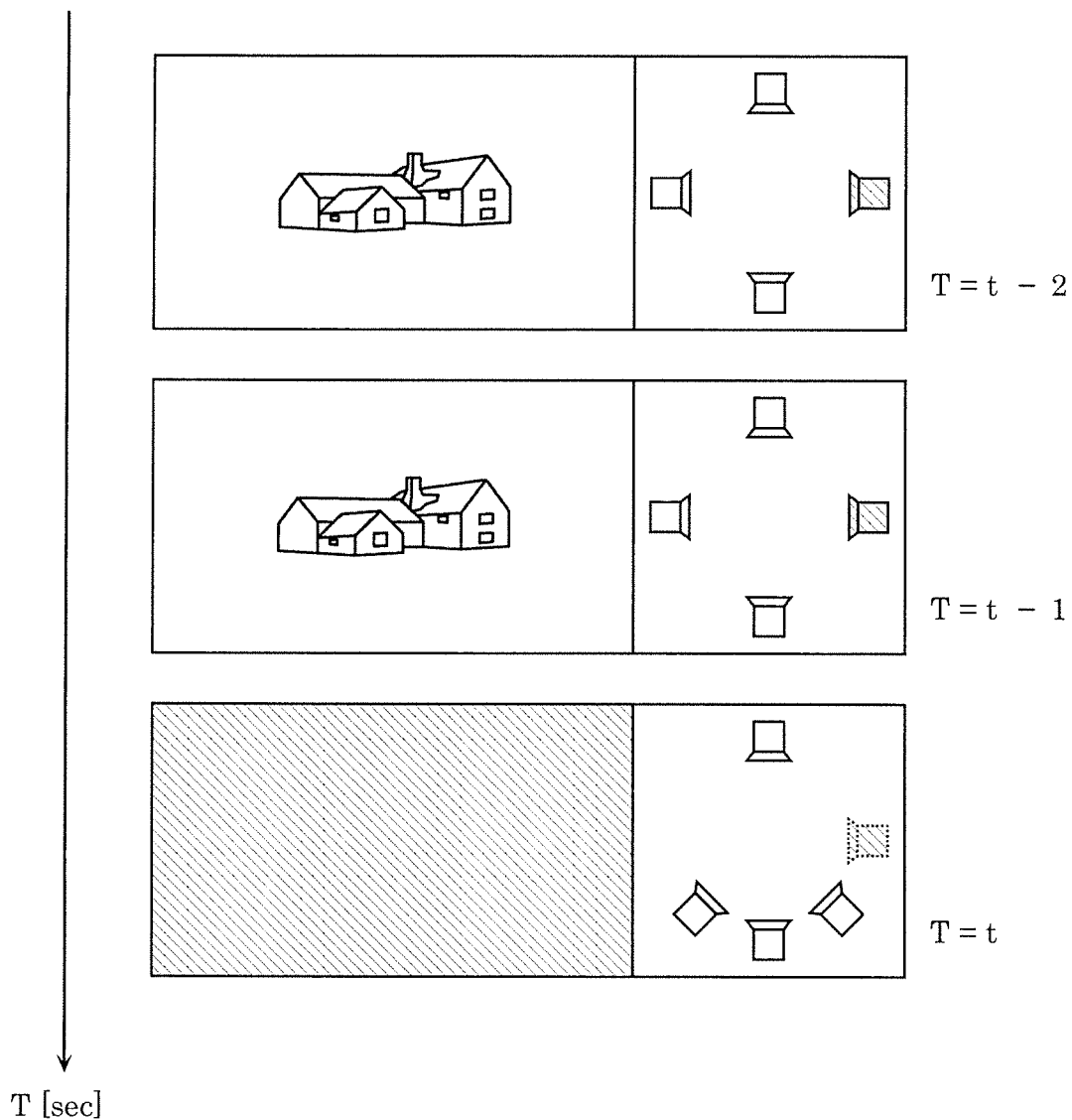
FIG. 39 is a schematic drawing illustrating an example of loss of video from the selected camera according to Embodiment 2.

Hereinafter, an example of operations performed in such cases will be given with reference to the schematic drawing in FIG. 39. FIG. 39 illustrates examples of UI data at times t−2, t−1, and 1, which shifts along the time (T) axis. Here, for illustrative purposes, the selected camera in time t−1 is drawn with a broken line in the camera UI for time t, but the selected camera in time t−1 need not be displayed in the camera UI for time t.

At time t, when the selection of the selected camera at time t−1 not present on the camera UI is maintained, it is difficult to obtain the video displayed in the video display region at time t, making it difficult to display the video. To address this, for example, as illustrated in FIG. 39, loss of video can be indicated in the video display region via bold diagonal lines or by displaying an all-black video, for example. This makes it possible to notify the user that there is no video for the currently selected video. In this way, it is possible to visually notify the user of loss of video of the selected camera. Note that the information provided to the user at this time is not limited to the above-described information. A still image from the video directly before the loss may be displayed, and text information may additionally be displayed. In other words, the method for indicating to the user the loss of camera video is not limited to the above example.

Note that when the currently selected camera is excluded, the display information generation unit 313 may automatically select and set the selected camera from the candidate camera group. This makes it possible to improve the user's experience since it is not necessary for the user to manually reselect a camera.

Figure 40A:
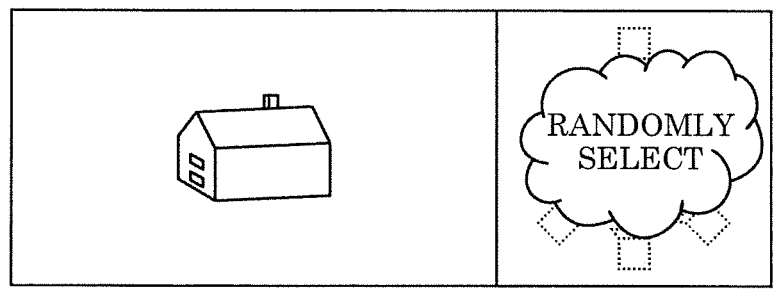
FIG. 40A is a schematic drawing illustrating a process example for when video from the selected camera is lost according to Embodiment 2.
Figure 40B:
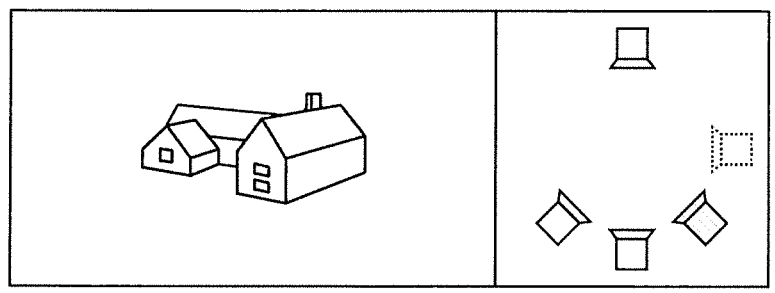
FIG. 40B is a schematic drawing illustrating a process example for when video from the selected camera is lost according to Embodiment 2.
Figure 40C:
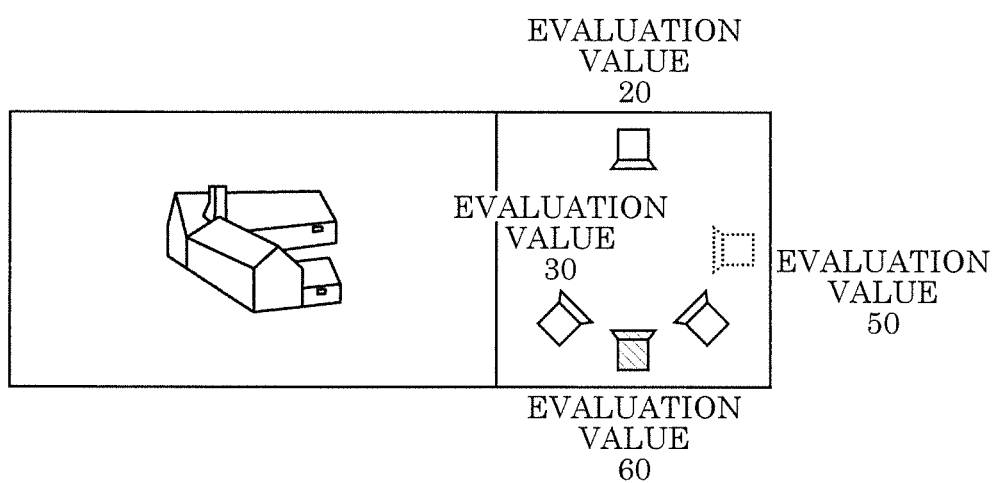
FIG. 40C is a schematic drawing illustrating a process example for when video from the selected camera is lost according to Embodiment 2.

FIGS. 40A through 40C are schematic drawings illustrating camera selection methods in such cases. As illustrated in FIG. 40A, the display information generation unit 313 may randomly select a camera from the candidate camera group at time t. As illustrated in FIG. 40B, the display information generation unit 313 may set the selected camera at time t to the camera closest in position to the selected camera at time t−1, from among the cameras included in the candidate camera group at time t. As illustrated in FIG. 40C, the display information generation unit 313 may obtain evaluation values for the cameras included in the candidate camera group at time t, and set the selected camera based on the evaluation values. For example, display information generation unit 313 sets the camera having the highest evaluation value as the selected camera. For example, information on the selection priority may be sent to the terminal apparatus 102 from the server 103 as evaluation values, and the terminal apparatus 102 may calculate the evaluation values by analyzing the camera videos. The evaluation values sent from the server 103 are, for example, statistical information such as viewer ratings or number of user views for each video, or various types of evaluation values used in the camera selection process by the server 103. When the evaluation values are calculated by the terminal apparatus 102, the terminal apparatus 102 calculates the evaluation values based on, for example, the number of people in the video or the size of advertisement information. More specifically, the more people there are in the video, the higher the evaluation value is, and the larger the advertisement information is, the higher the evaluation value is.

With this, by randomly setting the selected camera, camera selection can be performed with little processing, making it possible to lighten the processing load regarding the selection process. By setting a nearby camera as the selected camera, the difference between videos displayed in the video display region can be reduced, and extreme changes in focal points can be inhibited. By setting the selected camera based on evaluation values, it is possible to control information to be presented to the user on the transmission side.

Note that there are instances in which the selected camera switching process in step S334 is not performed according to the determination of whether the current selected camera is included in the candidate camera group or not in step S333, but the selected camera switching process may be performed without performing step S333. In such cases, it is possible to automatically provide the user 106 with a digest video by setting the cameras having the highest evaluation as the selected camera using evaluation values regarding, for example, viewer rating or number of views. This makes it possible to show a video to the user intended to be shown by the transmission side, without having to send the digest video as a separate stream.

Note that the processes described in Embodiment 2 that are performed by the terminal apparatus 102 may be performed by the server 103. In other words, the server 103 may generate UI data and output the information to the monitor 105. With this, the terminal apparatus 102 need only receive and transmit the UI data to monitor 105, thereby nearly eliminating processes performed by the terminal apparatus 102. Accordingly, low-performance terminals can be used to implement the services.

Moreover, the terminal apparatus 102 may receive information regarding procedures and implement the procedures. For example, in advance, the server 103 or a different device may transmit to the terminal apparatus 102 processes written in a script language such as JavaScript. Then, a generic processor such as a central processing unit (CPU) included in the terminal apparatus 102 implements the received processes. This eliminates the need to prepare a dedicated terminal apparatus.

Variation of Embodiment 2

In this variation, the terminal apparatus 102 obtains information on M cameras (camera videos and camera positional information) from the server 103, reduces the information on the M cameras to information on L cameras (L is a natural number lower than M) by performing a camera selection process, and then performs the same process on the information for the L cameras to generate UI data. More specifically, the server 103 transmits, to a plurality of terminal apparatuses 102 via multicast, a rough result of the selection of M cameras from the N cameras. The terminal apparatuses 102 perform fine camera selection process in order to reduce the M cameras to L cameras. This makes it possible to change the UI data displayed on the monitor 105 as demanded by the user. Here, N, M, and L are natural numbers, and N>M>L.

This makes it possible to transmit data to all users at once via multicast and thus simplify the data transmission on the server 103 side, as well as switch UI data displayed on a per-user basis, in accordance with the demands of the users.

Note that the transmission unit 119 according to Embodiment 2 transmits camera positional information and camera videos as transmission information, but in this variation, evaluation information (evaluation values) used in the camera selection is transmitted.

Figure 41:
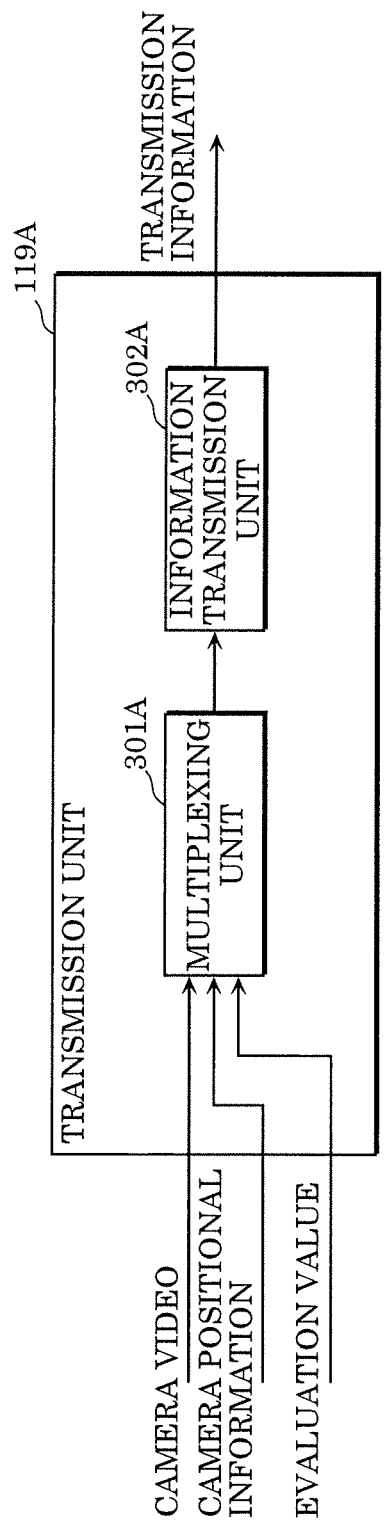
FIG. 41 is a block diagram of a transmission unit according to a variation of Embodiment 2.

The transmission unit 119A according to the present variation will be described with reference to FIGS. 41 and 42. FIG. 41 is a block diagram illustrating one example of the transmission unit 119A according to the present variation. The transmission unit 119A includes a multiplexing unit 301A and an information transmission unit 302A. The transmission unit 119A generates transmission information including camera positional information, camera videos, and evaluation values, and transmits the generated transmission information.

Figure 42:
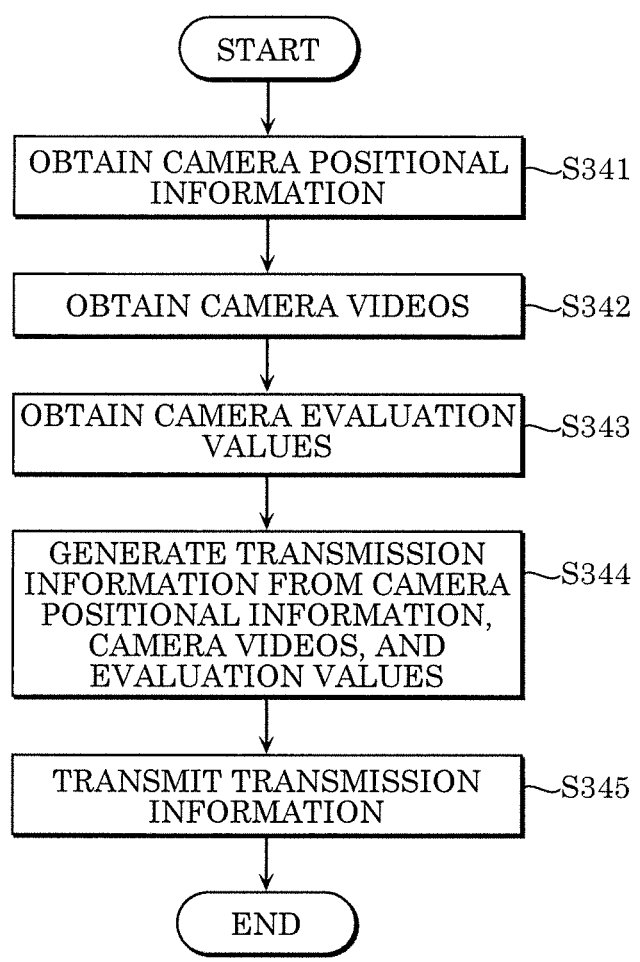
FIG. 42 is a flow chart illustrating a process performed in the transmission unit according to the variation of Embodiment 2.

FIG. 42 is a flow chart illustrating a process performed by the transmission unit 119A. Since operations by components in the server 103 other than the transmission unit 119A are the same as described in Embodiment 2, repeated description will be omitted.

First, the multiplexing unit 301A obtains camera positional information on the cameras selected by the initial camera selection unit 115 and the new camera selection unit 117 (S341). Next, the multiplexing unit 301A obtains videos, which are video information relating to the selected cameras (S342).

Next, the multiplexing unit 301A obtains evaluation values for the camera videos to be used in camera selection (S343). Next, the multiplexing unit 301A generates transmission information by multiplexing the camera positional information, camera videos, and evaluation values obtained in steps S341, S342, and S343 (S344). Finally, the information transmission unit 302A transmits the transmission information generated in step S344 to the terminal apparatus 102A (S345).

Note that the evaluation values obtained in step S343 are, for example, evaluation values calculated in step S201 or S203, or are information obtained by statistical process from viewer information from a plurality of users (such as viewer ratings or number of views), and are evaluation values for cameras included n the camera positional information. Moreover, the values need not be the evaluation values as-is; auxiliary information used when a camera selection is made in the terminal apparatus 102 may be used as the evaluation values. For example, information indicating three-dimensional coordinates for a subject focused upon or the size of a subject focused upon on the screen may be used as an evaluation value.

Figure 43:
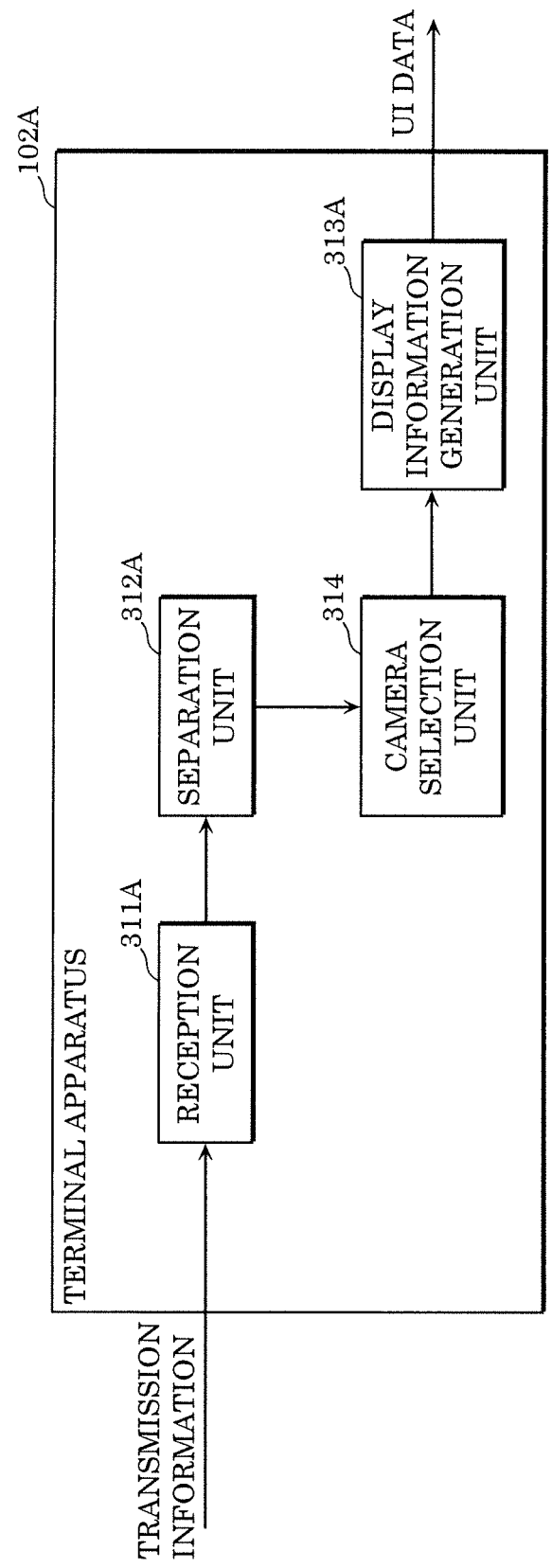
FIG. 43 is a block diagram of a terminal apparatus according to the variation of Embodiment 2.

Next, the configuration of and processes performed by the terminal apparatus 102A will be described with reference to FIGS. 43 and 44. FIG. 43 is a block diagram illustrating one example of the terminal apparatus 102A. The terminal apparatus 102A includes a reception unit 311A, a separation unit 312A, a camera selection unit 314, and a display information generation unit 313A. The terminal apparatus 102A generates UI data to be displayed on the monitor 105, from the transmission information transmitted from the server 103.

Figure 44:
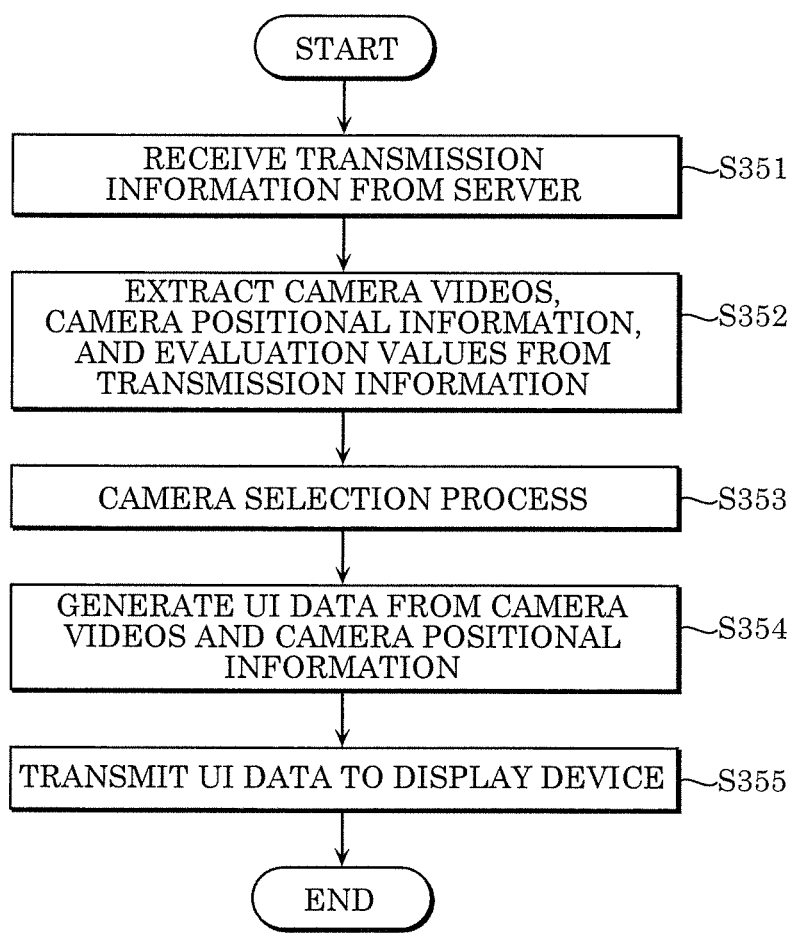
FIG. 44 is a flow chart illustrating a process performed in the terminal apparatus according to the variation of Embodiment 2.

FIG. 44 is a flow chart illustrating a process performed by the terminal apparatus 102A. First, the reception unit 311A receives transmission information transmitted from the server 103 (S351). Next, the separation unit 312A separates the camera videos, camera positional information, and evaluation values from the transmission information (S352). Next, the camera selection unit 314 selects cameras using the camera videos, camera positional information, and evaluation values extracted in step S352 (S353). Next, the display information generation unit 313A generates UI data to be displayed on the monitor 105, from the camera positional information and camera videos for the plurality of cameras selected in S353 (S354). Next, the display information generation unit 313A transmits the UI data generated in step S354 to the monitor 105 (S355). These processes provide the user 106 with the UI data.

Figure 45:
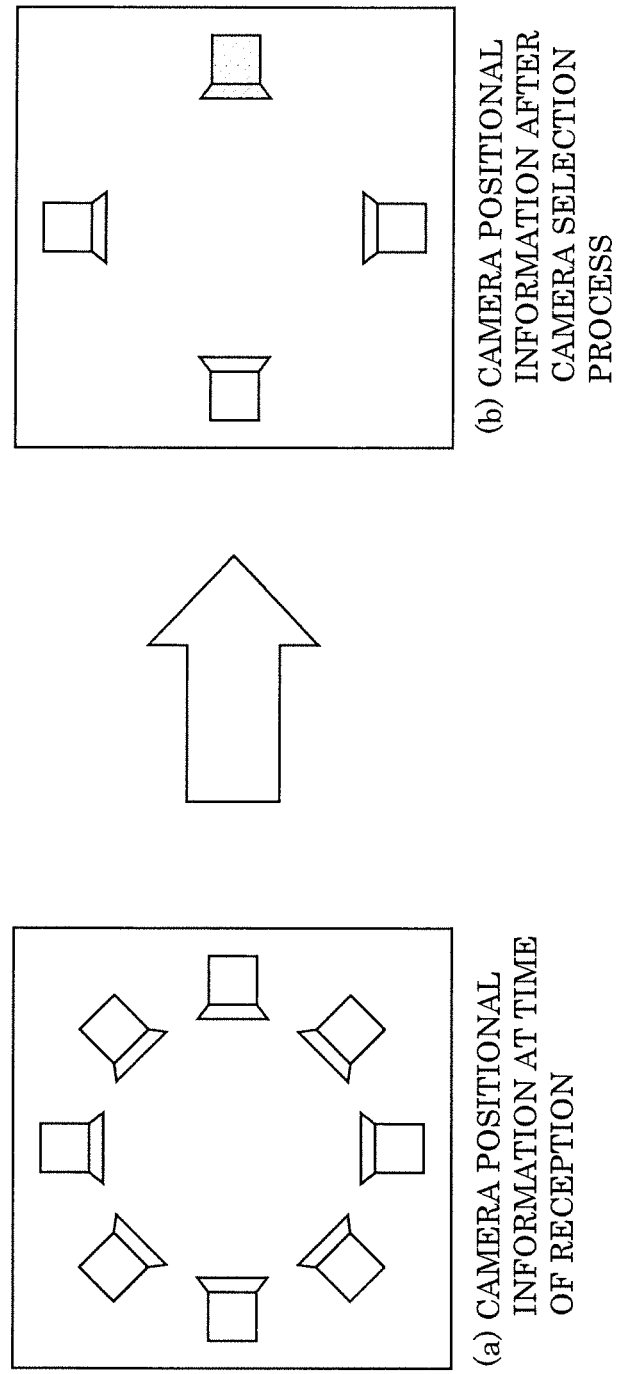
FIG. 45 is a schematic drawing illustrating a result of the camera selection process in the terminal apparatus according to the variation of Embodiment 2.

Next, the camera selection process of step S353 will be described with reference to FIG. 45. In the example illustrated in FIG. 45, camera positional information for 8 cameras is included in the camera positional information received by the terminal apparatus 102A. The terminal apparatus 102A performs the camera selection process (S353) for selecting 4 of the 8 cameras. More specifically, this camera selection process may be the process performed in the flow chart illustrated in FIG. 6 or an analytic process such as the flow chart illustrated in FIG. 22, and may be a simple process in which evaluation values given by the server are used to select a predetermined number of cameras, for example, in descending order of viewer rating.

Note that since the processes of steps S313 and S314 illustrated in FIG. 34 may be used for the processes of steps S354 and S355, repeated description thereof is omitted.

Figure 46:
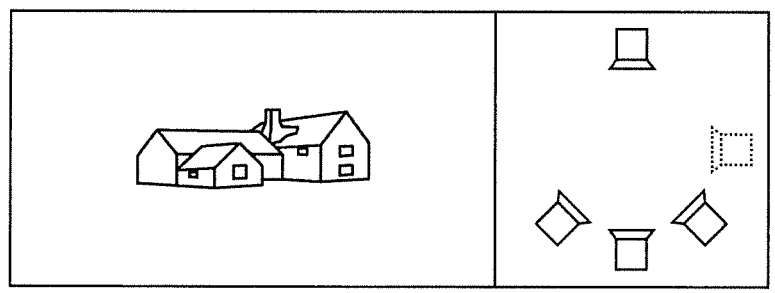
FIG. 46 is a schematic drawing illustrating a process example of loss of video from the selected camera according to Embodiment 2.

Note that the process for when the camera video corresponding to the selected camera is missing is as described with reference to FIGS. 39 and 40A through 40C, but in a variation the following process may be added. One example of such a process will be described with reference to the schematic drawing illustrated in FIG. 46. Note that in FIG. 46, the camera selected at the previous point in time is indicated with a broken line in the camera UI, but in actuality, this camera need not be displayed. As illustrated in FIG. 46, video captured by the camera selected at the previous point in time may be displayed. More specifically, a camera selected at a given point in time is included in the candidate camera group received by the terminal apparatus 102A for the next point in time, but there are instances in which it is not included in the candidate camera group obtained via the camera selection process in step S353. In such cases, since the terminal apparatus 102A receives the camera video of the currently selected camera, the camera video of the selected camera is continued to be displayed. With this, it is possible to inhibit a switch to a video the user does not wish to see, when the user wishes to see video captured by a certain camera.

Figure 47:
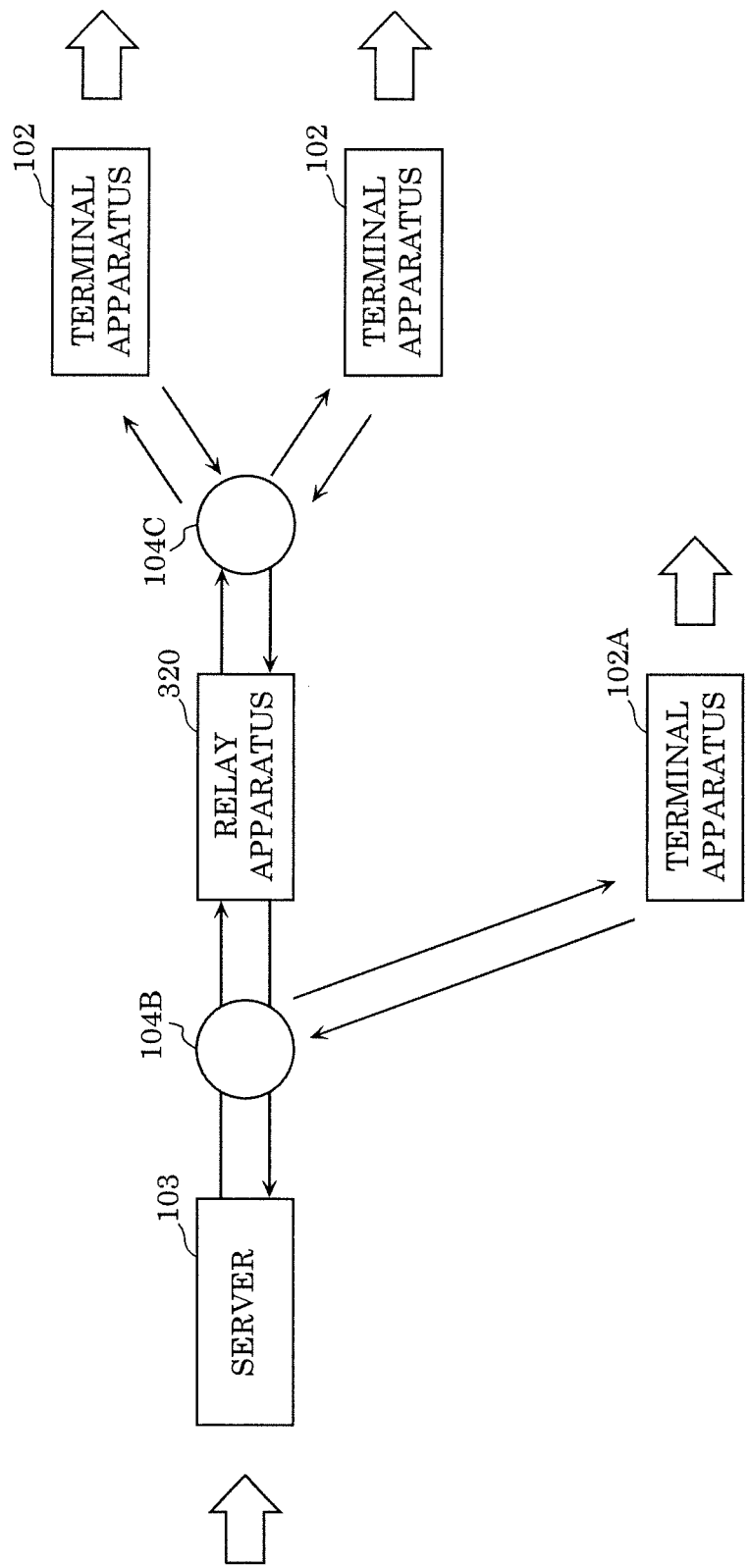
FIG. 47 is a schematic drawing illustrating one example of a system according to the variation of Embodiment 2.

In the above description, an example is given in which the camera selection process (S353) is performed by the terminal apparatus 102A, but a relay apparatus 320 disposed between the server 103 and the terminal apparatus 102 may perform the camera selection process. Hereinafter, this will be described with reference to the schematic drawing illustrated in FIG. 47. In the example illustrated in FIG. 47, the server 103 is connected to the relay apparatus 320 and the terminal apparatus 102A via network 104B. Moreover, the relay apparatus 320 is connected to the terminal apparatus 102 via network 104C. Note that the terminal apparatuses 102 and 102A illustrated in FIG. 47 may be any one of the terminal apparatuses described in the above embodiments. For example, the terminal apparatus 102 has the same functions as described in Embodiment 2, and the terminal apparatus 102A has the same functions as described in the variation of Embodiment 2.

The server 103 transmits transmission information including camera information for N cameras. The relay apparatus 320 performs the camera selection process described above using the transmission information from the server 103 to generate transmission information including camera information for M cameras (N>M). Here, when camera information for one or more cameras is included in the received camera information, the relay apparatus 320 treats the camera(s) indicated in the camera information as a candidate camera group. Next, the terminal apparatus 102 generates UI data based on the transmission information from the relay apparatus 320.

This example assumes an environment in which a sports game is being captured, such as a soccer match. More specifically, a broadband environment (network 104B) in a stadium. The inside and outside of the stadium are connected via the internet (network 104C). In this way, when there is a mix of users in different network environments, the example described above is beneficial. In such cases, the amount of information that can be transmitted to a user on the internet differs from the amount of information that can be transmitted to a user on the stadium network. Accordingly, when setting the number of cameras included in the information transmitted by the server 103 in accordance with a user on the internet, even in cases in which more information can be provided to a user on the stadium network, the amount of information transmitted is restricted. In contrast, by using the relay apparatus 320 which reduces the number of cameras, it is possible to transmit information of an amount suitable for the respective transmission speeds of users on the stadium network and users on the internet.

Figure 48:
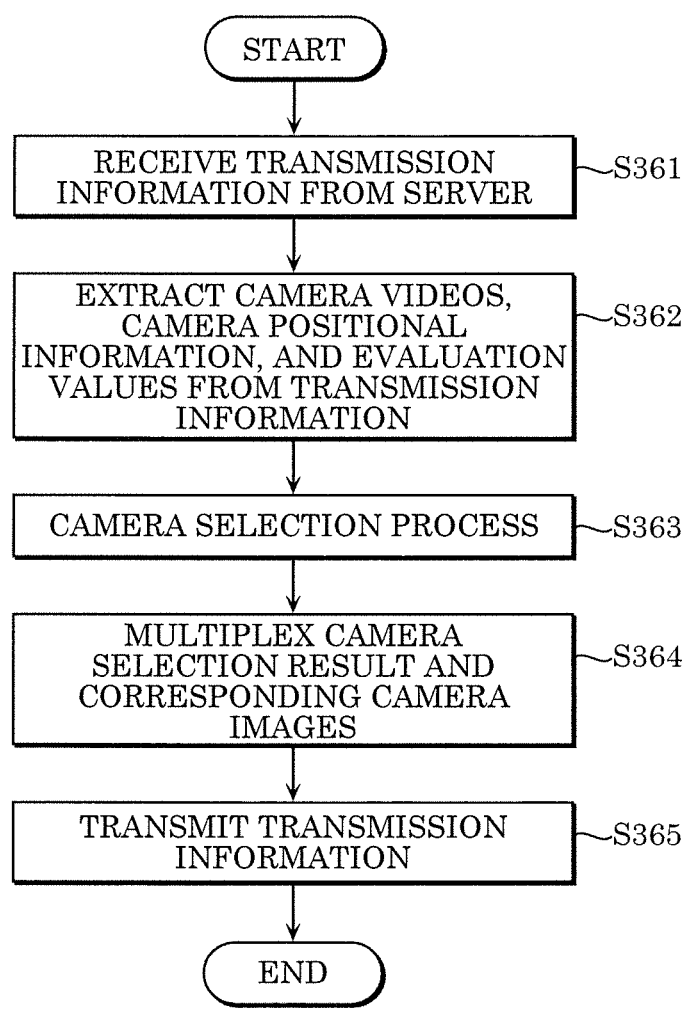
FIG. 48 is a block diagram of a relay apparatus according to the variation of Embodiment 2.

FIG. 48 is a block diagram illustrating one example of the relay apparatus 320. The relay apparatus 320 includes a reception unit 321, a separation unit 322, a camera selection unit 323, a multiplexing unit 324 and an information transmission unit 325. The relay apparatus 320 performs the camera selection process on transmission information relating to N cameras transmitted from the server 103, to generate camera information on M cameras, and transmits transmission information including the generated camera information to the terminal apparatus 102.

Figure 49:
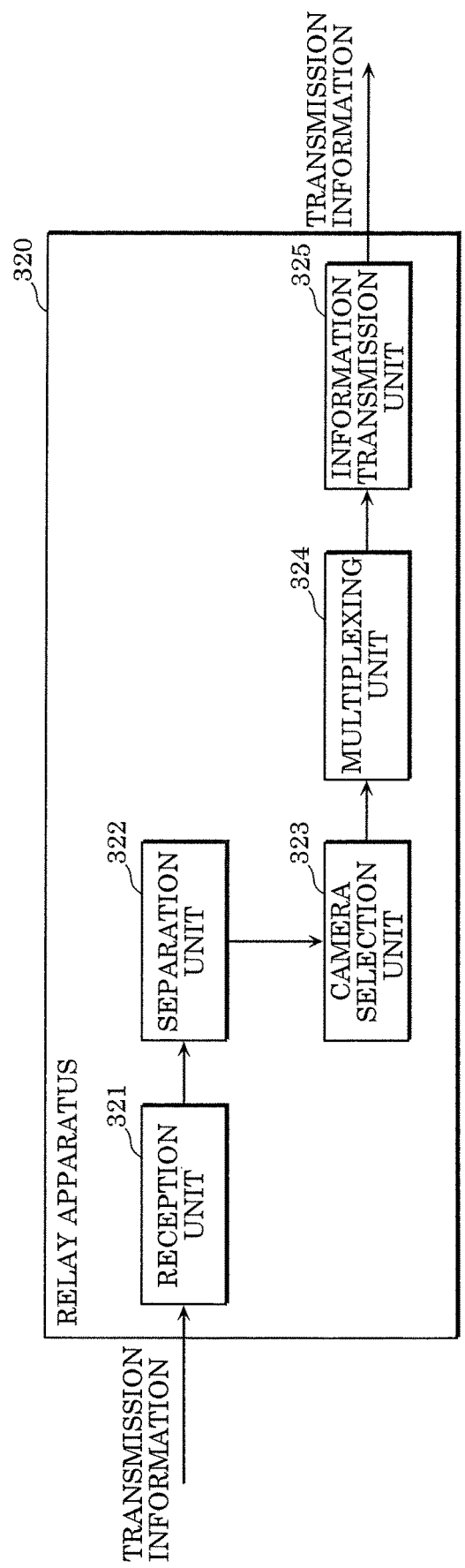
FIG. 49 is a flow chart illustrating a process performed in the relay apparatus according to the variation of Embodiment 2.

FIG. 49 is a flow chart illustrating one example of a process performed by relay apparatus 320. First, the reception unit 321 receives transmission information including camera information for N cameras transmitted from the server 103 (S361). Next, the multiplexing unit 324 extracts camera videos, camera positional information, and evaluation values from the transmission information (S362). Next, the camera selection unit 323 performs the camera selection process using the camera videos, camera positional information, and evaluation values extracted in step S362 (S363). Note that the details regarding this process are the same as the above-described camera selection process performed by terminal apparatus 102A.

Next, the multiplexing unit 324 multiplexes the camera videos, camera positional information, and evaluation values for the cameras selected in step S363 to generate transmission information (S364). Next, the information transmission unit 325 transmits the transmission information generated in step S364 to the terminal apparatus 102 (S365).

Note that the number of relay apparatuses 320 need not be 1; another relay apparatus may be disposed between the server 103 and the relay apparatus 320. In other words, relay apparatuses may be provided in multiple stages.

Note that in Embodiment 2 and the variation thereof, there is no need for the selection of M cameras from N cameras to be performed by the server 103; a plurality of items of camera positional information and corresponding camera videos may be input into the terminal apparatus 102 or 102A.

Figure 50:
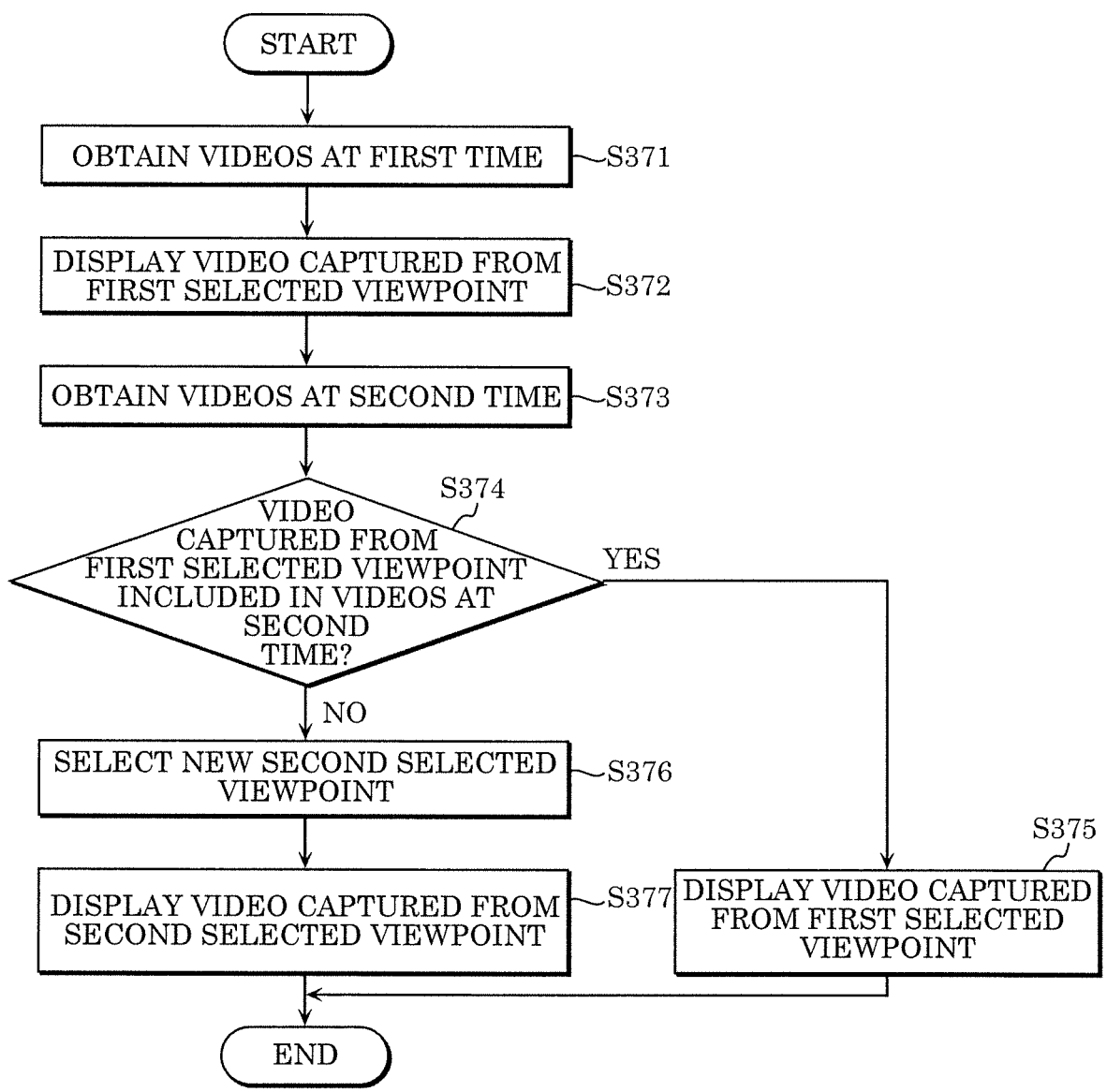
FIG. 50 is a flow chart illustrating a process for displaying videos according to Embodiment 2.

As described above, the video display device (terminal apparatus 102 or 102A) according to Embodiment 2 and the variation thereof performs the video display method illustrated in FIG. 50.

First, the video display device obtains, at a first time, a plurality of second videos (camera videos) selected from a plurality of first videos obtained by capturing the same scene from a plurality of mutually different viewpoints (S371). For example, in an external device (server 103), the plurality of second videos are selected from the plurality of first videos, and transmitted to the video display device. The video display device further obtains first viewpoint information (camera positional information) indicating a plurality of first viewpoints corresponding to the plurality of second videos (which are the viewpoints (camera positions) from which the plurality of second videos captured the videos).

Next, the video display device selects, as a first selected viewpoint, one first viewpoint from among the plurality of first viewpoints, and displays a second video that is included in the plurality of second videos and corresponds to the first selected viewpoint (S372). The video display device further displays the plurality of first viewpoints and the first selected viewpoint.

Next, the video display device obtains, at a second time after the first time (i.e., after the plurality of first videos), a plurality of fourth videos selected from a plurality of third videos obtained by capturing the scene, from a plurality of mutually different viewpoints (S373). The video display device further obtains second viewpoint information (camera positional information) indicating a plurality of second viewpoints.

Here, as described above, the plurality of second viewpoints of the plurality of fourth videos obtained at the second time may be different from the plurality of first viewpoints of the plurality of second videos obtained at the first time.

Next, the video display device determines whether the first selected viewpoint is included in the plurality of second viewpoints corresponding to the plurality of fourth videos (S374).

When the first selected viewpoint is determined to be included in the plurality of second viewpoints (yes in S374), the video display device displays a fourth video that is included in the plurality of fourth videos and corresponds to the first selected viewpoint (S375). The video display device further displays the plurality of second viewpoints and the second selected viewpoint. In other words, the video display device continuously displays videos captured from the same viewpoint (the first selected viewpoint) at the first time.

However, when the first selected viewpoint is determined to not be included in the plurality of second viewpoints (no in S374), the video display device selects one second viewpoint from among the plurality of second viewpoints as a second selected viewpoint (S376). More specifically, for example, as illustrated in FIG. 40B, the video display device selects, as the second selected viewpoint, the second viewpoint among the plurality of second viewpoints that is closest to the first selected viewpoint. Alternatively, as illustrated in FIG. 40C, based on the evaluation values for the plurality of second viewpoints, the video display device selects the second viewpoint having the highest evaluation as the second selected viewpoint. For example, this evaluation value is determined based on the number of times that the plurality of second viewpoint videos have been viewed.

Next, the video display device displays a fourth video that is included in the plurality of fourth videos and corresponds to the second selected viewpoint (S377). The video display device further displays the plurality of second viewpoints and the second selected viewpoint. In other words, the video display device displays video captured from the second selected viewpoint, which is different from the first selected viewpoint at the first time, by switching viewpoints.

As described with reference to FIGS. 43 through 45 in the variation of Embodiment 2, the video display device may further select a plurality of fifth videos from the plurality of second videos, and select a plurality of sixth videos from the plurality of fourth videos. In such cases, in step S372, the video display device selects, as the first selected viewpoint, one third viewpoint from among the plurality of third viewpoints corresponding to the plurality of fifth videos, and displays a fifth video that is included in the plurality of fifth videos and corresponds to the first selected viewpoint. Moreover, in step S374, the video display device determines whether the first selected viewpoint is included in the plurality of fourth viewpoints corresponding to the plurality of sixth videos. When the first selected viewpoint is determined to be included in the plurality of fourth viewpoints (yes in S374), in step S375, the video display device displays a sixth video that is included in the plurality of sixth videos and corresponds to the first selected viewpoint. When the first selected viewpoint is determined to not be included in the plurality of fourth viewpoints (no in S374), in steps S376 and S377, the video display device selects one fourth viewpoint included in the plurality of fourth viewpoints as the second selected viewpoint, and displays a sixth video that is included in the plurality of sixth videos and corresponds to the second selected viewpoint.

Moreover, as described with reference to FIG. 46, when the first selected viewpoint is determined to not be included in the plurality of fourth viewpoints and the first selected viewpoint is included in the plurality of second viewpoints, in steps S376 and S377, the video display device may display a fourth video that is included in the plurality of fourth videos and corresponds to the first selected viewpoint, and when the first selected viewpoint is determined to not be included in the plurality of fourth viewpoints and the first selected viewpoint is not included in the plurality of second viewpoints, in steps S376 and S377, the video display device may display a sixth video that is included in the plurality of sixth videos and corresponds to the second selected viewpoint.

Although viewpoints are selected in this example, cameras may be selected instead. In other words, the "viewpoint(s)" in the above description may be replaced with "camera(s)".

Although the method for selecting cameras, the video distribution system, the video display method, and the video display device according to embodiments have been described, the present disclosure is not limited to the embodiments.

Each processing unit included in each apparatus included in the video distribution system according to the embodiments is achieved through large-scale integration (LSI), which is typically embodied as an integrated circuit. Each processing unit may be realized as a chip, or some or all of the processing units may be realized as a chip.

An integrated circuit need not be obtained through LSI, but may be a dedicated circuit or a general-purpose processor. A field-programmable gate array (FPGA) for which programming can be performed after an LSI circuit is fabricated or a reconfigurable processor capable of reconfiguring connections and settings of circuit cells of an LSI circuit may be used, instead.

In the above embodiments, each component may be achieved by dedicated hardware or a software program suitable for each component. Each component may be achieved by a program execution unit such as a central processing unit (CPU) or a processor that reads and executes a software program stored in a storage medium such as a hard disk or a semiconductor memory, instead.

In other words, each apparatus included in the video distribution system or the video display device includes processing circuitry and a storage (can be accessed from the processing circuitry) electrically connected to the processing circuitry. The processing circuitry includes at least either dedicated hardware or a program execution unit. If the processing circuitry includes a program execution unit, the storage is used for storing a software program executed by the program execution unit. The processing circuitry executes the method for selecting cameras or the video display method according to the embodiments using the storage.

Furthermore, the present disclosure may be implemented as the software program or a non-transitory computer-readable storage medium storing the software program. The software program can obviously be distributed through a communication medium such as the Internet.

Numbers in the above description are examples used for specifically describing the present disclosure, and the present disclosure is not limited by such numbers.

Order of the steps included in the method for selecting cameras or the video display method or the like are examples used for specifically describing the present disclosure, and the order of the steps may be different from that described above. Some of the steps may be performed at the same time as (in parallel with) other steps.

Although the video distribution system, method for selecting cameras, the video display method, and the video display device according to one or a plurality of aspects of the present disclosure have been described on the basis of the embodiments, the present disclosure is not limited to the embodiments. Modes obtained by modifying the embodiment in various ways that can be conceived those skilled in the art and modes obtained by combining components described in different embodiments may be included in the one or plurality of aspects of the present disclosure insofar as the scope of the present disclosure is not deviated from.

Embodiment 3

Other application examples of the configurations of the image processing method and apparatus described in each embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 51:
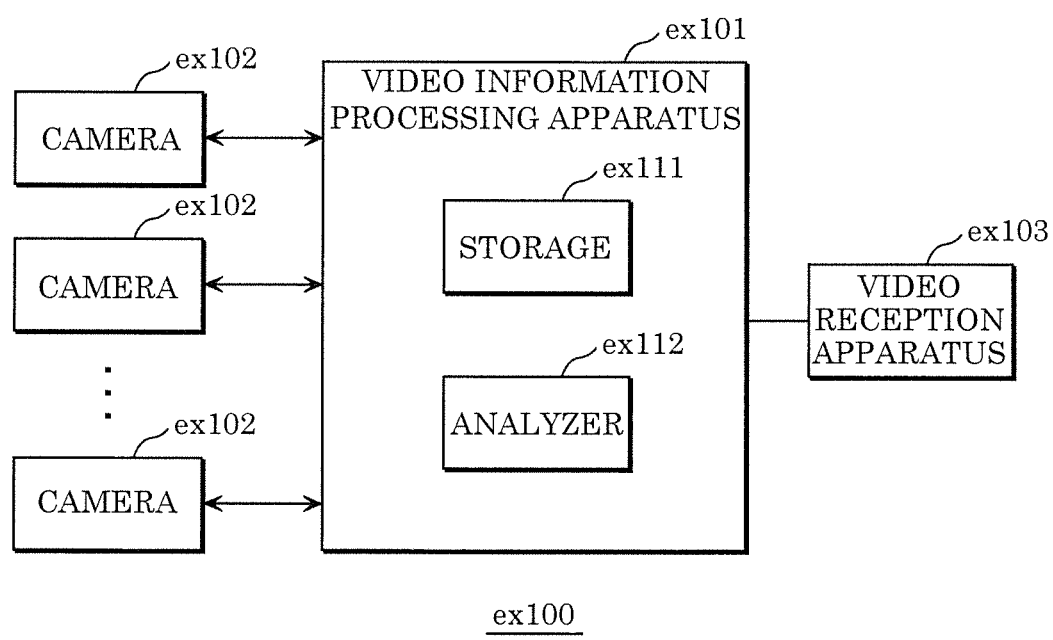
FIG. 51 illustrates a configuration of a video information processing system.

FIG. 51 is a diagram illustrating a configuration of video information processing system ex100 according to the present embodiment. The present embodiment describes an example of preventing occurrence of a blind spot and an example of prohibiting capturing of a specific area.

Video information processing system ex100 illustrated in FIG. 51 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a blind spot from the video data stored in storage ex111, and transmits to the moving camera the instruction signal that indicates an instruction to the moving camera for preventing occurrence of a blind spot. The moving camera moves in response to the instruction signal, and continues capturing.

Analyzer ex112 detects a blind spot by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a blind spot an area that is difficult to restore.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a blind spot is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a blind spot by using any method that enables detection of the capturing area of each camera. Moreover, analyzer ex112 may acquire, for example, information of a mutual positional relationship between a plurality of objects to be captured, from video data or a proximity sensor, and analyzer ex112 may identify an area where a blind spot is highly likely to occur, based on the acquired positional relationship.

Here, the blind spot includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a blind spot even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a blind spot may be determined.

Note that detection of the area that is actually a blind spot is described above, but the area that needs to be detected in order to prevent occurrence of a blind spot is not limited to the area that is actually a blind spot. For example, when a plurality of objects to be captured exists and at least part of the objects is moving, a new blind spot is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new blind spot, based on the detected movement of the plurality of objects to be captured and positional information of camera ex102. In this case, video information processing apparatus ex101 may transmit the instruction signal to the moving camera to capture the area that is likely to become a blind spot, and video information processing apparatus ex101 may prevent occurrence of a blind spot.

Note that when there is a plurality of moving cameras, video information processing apparatus ex101 needs to select any of the moving cameras to which the instruction signal is to be transmitted in order to cause the moving camera to capture a blind spot or an area that is likely to become a blind spot. Moreover, when there is a plurality of moving cameras and there is a plurality of blind spots or areas that are likely to become blind spots, video information processing apparatus ex101 needs to determine which blind spot or area that is likely to become a blind spot each of the plurality of moving cameras is to capture. For example, video information processing apparatus ex101 selects the moving camera closest to a blind spot or an area that is likely to become a blind spot, based on a position of a blind spot or an area that is likely to become a blind spot, and a position of an area each moving camera is capturing. Moreover, video information processing apparatus ex101 may determine for each camera whether a new blind spot occurs when video data which the moving camera is currently capturing is not obtained, and video information processing apparatus ex101 may select the moving camera that is determined that a blind spot does not occur even when the video data which is currently being captured is not obtained.

The above-described configuration enables video information processing apparatus ex101 to prevent occurrence of a blind spot by detecting a blind spot and transmitting the instruction signal to the moving camera so as to prevent the blind spot.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the capturing area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current capturing area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the capturing area is not limited thereto, but various methods for determining the capturing area described in each of the above-described embodiments or other methods for determining the capturing area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. For example, in the case of distributing during halftime, video information processing apparatus ex101 may distribute a scene which the user has missed and which is considered to be important, based on the analysis result made by analyzer ex112. Moreover, video information processing apparatus ex101 may distribute the past video when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 6. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge only when the user views the advertisement, or may provide services at a lower cost than a cost in the case where the user does not view the advertisement.

Moreover, when the user clicks "Order now" or the like in response to the advertisement, a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras). In this case, analyzer ex112 matches the free viewpoint video with the video captured by the user camera, and accordingly analyzer ex112 determines which area in the facility or in the stadium the user camera is capturing. Note that the method for determining the capturing area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area that is moved according to the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video from the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, the user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the capturing area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control only any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a blind spot, some area of the capturing areas in the captured video data is likely to be needed for filling the blind spot. In this case, camera ex102 may generate extracted video data by extracting at least the area needed for preventing occurrence of the blind spot from the video data, and transmit the generated extracted video data to video information processing apparatus ex101. This configuration can realize suppression of occurrence of the blind spot at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the capturing area from more cameras ex102, video information processing apparatus ex101 is effective, for example, for using information of the capturing area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present embodiment is effective.

Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the external appearance video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may preferentially restore the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using high-quality data, or by preferentially using high-quality data among the plurality of pieces of video data stored in storage ex111.

Variation 14

Analyzer ex112 may restore the three-dimensional shape by using camera attribute information. For example, analyzer ex112 may generate the three-dimensional shape video by a method such as a volume intersection technique or a multi-view stereo method by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 52:
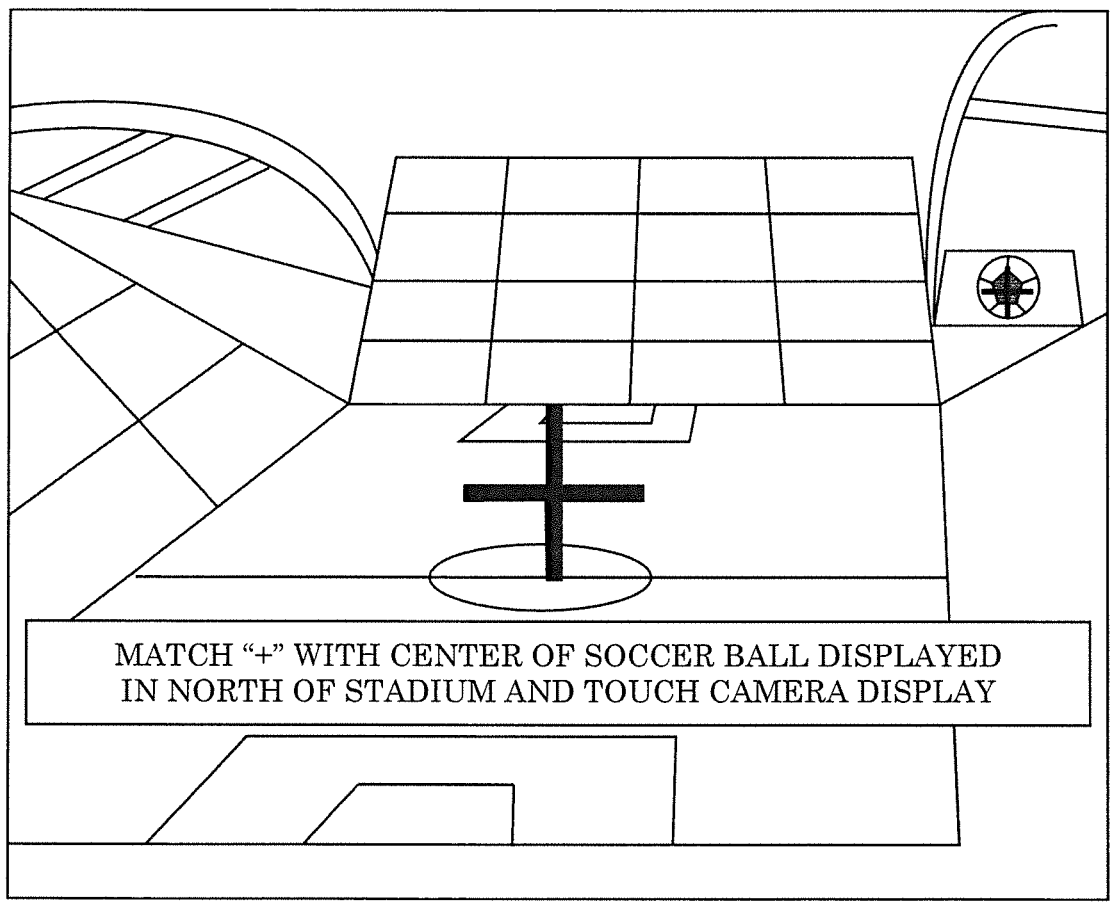
FIG. 52 illustrates one example of a notification screen displayed when a camera is activated.

Moreover, the positional and angle information of camera ex102 is acquired by pointing camera ex102 at a specific point in the facility or in the stadium when camera ex102 is activated or at any timing. FIG. 52 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the capturing area during a capturing period by using an arrow or the like may be used.

The coordinates of camera ex102 may be identified by using a radio wave of the global positioning system (GPS), wireless fidelity (WiFi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera, weather and a road surface state in a direction of a destination, traffic congestion level and the like can be understood with better accuracy by using three-dimensional data modeled from a plurality of images.

Variation 17

The above-described system may also be applied to a system that performs distance measurement or modeling of a building or equipment by using a plurality of cameras, for example.

Here, for example, in a case of capturing an image of a building from above using one drone, and performing distance measurement or modeling of the building, there is a phenomenon in that an image of an animal may be captured by the camera during distance measurement, thereby reducing the accuracy of distance measurement. There is also a phenomenon in that distance measurement and modeling cannot be performed with respect to an animal.

Meanwhile, by using a plurality of cameras (fixed cameras, smartphones, wearable cameras, drones, etc.) as described above, distance measurement and modeling of a building may be performed with stable accuracy regardless of presence or absence of an animal. Also, distance measurement and modeling may be performed with respect to an animal.

Specifically, for example, at a construction site, a camera is attached to a helmet or the like of a worker. This allows distance measurement of the building to be performed in parallel to the work of the worker. Also, efficiency of work may be increased, and mistakes may be prevented. Furthermore, modeling of the building may be performed by using a video captured by the camera worn by the worker. Moreover, a manager at a remote location may check the progress by looking at a modeled building.

Moreover, this system may be used for inspection of equipment that is difficult to stop, such as a machine at a factory or a power station. Also, this system can be used to inspect opening/closing of a bridge or a dam, or to inspect an abnormality in the operation of a ride in an amusement park, for example.

Moreover, by monitoring the level of traffic jam or the amount of traffic on a road by this system, a map indicating the level of traffic jam or the amount of traffic on the road in each time zone may be created.

Embodiment 4

The processing described in each of the above-described embodiments can be carried out easily in a standalone computer system by recording a program for implementing the configuration of the image processing method described in each embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the embodiments and the systems using the application examples will be further described. The systems include an apparatus that uses the image processing method. A change in other configurations of the systems can be made appropriately in accordance with the circumstances.

Figure 53:
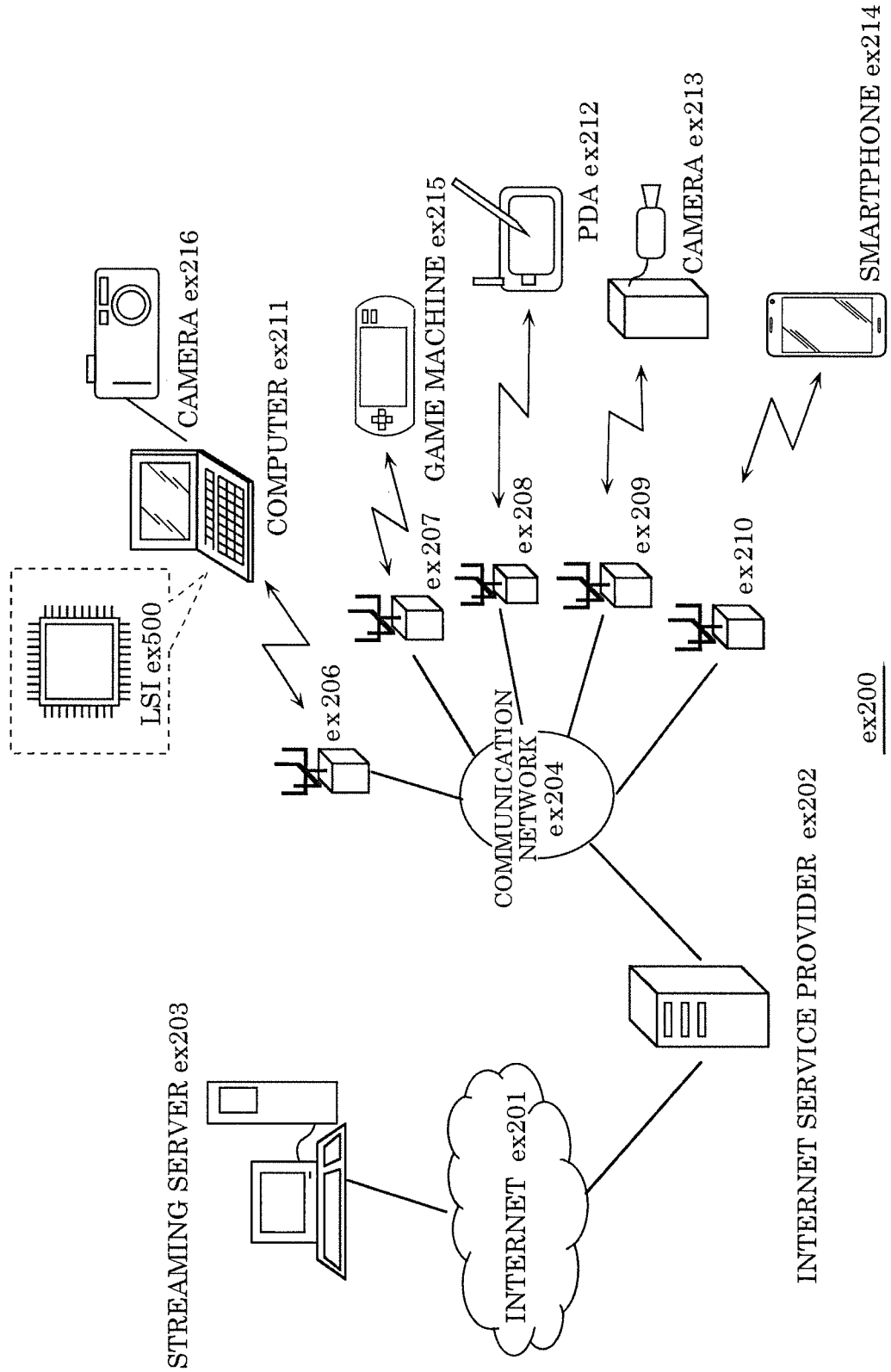
FIG. 53 illustrates an overall configuration of a content providing system that implements content distribution services.

FIG. 53 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 53, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LTE) scheme, an high speed packet access (HSPA) scheme, or a communication scheme using high-frequency bands, or a personal handyphone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may include a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 54:
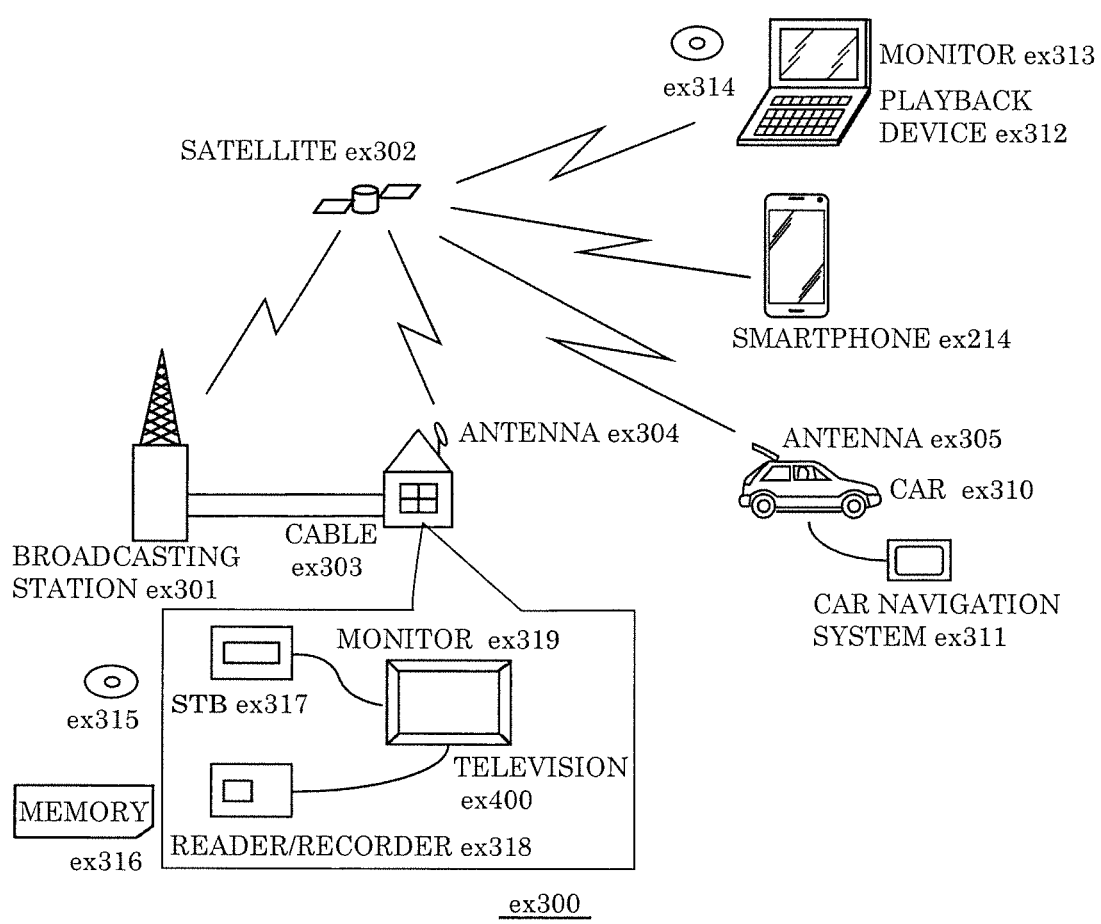
FIG. 54 illustrates an overall configuration of a digital broadcasting system.

Note that in addition to the example of content providing system ex200, each of the above-described embodiments may also be applied to digital broadcasting system ex300, as illustrated in FIG. 54. Specifically, broadcasting station ex301 transmits multiplexed data obtained by multiplexing video data with music data or the like via a radio wave to communication or satellite ex302. This video data is data coded by the moving image coding method described in each of the above-described embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 55:
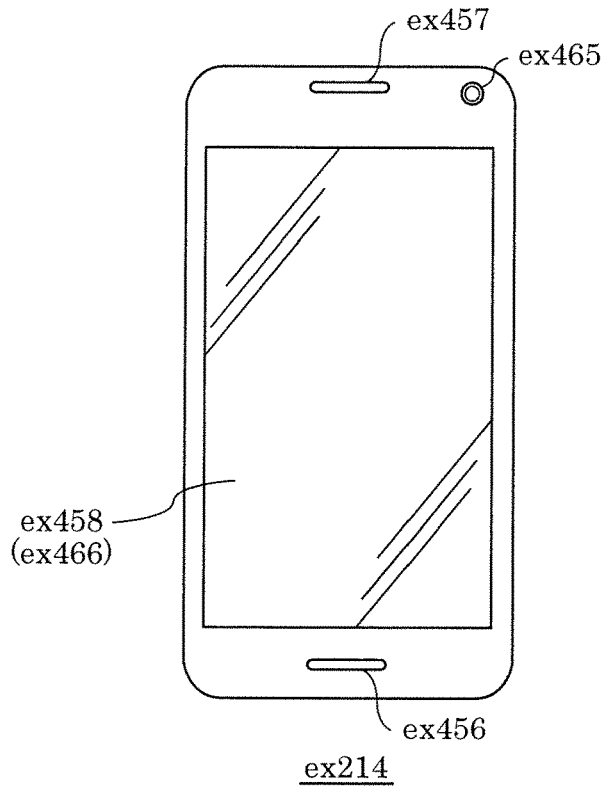
FIG. 55 illustrates one example of a smartphone.
Figure 56:
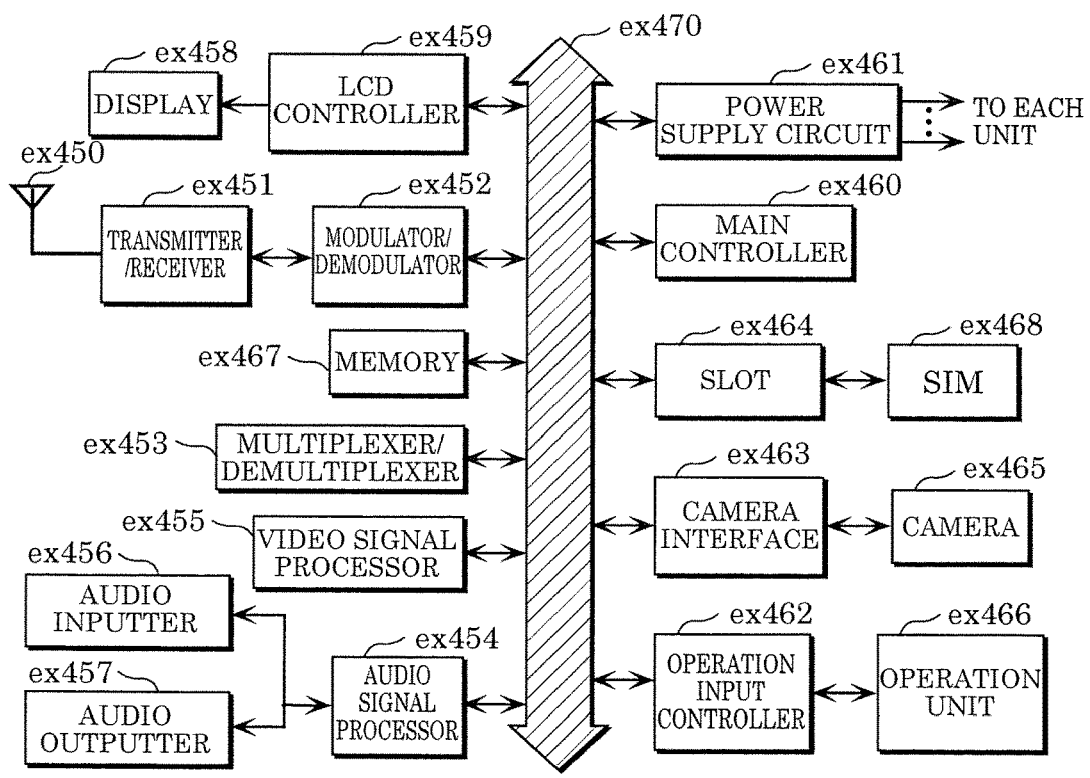
FIG. 56 is a block diagram illustrating an example of a configuration of a smartphone.

FIG. 55 is a diagram illustrating smartphone ex214. Moreover, FIG. 56 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 54, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214 amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including only an encoder, and a reception terminal including only a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

Moreover, the present disclosure is not limited to the above-described exemplary embodiments, and various variations or modifications can be made without departing from the scope of the present disclosure.

INDUSTRIAL APPLICABILITY

The present disclosure can be applied to a video distribution system or the like that distributes videos captured by a plurality of cameras.

What is claimed is:
1. A video display method performed by a display device, comprising:
    obtaining, by the display device, from a server, a plurality of second videos selected from among a plurality of first videos, the plurality of first videos being obtained by capturing a same scene from a plurality of mutually different viewpoints, the plurality of second videos being some of the plurality of first videos selected by the server;

selecting, by the display device, as a first selected viewpoint, one first viewpoint from among a plurality of first viewpoints corresponding to the plurality of second videos;

displaying, by the display device, a second video that is included in the plurality of second videos and corresponds to the first selected viewpoint;

obtaining, by the display device, from the server, a plurality of fourth videos selected from among a plurality of third videos, the plurality of third videos being obtained by capturing the same scene as the plurality of first videos, the plurality of third videos being generated by capturing the same scene after the plurality of first videos are generated by capturing the same scene, the plurality of third videos being obtained by capturing the same scene from a plurality of mutually different viewpoints, the plurality of fourth videos being some of the plurality of third videos selected by the server;

determining, by the display device, whether the first selected viewpoint is included in a plurality of second viewpoints corresponding to the plurality of fourth videos;

when the first selected viewpoint is determined to be included in the plurality of second viewpoints, displaying a fourth video that is included in the plurality of fourth videos and corresponds to the first selected viewpoint; and when the first selected viewpoint is determined to not be included in the plurality of second viewpoints, (i) selecting, by the display device, one second viewpoint from among the plurality of second viewpoints as a second selected viewpoint, and (ii) displaying, by the display device, a fourth video that is included in the plurality of fourth videos and corresponds to the second selected viewpoint, the video display method further comprising:

selecting, by the display device, a plurality of fifth videos from among the plurality of second videos, the plurality of fifth videos being some of the plurality of second videos; and selecting, by the display device, a plurality of sixth videos from among the plurality of fourth videos, the plurality of sixth videos being some of the plurality of fourth videos, wherein in the selecting the first selected viewpoint, the first selected viewpoint is selected from among a plurality of third viewpoints corresponding to the plurality of fifth videos selected from among the plurality of second videos, in the displaying the second video, the second video is included in the plurality of fifth videos, in the determining whether the first selected viewpoint is included in the plurality of second viewpoints, whether the first selected viewpoint is included in a plurality of fourth viewpoints corresponding to the plurality of sixth videos from among the plurality of fourth videos is determined, when the first selected viewpoint is determined to be included in the plurality of fourth viewpoints, a sixth video that is included in the plurality of sixth videos and corresponds to the first selected viewpoint is displayed as the displayed fourth video that is included in the plurality of fourth videos and corresponds to the first selected viewpoint, and when the first selected viewpoint is determined to not be included in the plurality of fourth viewpoints, (i) one fourth viewpoint is selected from among the plurality of fourth viewpoints as the second selected viewpoint, and (ii) a sixth video that is included in the plurality of sixth videos and corresponds to the second selected viewpoint is displayed as the displayed fourth video that is included in the plurality of fourth videos and corresponds to the second selected viewpoint.

2. The video display method according to claim 1, wherein
a second viewpoint from among the plurality of second viewpoints closest to the first selected viewpoint is selected as the second selected viewpoint.

3. The video display method according to claim 1, wherein
a second viewpoint having a highest evaluation is selected as the second selected viewpoint based on evaluation values of the plurality of second viewpoints.

4. The video display method according to claim 3, wherein
the evaluation values are determined based on view counts of videos captured from the plurality of second viewpoints.

5. The video display method according to claim 1, wherein
first viewpoint information indicating the plurality of first viewpoints is further obtained when the plurality of second videos are obtained,
the plurality of first viewpoints and the first selected viewpoint are further displayed when displaying the second video,
second viewpoint information indicating the plurality of second viewpoints is further obtained when the plurality of fourth videos are obtained,
the plurality of second viewpoints and the first selected viewpoint are further displayed when displaying the fourth video that corresponds to the first selected viewpoint, and
the plurality of second viewpoints and the second selected viewpoint are further displayed when displaying the fourth video that corresponds to the second selected viewpoint.

6. The video display method according to claim 1, wherein when the first selected viewpoint is determined to not be included in the plurality of fourth viewpoints:
when the first selected viewpoint is included in the plurality of second viewpoints, the fourth video that is included in the plurality of fourth videos and corresponds to the first selected viewpoint is displayed; and
when the first selected viewpoint is not included in the plurality of second viewpoints, a sixth video that is included in the plurality of sixth videos and corresponds to the second selected viewpoint is displayed as the displayed fourth video that is included in the plurality of fourth videos and corresponds to the second selected viewpoint.

7. A video display device, comprising:
processing circuitry; and
memory,
wherein the processing circuitry executes the video display method according to claim 1, using the memory.

8. A non-transitory computer-readable recording medium, the recording medium having a computer program recorded thereon for causing a computer to execute the video display method according to claim 1.

* * * * *